US011061231B2

(12) United States Patent
Oku et al.

(10) Patent No.: US 11,061,231 B2
(45) Date of Patent: Jul. 13, 2021

(54) OPTICAL DEVICE AND DISPLAY DEVICE

(71) Applicant: SONY CORPORATION, Tokyo (JP)

(72) Inventors: Takashi Oku, Kanagawa (JP);
Katsuyuki Akutsu, Kanagawa (JP);
Akio Machida, Kanagawa (JP);
Nobuhiro Suzuki, Kanagawa (JP);
Takuji Yoshida, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 214 days.

(21) Appl. No.: 15/527,800

(22) PCT Filed: Nov. 25, 2015

(86) PCT No.: PCT/JP2015/083022
§ 371 (c)(1),
(2) Date: May 18, 2017

(87) PCT Pub. No.: WO2016/084831
PCT Pub. Date: Jun. 2, 2016

(65) Prior Publication Data
US 2019/0146221 A1 May 16, 2019

(30) Foreign Application Priority Data
Nov. 27, 2014 (JP) .............................. JP2014-240478

(51) Int. Cl.
*G02B 27/01* (2006.01)
*F21V 8/00* (2006.01)

(52) U.S. Cl.
CPC ......... *G02B 27/0172* (2013.01); *G02B 6/005* (2013.01); *G02B 6/0026* (2013.01);
(Continued)

(58) Field of Classification Search
CPC ........ G02B 2027/0174; G02B 27/0172; G02B 6/0026; G02B 6/005; G02B 2027/0118; H04N 5/64
See application file for complete search history.

(56) References Cited

U.S. PATENT DOCUMENTS

2002/0003637 A1* 1/2002 Watanabe .............. G03H 1/202
359/22
2006/0228073 A1* 10/2006 Mukawa .............. G02B 6/0033
385/31
(Continued)

FOREIGN PATENT DOCUMENTS

| CN | 1774661 A | 5/2006 |
|---|---|---|
| CN | 104914577 A | 9/2015 |

(Continued)

OTHER PUBLICATIONS

Lin et al. "The Detection Techniques for Several Different Types of Fiducial Markers" Smart Science vol. 1, No. 2, pp. 86-93 (Year: 2013).*

(Continued)

*Primary Examiner* — George G King
(74) *Attorney, Agent, or Firm* — Chip Law Group

(57) ABSTRACT

To provide a display device in which the brightness of the image viewed by the observer is bright, and the brightness of the image is as uniform as possible. The display device according to the present invention includes a frame 10 and an image display device 100, the image display device 100 includes an image forming apparatus 11 and an optical device 120, the optical device 120 includes a light guide plate 121, a first deflection unit 130 configured with a first hologram diffraction grating 131 and a second hologram diffraction grating 135, and a second deflection unit 140 configured with a third hologram diffraction grating 141, and slant angles and pitches of the first hologram diffraction (Continued)

grating 131, the second hologram diffraction grating 135, and the third hologram diffraction grating 141 satisfy a predetermined relation.

4 Claims, 45 Drawing Sheets

(52) U.S. Cl.
CPC ............ *G02B 2027/0118* (2013.01); *G02B 2027/0174* (2013.01)

(56) References Cited

U.S. PATENT DOCUMENTS

| | | | |
|---|---|---|---|
| 2007/0070504 A1 | 3/2007 | Akutsu et al. | |
| 2009/0040580 A1 | 2/2009 | Mukawa | |
| 2010/0321409 A1 | 12/2010 | Komori et al. | |
| 2014/0140654 A1* | 5/2014 | Brown | G02F 1/29 385/10 |
| 2015/0260994 A1 | 9/2015 | Akutsu et al. | |

FOREIGN PATENT DOCUMENTS

| | | |
|---|---|---|
| EP | 1731943 A1 | 12/2006 |
| EP | 2918402 A1 | 9/2015 |
| JP | 2002-162598 A | 6/2002 |
| JP | 2004-333714 A | 11/2004 |
| JP | 2008-058777 A | 3/2008 |
| JP | 2009186794 A * | 8/2009 ............ G02B 27/02 |
| JP | 2010-271554 A | 12/2010 |
| JP | 5119667 B2 | 1/2013 |
| JP | 2015-175967 A | 10/2015 |
| WO | 2005/093493 A1 | 10/2005 |

OTHER PUBLICATIONS

International Search Report and Written Opinion of PCT Application No. PCT/JP2015/083022, dated Feb. 16, 2016, 09 pages of English Translation and 10 pages of ISRWO.

International Preliminary Report on Patentability of PCT Application No. PCT/JP2015/083022, dated Jun. 8, 2017, 10 pages of English Translation and 06 pages of IPRP.

Extended European Search Report of EP Patent Application No. 15862419.7, dated Jun. 25, 2018, 09 pages.

Office Action for JP Patent Application No. 2016-561905, dated Oct. 1, 2019, 05 pages of Office Action and 04 pages of English Translation.

* cited by examiner

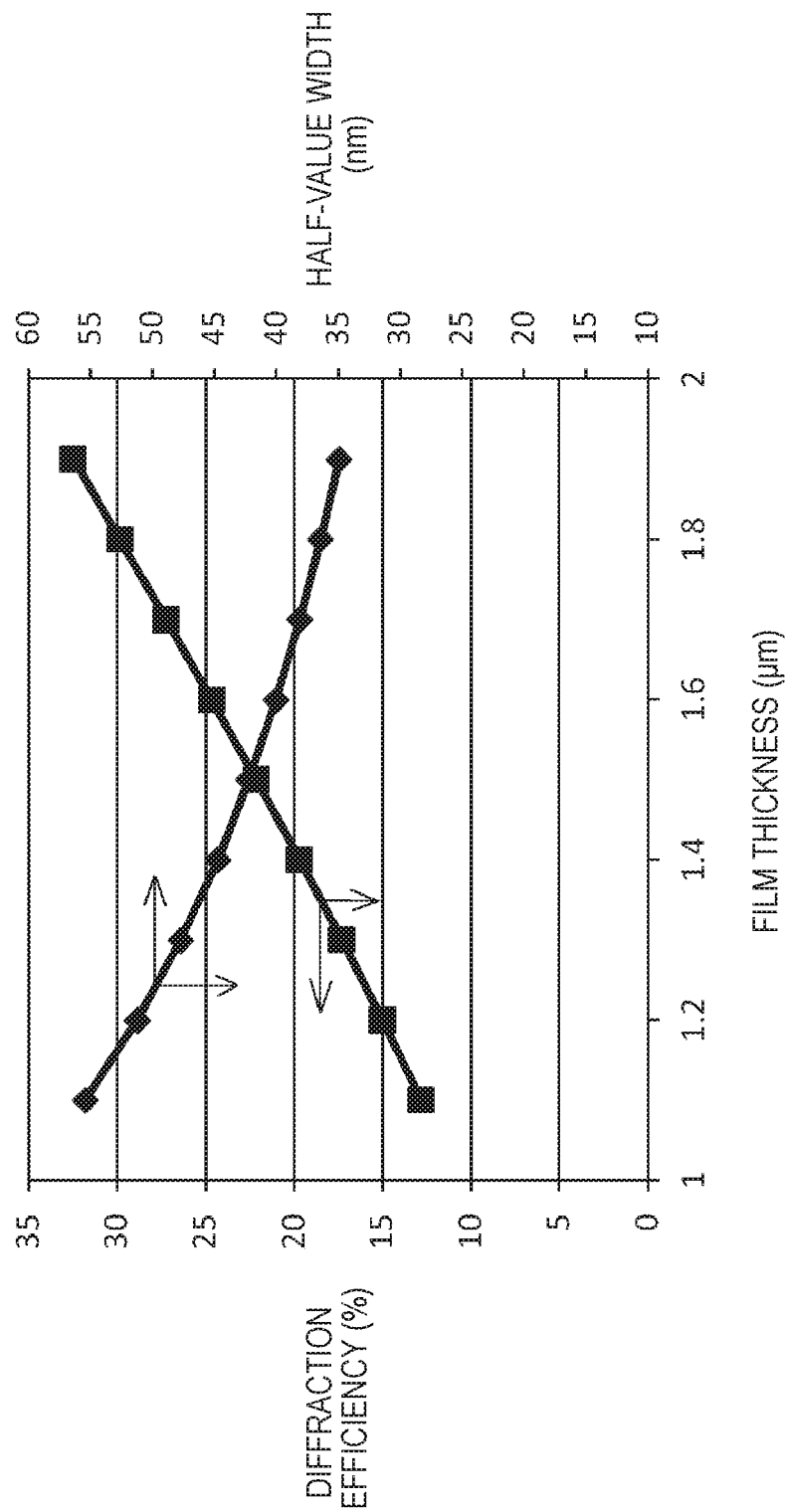

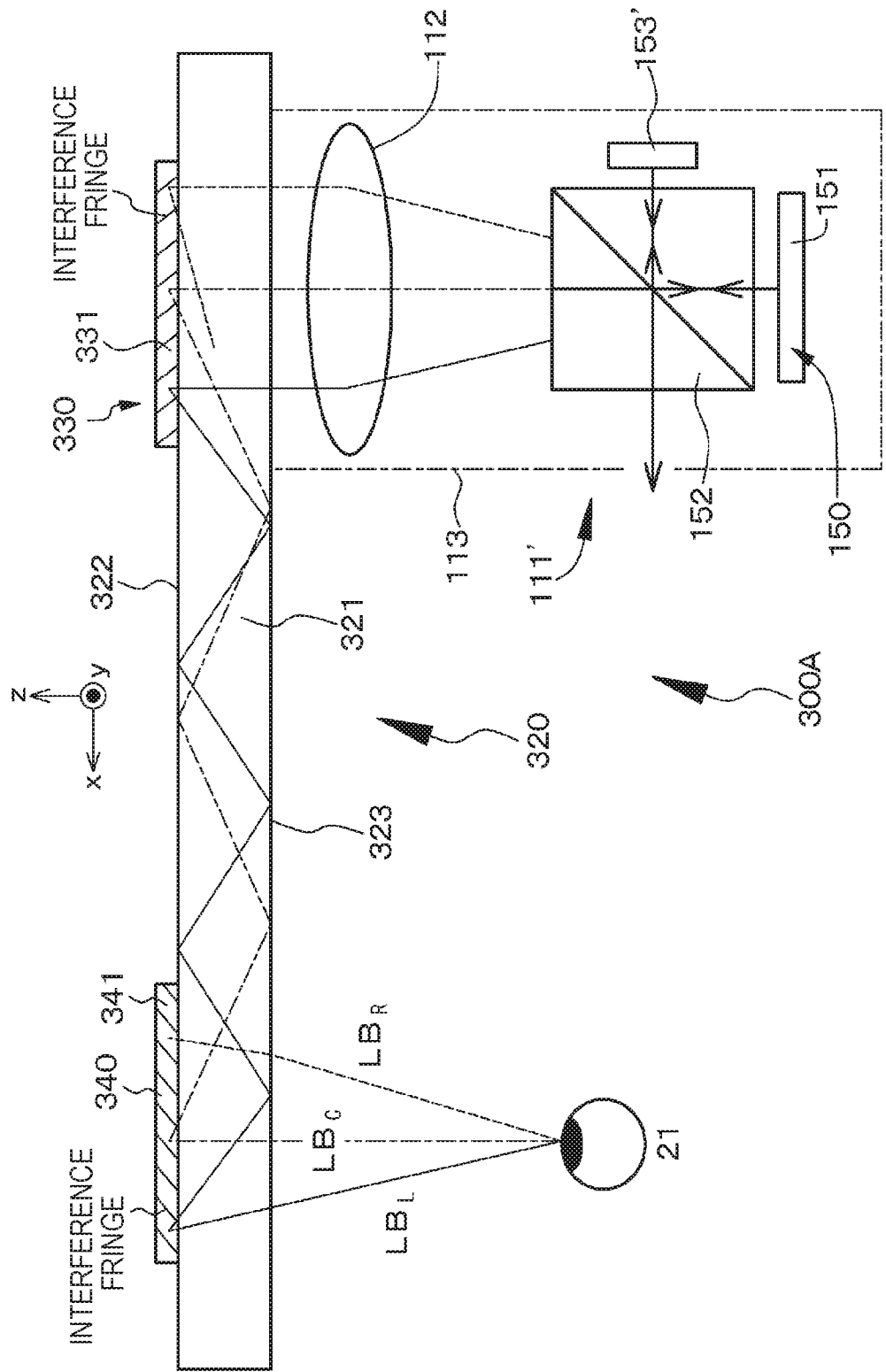

⟨OBSERVER SIDE⟩

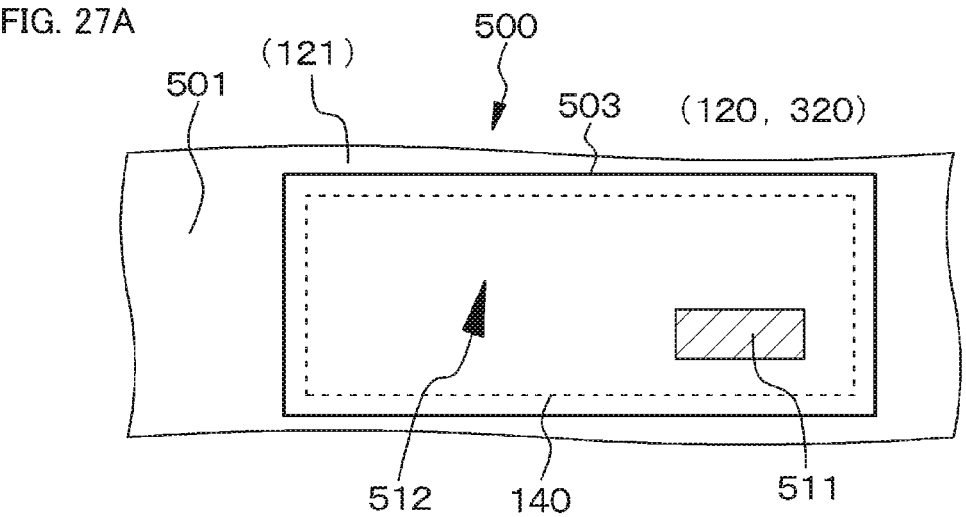
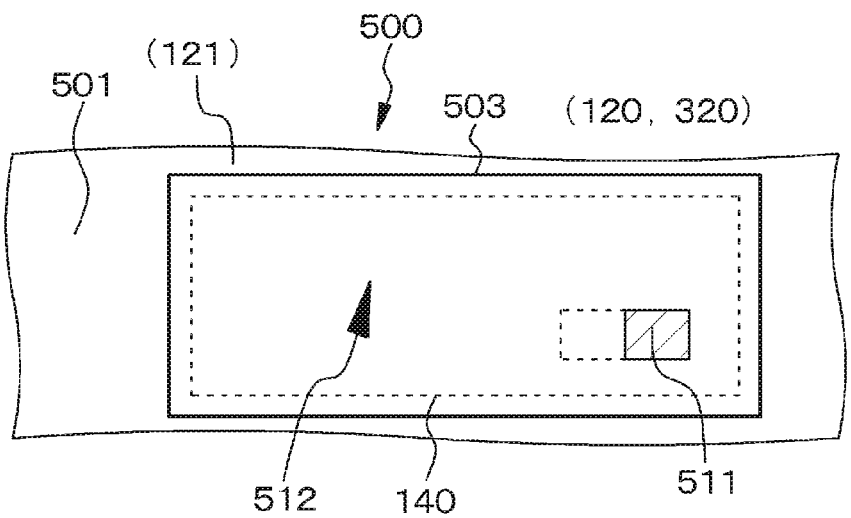
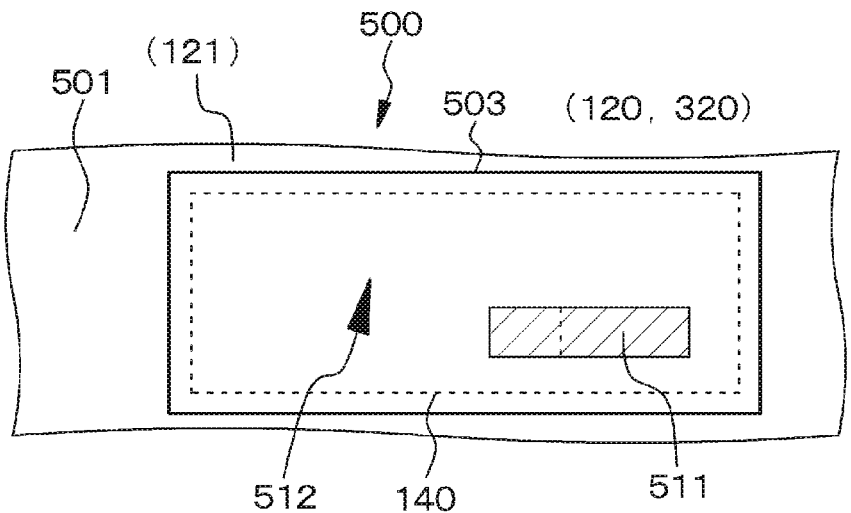

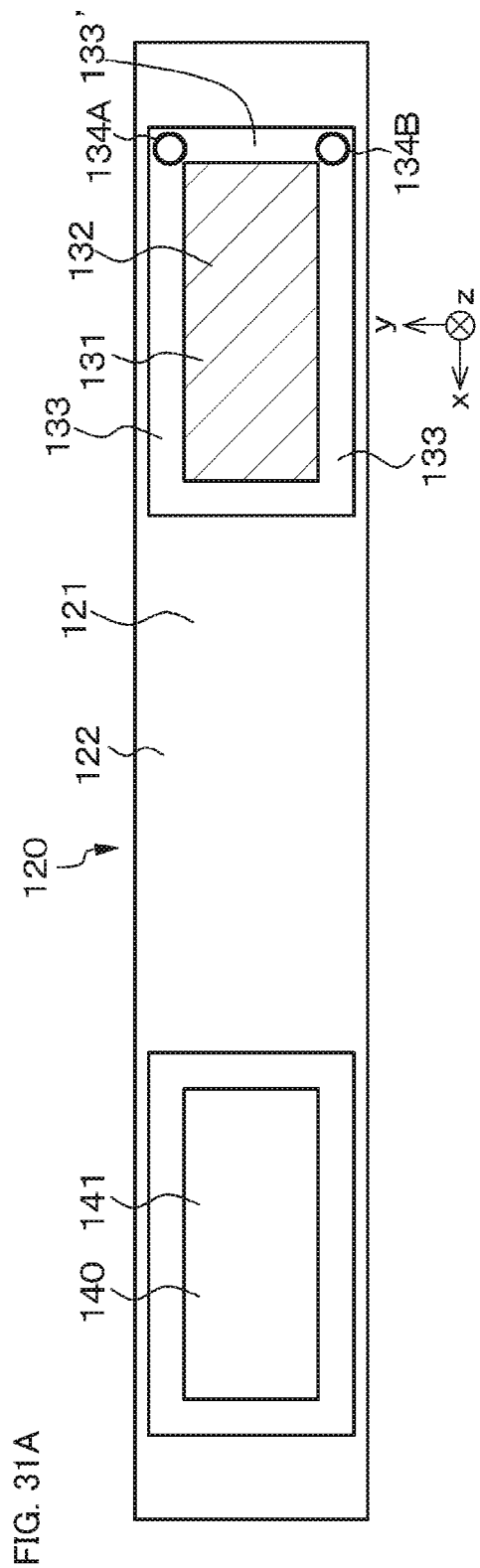
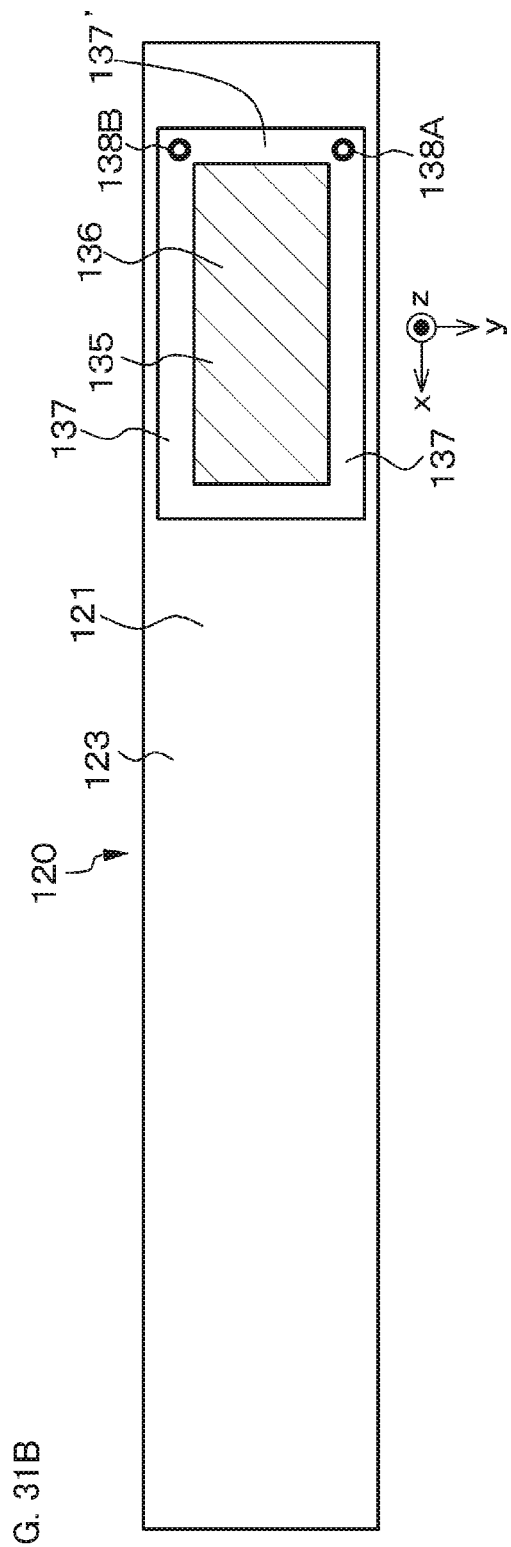

DIFFRACTION EFFICIENCY

WAVELENGTH

OPTICAL DEVICE AND DISPLAY DEVICE

CROSS REFERENCE TO RELATED APPLICATIONS

This application is a U.S. National Phase of International Patent Application No. PCT/JP2015/083022 filed on Nov. 25, 2015, which claims priority benefit of Japanese Patent Application No. JP 2014-240478 filed in the Japan Patent Office on Nov. 27, 2014. Each of the above-referenced applications is hereby incorporated herein by reference in its entirety.

TECHNICAL FIELD

The present disclosure relates to an optical device and a display device equipped with the optical device, and more specifically, to a display device used as a head mounted display (HMD) and an optical device employed in the display device.

BACKGROUND ART

A virtual image display device (image display device) using a hologram diffraction grating to allow an observer to observe an enlarged virtual image as a two-dimensional (2D) image formed by an image forming apparatus through a virtual image optical system is known. As illustrated in a conceptual diagram of FIG. 46, an image display device 1100 basically includes an image forming apparatus 1111 that displays an image, a collimating optical system 1112, and an optical device (light guide unit) 1120 on which light displayed by the image forming apparatus 1111 is incident and by which light is guided to a pupil 21 of an observer. The optical device 1120 includes a light guide plate 1121 and first and second deflection units 1130 and 1140 each configured with a hologram diffraction grating disposed on the light guide plate 1121. Then, light emitted from pixels of the image forming apparatus 1111 is incident on the collimating optical system 1112, and a plurality of parallel beams of light having different angles of incidence on the light guide plate 1121 are generated by the collimating optical system 1112 and incident on the light guide plate 1121. The parallel light is incident and emitted from a second surface 1123 of the light guide plate 1121. The first deflection unit 1130 and the second deflection unit 1140 are attached to a first surface 1122 of the light guide plate 1121. Reference numeral 1150 indicates a reflective spatial light modulator, reference numeral 1151 indicates a liquid crystal display device (LCD), reference numeral 1152 indicates a polarizing beam splitter, and reference numeral 1153 indicates a light source.

As an important characteristic required in a virtual image display device, brightness of an image viewed by an observer is required to be as high and uniform as possible. A virtual image display device capable of satisfying such a demand is known from, for example, JP 5119667B.

CITATION LIST

Patent Literature

Patent Literature 1: JP 5119667B

DISCLOSURE OF INVENTION

Technical Problem

FIGS. 43A, 43B, and 43C are schematic diagrams for describing a relation between light incident on an optical device in a display device of a related art and brightness of an image observed by an observer. In FIGS. 43A, 43B, and 43C, an optical spectrum of the light incident on the optical device 1120 is indicated by a curve "A," and a change in diffraction efficiency with respect to a wavelength of the light incident on the first deflection unit 1130 is indicated by a curve "E" which is referred to as a "diffraction efficiency change curve" E. Meanwhile, when the brightness of the image viewed by the observer is desired to be increased, commonly, the thickness of the first deflection unit 1130 configured with a hologram diffraction grating is increased to increase the diffraction efficiency of the first deflection unit 1130. However, when such a countermeasure is employed, the diffraction efficiency change curve E has a sharp peak. The diffraction efficiency change curve in the case in which the thickness of the first deflection unit 1130 configured with the hologram diffraction grating is thin and the diffraction efficiency of the first deflection unit 1130 is low is illustrated by a curve "F" in FIG. 43A. If a peak wavelength of the light incident on the first deflection unit 1130 is indicated by $\lambda_{LS\text{-}0}$, the optical device 1120 is designed so that a peak of the diffraction efficiency change curve E is identical to the wavelength $\lambda_{LS\text{-}0}$ in a light beam $LB_C$ of FIG. 46. The light beam $LB_C$ indicates a light beam from the center of the image (a light beam of a 0° angle of view, that is, a central angle of view) that is coincident with an optical axis of the pupil 21 of the observer. In the optical device 1120, for a light beam $LB_L$ or a light beam $LB_R$ in FIG. 46, the peak of the diffraction efficiency change curve E deviates from the wavelength $\lambda_{LS\text{-}0}$ (see FIGS. 43B and 43C). Here, in FIGS. 43A, 43B, and 43C, hatched regions are portions in which the light incident on the optical device 1120 contributes to the brightness of the image viewed by the observer. Therefore, since the brightness of the image viewed by the observer significantly changes on an image right side, an image center, and an image left side, the requirement for the brightness of the image to be as uniform as possible is unable to be satisfied.

In this regard, it is an object of the present disclosure to provide a display device capable of satisfying the requirement for the brightness of the image viewed by the observer to be bright, and for the brightness of the image to be as uniform as possible and an optical device employed in the display device.

Solution to Problem

To solve the above problem, an optical device according to a first or a second aspect of the present disclosure includes:

(a) a light guide plate configured to cause incident light to propagate inside the light guide plate through total reflection and then emit the light;

(b) a first deflection unit configured to deflect the light incident on the light guide plate so that the light incident on the light guide plate is totally reflected inside the light guide plate; and (c) a second deflection unit configured to deflect the light that has propagated inside the light guide plate through the total reflection so that part of the light that has propagated inside the light guide plate through the total reflection is emitted from the light guide plate.

The first deflection unit is constituted by a first hologram diffraction grating and a second hologram diffraction grating, the second deflection unit is constituted by a third hologram diffraction grating, a first interference fringe is formed in the first hologram diffraction grating,
a second interference fringe is formed in the second hologram diffraction grating, and
a third interference fringe is formed in the third hologram diffraction grating.

Here, a term "total reflection" indicates internal total reflection or total reflection inside a light guide plate. The same applies hereinafter.

Further, in the optical device according to the first aspect of the present disclosure, a relation of $$\phi_2 < \phi_3 < \phi_1 \text{ and } P_1 = P_3 = P_2$$

is satisfied. Here,
$\phi_1$ represents slant angle of first interference fringe,
$\phi_2$ represents slant angle of second interference fringe,
$\phi_3$ represents slant angle of third interference fringe,
$P_1$ represents pitch of first interference fringe,
$P_2$ represents pitch of second interference fringe, and
$P_3$ represents pitch of third interference fringe.

In addition, in the optical device according to the second aspect,
a relation of
$$\lambda_2 < \lambda_3 < \lambda_1$$
is satisfied,
where
$\lambda_1$ represents a peak wavelength of light which is incident on the light guide plate and deflected by the first hologram diffraction grating,
$\lambda_2$ represents a peak wavelength of light which is incident on the light guide plate and deflected by the second hologram diffraction grating, and
$\lambda_3$ represents a peak wavelength of light which is deflected by the first hologram diffraction grating and the second hologram diffraction grating, propagates inside the light guide plate through the total reflection, and is then deflected by the third hologram diffraction grating.

In order to achieve the above object, a display device according to the first aspect, the second aspect, or the third aspect of the present disclosure is a display device including:
(i) a frame configured to be worn on the head of an observer; and
(ii) an image display device configured to be mounted on a frame,
wherein the image display device includes
(A) an image forming apparatus, and
(B) an optical device from which light emitted from the image forming apparatus is incident and emitted.

Further, in the display device according to the first aspect of the present disclosure, the optical device is configured with the optical device according to the first aspect of the present disclosure, and in the display device according to the second aspect of the present disclosure, the optical device is configured with an optical device according to the second aspect of the present disclosure.

In addition, in a display device according to a third aspect, the optical device includes
(a) a light guide plate configured to cause incident light to propagate inside the light guide plate through total reflection and then emit the light;
(b) a first deflection unit configured to deflect the light incident on the light guide plate so that the light incident on the light guide plate is totally reflected inside the light guide plate, and
(c) a second deflection unit configured to deflect the light that has propagated inside the light guide plate through the total reflection so that part of the light that has propagated inside the light guide plate through the total reflection is emitted from the light guide plate, and
the image forming apparatus includes a first light source with a peak wavelength $\lambda_{LS-1}$ and a second light source with peak wavelength $\lambda_{LS-2}$, and
the image forming apparatus forms an image on a basis of the light from the first light source and light from the second light source.

Advantageous Effects of Invention

In the optical device according to the first aspect of the present disclosure or the display device according to the first aspect of the present disclosure, a relation of slant angles and pitches of the interference fringe of the three hologram diffraction gratings is specified, and in the optical device according to the second aspect of the present disclosure or the display device according to the second aspect of the present disclosure, a relation of peak wavelengths of light deflected by three hologram diffraction gratings is specified. Further, in the display device according to the third aspect of the present disclosure, the image forming apparatus includes two light sources and forms an image on the basis of light from the light sources. Therefore, it is possible to increase the brightness of the image viewed by the observer and increase uniformity of the brightness of the image as much as possible. However, the effects described in the present specification are not intended to be limiting but are merely examples and there may be additional effects.

BRIEF DESCRIPTION OF DRAWINGS

FIG. 15 is a graph illustrating a film thickness dependence relation between diffraction efficiency of a hologram diffraction grating and a half-value width.

FIG. 17 is a conceptual diagram of an image display device in a display device according to a seventh embodiment.

FIG. 27A, FIG. 27B, and FIG. 27C are diagrams schematically illustrating a change in a virtual image projection region of the dimmer or the like.

FIGS. 31A and 31B are a schematic diagram of a light guide plate in a display device according to a twelfth embodiment which is viewed from a side opposite to an observer and a schematic diagram viewed from the same side as the observer.

MODE(S) FOR CARRYING OUT THE INVENTION

Figure 1:
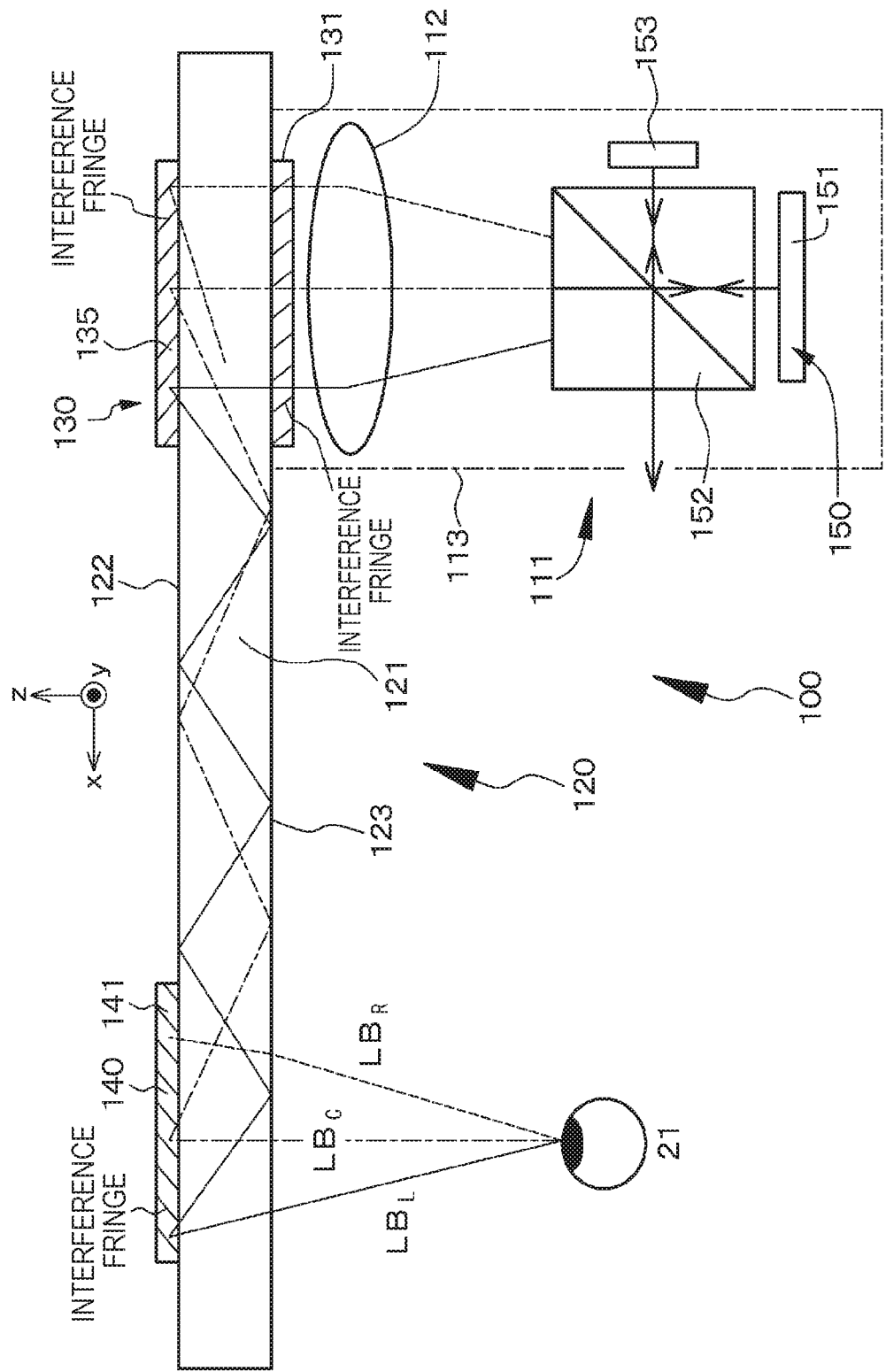
FIG. 1 is a conceptual diagram of an image display device in a display device according to a first embodiment.

Hereinafter, the present disclosure will be described with reference to the appended drawings on the basis of embodiments, but the present disclosure is not limited to the embodiments, and the various numerical values and materials in the embodiment are examples. Further, description will proceed in the following order.

1. General description of optical devices according to first and second aspects of present disclosure and display devices related to first to third aspects of present disclosure 2. First embodiment (optical devices according to first and second aspects of present disclosure and display devices according to first and second aspects of present disclosure)

3. Second embodiment (modification of first embodiment)

4. Third embodiment (additional modification of first embodiment)

5. Fourth embodiment (additional modification of first embodiment)

6. Fifth embodiment (modification of first to fourth embodiments)

7. Sixth embodiment (modification of first to fifth embodiments)

8. Seventh embodiment (display device according to third aspect of present disclosure)
9. Eighth embodiment (modification of first to seventh embodiments)
10. Ninth embodiment (modification of first to eighth embodiments)
11. Tenth embodiment (modification of ninth embodiment)
12. Eleventh embodiment (additional modification of ninth embodiment)
13. Twelfth embodiment (modification of first to eleventh embodiments)
14. Others <General Description of Optical Devices According to First and Second Aspects of Present Disclosure and Display Devices According to First to Third Aspects of Present Disclosure>

In a display device related to a first aspect of the present disclosure, preferably, when a peak wavelength of light which is deflected by a first hologram diffraction grating and a second hologram diffraction grating, propagates inside a light guide plate through total reflection, and is then deflected by a third hologram diffraction grating is indicated by $\lambda_3$, an image forming apparatus includes but is not limited to a light source that emits light having the peak wavelength $\lambda_3$. Further, in a display device according to a second aspect of the present disclosure, desirably, the image forming apparatus includes but is not limited to a light source that emits light having the peak wavelength $\lambda_3$.

Further, in a display device according to a third aspect of the present disclosure, it is desirable to satisfy $$0 \text{ nm} < |\lambda_{LS-2} - \lambda_{LS-1}| \le 60 \text{ nm},$$

and in the display device according to the third aspect of the present disclosure having the above configuration, preferably, the image display device controls the intensity of light from the first light source and the intensity of light from the second light source. By adopting this configuration, even when there is a variation in the light intensities of the light emitted from the first light source and the light emitted from the second light source, it is possible to perform control such that the variation is eliminated, or it is possible to control the combined optical spectrum of the light incident on the optical device. It is also possible to perform an adjustment for optimizing brightness balance of an image influenced by manufacturing variations of the first hologram diffraction grating and the second hologram diffraction grating.

An optical device according to the first aspect of the present disclosure or an optical device in the display device according to the first aspect of the present disclosure (hereinafter, the optical devices are also referred to collectively as an "optical device and the like according to the first aspect of the present disclosure"), although not limited thereto, preferably satisfies $$0.7° \le |\phi_2 - \phi_1| \le 4.7°.$$

An optical device according to the second aspect of the present disclosure or an optical device in the display device according to the second aspect of the present disclosure (hereinafter, the optical devices are also referred to collectively as an "optical device and the like according to the second aspect of the present disclosure"), although not limited thereto, preferably satisfies $$0 \text{ nm} < |\lambda_3 - \lambda_1| \le 40 \text{ nm and } 0 \text{ nm} < |\lambda_2 - \lambda_3| \le 40 \text{ nm}.$$

In the optical device and the like according to the second aspect of the present disclosure including the above preferable configuration, when diffraction efficiency of the first hologram diffraction grating is $\eta_1$, diffraction efficiency of the second hologram diffraction grating is $\eta_2$, and diffraction efficiency of the third hologram diffraction grating is $\eta_3$, $$\eta_1/\eta_3 \ge 1.0, \eta_2/\eta_3 \ge 1.0.$$

Preferably, $$\eta_1/\eta_3 > 1.0 \text{ and } \eta_2/\eta_3 > 1.0$$

can be satisfied. When the diffraction efficiency of the third hologram diffraction grating is set to be equal to or less than the diffraction efficiency of the first hologram diffraction grating and the diffraction efficiency of the second hologram diffraction grating, preferably, to be lower than the diffraction efficiency of the first hologram diffraction grating and the diffraction efficiency of the second hologram diffraction grating, it is possible to further uniformize the image observed by the observer along an axial direction of the light guide plate. It is more desirable that a value of $\eta_3$ satisfy $$\eta_3 \le 0.25.$$

A value of $\eta_1$ and a value of $\eta_2$ may be the same or different. In the latter case, $\eta_1 > \eta_2$ is desirable. Further, the diffraction efficiency is indicated by $I_1/I_0$ when the light intensity of the light incident on the hologram diffraction grating is $I_0$, and the light intensity of +1$^{st}$-order diffracted light diffracted by hologram diffraction grating is $I_1$. The above rules can also be applied to the optical device and the like according to the first aspect of the present disclosure.

Furthermore, in the optical device and the like according to the second aspect of the present disclosure having various preferable configurations described above, when the thickness of the first hologram diffraction grating is $T_1$, the thickness of the second hologram diffraction grating is $T_2$, and the third hologram diffraction grating is $T_3$, it is desirable to satisfy $$1.0 \text{ μm} \le T_1, T_2 \le 10 \text{ μm}, T_1 \ge T_3, \text{ and } T_2 \ge T_3, \text{ and preferably}, T_1 > T_3 \text{ and } T_2 > T_3.$$

When the thickness of the third hologram diffraction grating thinner is set to be equal to or less than the thickness of the first hologram diffraction grating and the thickness the second hologram diffraction grating, preferably, to be less than the thickness of the first hologram diffraction grating and the thickness of the second hologram diffraction grating, it is possible to further uniformize the image observed by the observer along the axial direction of the light guide plate. It is more desirable that a value of $T_3$ satisfy $$T_3 \le 2.0 \text{ μm},$$

and preferably $$T_3 \le 1.6 \text{ μm}.$$

A value of $T_1$ and a value of $T_2$ may be the same or different. In the latter case, $T_1 > T_2$ is desirable. The above rules can also be applied to the optical device and the like according to the first aspect of the present disclosure.

Furthermore, in the optical device and the like according to the second aspect of the present disclosure having various preferable configuration described above, when a pitch of a first interference fringe is $P_1$, a slant angle thereof is $\phi_1$, a pitch of a second interference fringe is $P_2$, and a slant angle thereof is $\phi_2$, it is desirable to satisfy $$\phi_1 \ne \phi_2 \text{ and } P_1 = P_2,$$

and in this case, when a pitch of a third interference fringe is $P_3$, and a slant angle thereof is $\phi_3$, it is desirable to satisfy $$\phi_2 < \phi_3 < \phi_1 \text{ and } P_1 = P_2 = P_3$$

When a surface on which light is incident is defined to be a second surface of the light guide plate, and a surface of the light guide plate facing the second surface is defined to be a first surface, a configuration in which the first hologram diffraction grating is arranged on the first surface of the light guide plate, and the second hologram diffraction grating is arranged on the second surface of the light guide plate may be provided, or a configuration in which the first hologram diffraction grating is arranged on the second surface of the light guide plate, and the second hologram diffraction grating is arranged on the first surface of the light guide plate may be provided. The third hologram diffraction grating may be arranged on the first surface of the light guide plate or may be arranged on the second surface of the light guide plate. Here, the surface of the light guide plate facing the image forming apparatus is assumed to be the second surface of the light guide plate, and the first surface of the light guide plate faces the second surface of the light guide plate. The image forming apparatus and the observer are positioned on the second surface side of the light guide plate. However, the image forming apparatus may be positioned on the second surface side of the light guide plate, and the observer may be positioned on the first surface side of the light guide plate.

Furthermore, in the optical devices and the like according to the first and second aspects of the present disclosure having various preferred modes and configurations described above, In the third hologram diffraction grating, a region located far from a first deflection unit may have a higher diffraction efficiency than a region located close to the first deflection unit. Alternatively, in the third hologram diffraction grating, the region located far from the first deflection unit may be thicker than the region located close to the first deflection unit. By adopting this configuration, it is possible to further uniformize the image observed by the observer along the axial direction of the light guide plate. Further, in this case, the thickness of the third hologram diffraction grating may be changed stepwise, or the thickness can be increased gradually (a state in which the thickness changes continuously). In this case, it is desirable that the slant angle be constant without changing in the third hologram diffraction grating.

Specifically, the third hologram diffraction grating is configured with a 3A-th hologram diffraction grating located close to the first deflection unit and a 3B-th hologram diffraction grating located far from the first deflection unit, when diffraction efficiency of the 3A-th hologram diffraction grating is $\eta_{3A}$, and diffraction efficiency of the 3B-th hologram diffraction grating is $\eta_{3B}$, it is desirable to satisfy $$\eta_{3B} > \eta_{3A},$$

or when a thickness of the 3A-th hologram diffraction grating is $T_{3A}$, and a thickness of the 3B-th hologram diffraction grating is $T_{3B}$, it is desirable to satisfy $$T_{3B} > T_{3A}$$

In this case, when a surface on which light is incident is defined to be a second surface of the light guide plate, and a surface of the light guide plate facing the second surface is defined to be a first surface, a configuration in which the 3A-th hologram diffraction grating and the 3B-th hologram diffraction grating are arranged on the first surface of the light guide plate may be provided, a configuration in which the 3A-th hologram diffraction grating and the 3B-th hologram diffraction grating are arranged on the second surface of the light guide plate may be provided, a configuration in which the 3A-th hologram diffraction grating is arranged on the second surface of the light guide plate, and the 3B-th hologram diffraction grating is arranged on the first surface of the light guide plate may be provided, or a configuration in which the 3A-th hologram diffraction grating is arranged on the first surface of the light guide plate, and the 3B-th hologram diffraction grating is arranged on the second surface of the light guide plate may be provided. However, the third hologram diffraction grating is not limited to being configured with the two hologram diffraction gratings and may be configured with three or more hologram diffraction gratings. When the third hologram diffraction grating is configured with two or more hologram diffraction gratings, one hologram diffraction grating (or one hologram diffraction grating group) is arranged on the first surface of the light guide plate, the other hologram diffraction grating (or the other hologram diffraction grating group) is arranged on the second surface of the light guide plate, an orthogonal projection image of one hologram diffraction grating (or one hologram diffraction grating group) to the light guide plate and an orthogonal projection image of the other hologram diffraction grating (or the other hologram diffraction grating group) to the light guide plate may be in a state in which there is no gap between the orthogonal projection images, or the orthogonal projection images may overlap each other in a boundary portion in which they are facing to each other. Further, in this cases, it is desirable that the slant angle of the 3A-th hologram diffraction grating be the same as the slant angle of the 3B-th hologram diffraction grating.

Furthermore, in the optical devices and the like according to the first and second aspects of the present disclosure having various preferable configurations described above, incident light having the peak wavelength $\lambda_1$ is (mainly) diffracted by the first hologram diffraction grating rather than the second hologram diffraction grating in the incident light corresponding to the central angle of view, and the incident light having the peak wavelength $\lambda_2$ is (mainly) diffracted by the second hologram diffraction grating rather than the first hologram diffraction grating in the incident light corresponding to the central angle of view.

Furthermore, in the optical devices and the like according to the first and second aspects of the present disclosure having various preferred modes and configurations described above, there may be provided a configuration in which the first hologram diffraction grating has a first interference fringe forming region in which a first interference fringe is formed and alignment marks that are disposed outside the first interference fringe forming region, and the second hologram diffraction grating has a second interference fringe forming region in which a second interference fringe is formed and alignment marks that are disposed outside the second interference fringe forming region.

Furthermore, in the optical devices and the like according to the first and second aspects of the present disclosure having various preferred modes and configurations described above, there may be provided a configuration in which the first hologram diffraction grating is arranged on one surface of the light guide plate, and the second hologram diffraction grating is arranged on the other surface of the light guide plate opposite to the one surface. Through this configuration, that is, since the first hologram diffraction grating and the second hologram diffraction grating are arranged apart from each other, a possibility that the light diffracted by the first hologram diffraction grating is incident on the second hologram diffraction grating, and the light diffracted by the second hologram diffraction grating is incident on the first hologram diffraction grating is low, and thus it is possible to prevent generation of so-called stray light. However, the present disclosure is not limited to this configuration, and the first hologram diffraction grating and the second hologram diffraction grating may be formed on one surface or the other surface of the light guide plate in a stacked state or in a state with a gap therebetween. The third hologram diffraction grating may be disposed on one surface of the light guide plate or may be disposed on the other surface of the light guide plate.

In the display device according to the third aspect of the present disclosure, each of a first deflection unit and a second deflection unit may be configured with a hologram diffraction grating.

Hereinafter, the optical device in the display device according to the third aspect of the present disclosure such as the optical devices and the like according to the first and second aspects of the present disclosure having various preferred modes and configurations described above may be referred to collectively as an "optical device and the like according to the present disclosure."

Hereinafter, the display devices according to the first to third aspects of the present disclosure having various preferred modes and configurations described above may be referred to collectively as a "display device and the like according to the present disclosure."

In the optical device and the like according to the present disclosure, the hologram diffraction grating may be configured with a reflection type hologram diffraction grating or may be configured with a transmission type hologram diffraction grating, or some hologram diffraction gratings may be configured with a reflection type hologram diffraction grating, and the remaining hologram diffraction gratings may be configured with a transmission type hologram diffraction grating. In the hologram diffraction grating, the incident light is diffracted and reflected. Further, as the reflection type hologram diffraction grating, a reflection type volume hologram diffraction grating may be used. The reflection type volume hologram diffraction grating indicates a hologram diffraction grating that diffracts and reflects only $+1^{st}$-order diffracted light. In the first deflection unit, at least some of a plurality of parallel lights incident on the light guide plate are diffracted and reflected so that a plurality of parallel lights incident on the light guide plate are totally reflected inside the light guide plate. On the other hand, in the second deflection unit, the parallel light that has propagated inside the light guide plate through the total reflection is diffracted and reflected a plurality of times and then emitted from the light guide plate in the state of the parallel light.

Through the display device and the like according to the present disclosure, it is possible to reduce the weight and the size of the display device, it is possible to drastically reduce a discomfort feeling when the display device is worn, and furthermore, to reduce the manufacturing cost. For example, a head mounted display (HMD) can be configured with the display device and the like according to the present disclosure.

In the display device and the like according to the present disclosure, the optical device can be transmissive or semi-transmissive (see-through type). Specifically, at least a part of the optical device facing the pupil of the observer (more specifically, the second deflection unit) may be transmissive or semi-transmissive (see-through), and the outside can be seen through this part of the optical device. A display device may have one image display device (monocular type) or two image display devices (binocular type).

In this specification, a term "semi-transmissive" may be used, but it does not mean that half (50%) of incident light is transmitted or reflected and means that a part of incident light is transmitted, and the rest of the light is reflected.

An image display of a single color (for example, green) can be performed by the optical device and the like according to the present disclosure or the display device and the like according to the present disclosure. In this case, for example, an angle of view is divided into two (more specifically, for example, into two halves), and the diffraction grating member may be configured such that two diffraction grating members corresponding to the divided angles of view are stacked. Further, when a color image display is performed, the diffraction grating member may be configured such that P diffraction grating layers formed of the reflection type volume hologram diffraction grating are stacked in order to correspond to diffraction reflection of P types of light having P types of different wavelength bands (or wavelengths) (for example, P=3, three types of red, green, and blue). In each diffraction grating layer, an interference fringe corresponding to one type of wavelength band (or wavelength) is formed. Alternatively, there may be provided a configuration in which P types of interference fringes are formed in a diffraction grating member formed of one diffraction grating in order to correspond to diffraction reflection of P types of light having P types of different wavelength bands (or wavelengths). Alternatively, there may be employed a structure in which a hologram diffraction grating of diffracting and reflecting light having a red wavelength band (or wavelength) is arranged on a first light guide plate, a hologram diffraction grating of diffracting and reflecting light having a green wavelength band (or wavelength) is arranged on a second light guide plate, a hologram diffraction grating of diffracting and reflecting light having a blue wavelength band (or wavelength) is arranged on a third light guide plate, and the first light guide plate, the second light guide plate, and the third light guide plate are stacked with a gap therebetween. Alternatively, two types of hologram diffraction gratings among a hologram diffraction grating of diffracting and reflecting light having a red wavelength band (or wavelength), a hologram diffraction grating of diffracting and reflecting light having a green wavelength band (or wavelength), and a hologram diffraction grating of diffracting and reflecting light having a blue wavelength band (or wavelength) may be arranged on the first light guide plate, and the remaining hologram diffraction grating may be arranged on the second light guide plate. By adopting the configurations, it is possible to increase the diffraction efficiency, increase a diffraction acceptance angle, optimize a diffraction reflection angle when light having each wavelength band (or wavelength) is diffracted and reflected by the hologram diffraction grating.

As a method for preparing the diffraction grating member, a method of forming a dry film-like photopolymer layer, a method of forming a photopolymer layer on a support made of glass, plastic, or the like sequentially in a desired order on the basis of a coating technique may be used. As a method of coating the photopolymer, known coating techniques such as a die coating technique, a gravure coating technique, a roll coating technique, a blade coating technique, a curtain coating technique, a dip coating technique, a spin coating technique, a printing technique, or the like may be used. Further, in addition to a single layer coating technique, a method of simultaneously coating a plurality of layers such as a multilayer slide coating technique may be employed. A passivation layer (a spacer layer) may be disposed between the photopolymer layers by a known coating device or a lamination technique as necessary.

In manufacturing the diffraction grating member, the interference fringe is recorded on a hologram material (photopolymer) on the basis of a refractive index modulation by irradiating the photopolymer layer with reference laser beam and object laser beam. In other words, an interference fringe having a desired surface pitch Λ and a slant angle φ is formed. Specifically, preferably, the interference fringe formed by the object laser beam and the reference laser beam is recorded in the photopolymer layer. For example, such that the photopolymer layer is irradiated with the object laser beam in a first predetermined direction on one side, and at the same time, the photopolymer layer is irradiated with the reference laser beam in a second predetermined direction on the other side. By appropriately selecting the first predetermined direction, the second predetermined direction, and the wavelengths of the object laser beam and the reference laser beam, it is possible to obtain a desired surface pitch Λ of the interference fringe and a desired slant angle (inclination angle) φ of the interference fringe. Here, the slant angle of interference fringe refers to an angle formed by the surface and the interference fringe of the diffraction grating member. When a plurality of photopolymer layers are formed, it is desirable to allocate the photopolymer layers disposed on two glass plates. For example, when four photopolymer layer should be formed as the diffraction grating member, it is desirable to arrange and prepare two photopolymer layers on one glass plate, and in this case, it is possible to secure manufacturing stability of optical characteristics of the diffraction grating member. In order to set a wavelength distribution of the diffraction grating member to a desired value, it is possible to cause the two glass plates to have a difference in an amount of ultraviolet irradiation after hologram exposure.

Any photopolymer material can be used as a photopolymer material as long as it is configured with at least a photopolymerizable compound, binder resin, and a photopolymerization initiator. As the photopolymerizable compound, for example, known photopolymerizable compounds such as acrylic monomers, methacrylic monomers, styrene monomers, butadiene monomers, vinyl monomers, epoxy monomers, or the like may be used. These may be copolymers or may be nonfunctional or polyfunctional. These monomers may be used singly or I plural. An known binder resin can be also used as the binder resin, and specifically, cellulose acetate based resins, acrylic based resins, acrylic acid ester based resins, methacrylic acid resins, epoxy based resins, urethane based resins, polypropylene resins, polyvinyl ether resin, polycarbonate resin, polyamide resin, polyvinyl acetate, vinyl chloride resin, urea resin, styrene resin, butadiene resin, natural rubber resin, polyvinylcarbazole, polyethylene glycol, phenolic resin, or copolymer thereof, gelatin, or the like may be used. The binder resin may be used singly or plurally. Any known photopolymerization initiator can be used as the photopolymerization initiator. The photopolymerization initiator may be used singly or plurally or may be used in combination with one or more photosensitizing dyes. A plasticizer, a chain transfer agent, or other additives may be appropriately added to the photopolymer layer. As a material constituting the passivation layer, any material can be used as long as it is transparent, and the passivation lay may be formed by coating, or a pre-filmized material may be laminated on the photopolymer layer. Examples of the material constituting the passivation layer include polyvinyl alcohol (PVA) resin, acrylic resin, polyurethane resin, polyethylene terephthalate (PET) resin, triacetyl cellulose (TAC) resin, polymethyl methacrylate (PMMA) resin, polypropylene resin, polycarbonate Resins, and polyvinyl chloride resins.

Figure 44A:
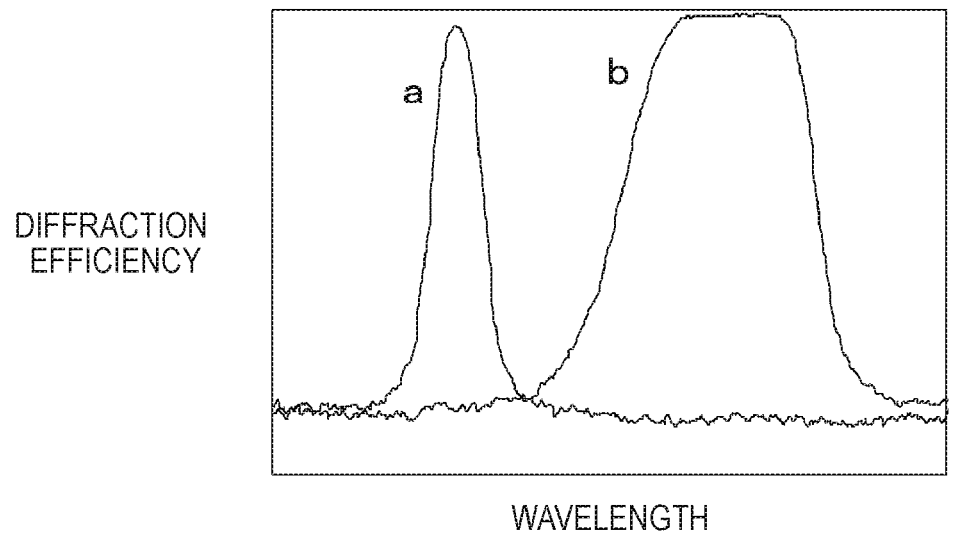
FIG. 44A is a graph illustrating a state in which a photosensitive material layer is irradiated with an energy line, and a reproduction center wavelength (a diffraction center wavelength) is shifted from a state of "A" to a state of "B" when heated.

As described above, in the method of manufacturing the diffraction grating member, the interference fringe is recorded on the hologram material (photopolymer) on the basis of the refractive index modulation by irradiating the photopolymer layer with the reference laser beam and the object laser beam. Then, the photopolymer layer is irradiated with energy lines from one surface side of the photopolymer layer, and thus the monomers in the photopolymer material remaining without being polymerized at the time of laser irradiation are polymerized and fixed. Thereafter, the refractive index modulation degree is amplified by heating. In the heating, at the same time as the increase in the refractive index modulation degree, the slant angle (inclination angle) of the interference fringe by the thermal stress changes. In this change, only the slant angle φ changes in a state in which the value Λ of the surface pitch on the surface of the photopolymer layer is maintained, and thus as illustrated in FIG. 44A, a reproduction center wavelength (a diffraction center wavelength) is shifted from a state of "a" to a state of "b."

Figure 45:
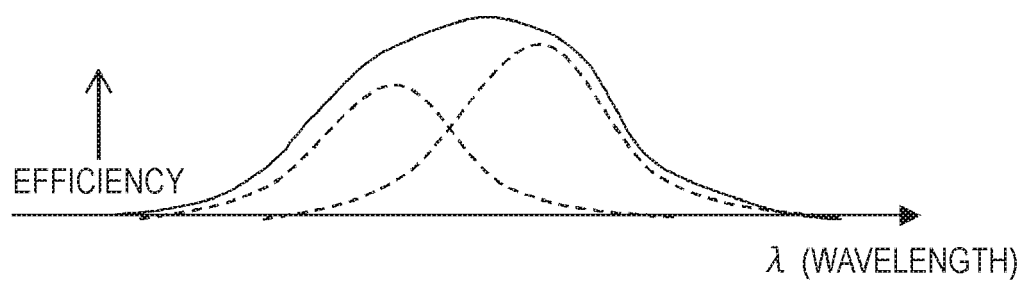
FIG. 45 is a diagram schematically illustrating a relation between a wavelength and efficiency of a diffraction grating member obtained by stacking two photopolymer layers.

As described above, by irradiating the photopolymer layer with energy lines from one surface side of the photopolymer layer and then heating it, it is possible to cause the slant angles of the stacked photopolymer layers to be different from each other in the state in which the value Λ of the surface pitch on the surface of the photopolymer layer is maintained, and thus there is no increase in the number of steps, productivity is high, and a problem in that an undesired interference fringe is formed in the diffraction grating member does not occur. Furthermore, a problem in that bubbles or the like enters the diffraction grating member during the manufacturing process is unlikely to occur. Further, since it is possible to easily manufacture a multilayered photopolymer layer, it is possible to further increase the diffractive wavelength band of the diffraction grating member, and it is easy to increase the brightness of the image of the image display device. Further, as illustrated in FIG. 45, a desired reproduction center wavelength (diffraction center wavelength) and a bandwidth thereof can be arbitrarily designed as long as the interference fringe in which the shift amount of the reproduction central wavelength of the photopolymer layer is anticipated is recorded in advance. Furthermore, when the optical device is manufactured using such a method, a variation in characteristic is more likely to occur as the number of stacks of the first deflection unit and the second deflection unit increases. Therefore, when the deflection unit is formed separately on the two glass plates, the number of stacks becomes ½, and a variation in characteristic can be reduced.

Figure 44B:
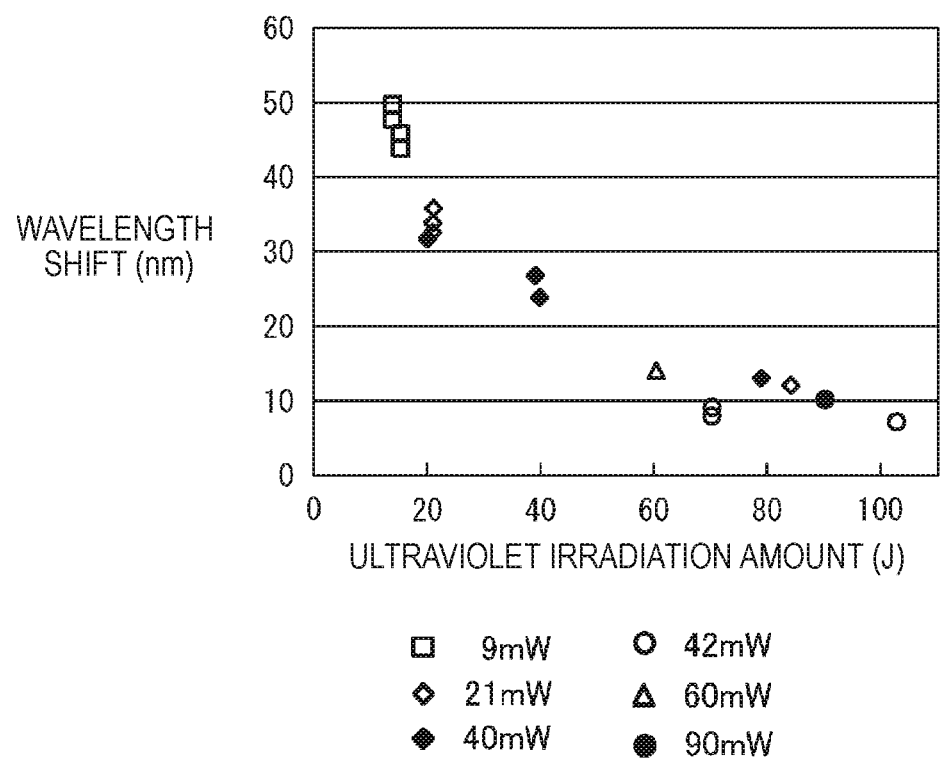
FIG. 44B is a graph illustrating a relation between an irradiation amount of an energy line and a change amount of a slant angle after heating.

The irradiation of the energy lines may be performed on the basis of an appropriate method in accordance with an energy line irradiation device to be used (for example, an ultraviolet lamp). The heating method may also be performed by an appropriate method of using a heating lamp, a hot plate, or a heating oven, and a heating temperature and a heating time may be appropriately decided in accordance with a material of forming a photosensitive material layer. In general, as illustrated in FIG. 44B, as an amount of energy applied to the photosensitive material layer by the irradiation of the energy lines increases, an amount of change in the slant angle after the heating decreases. It is desirable to appropriately decide a wavelength, irradiation energy, an irradiation time, and the like of ultraviolet light to be used in accordance with a characteristic of the photosensitive material. Electron beams can also be used as the energy lines.

A transparent protecting member may be arranged so that the hologram diffraction grating does not come into direct contact with the atmosphere for protection of the hologram diffraction grating. Specifically, an outer edge of the light guide plate and an outer edge of the transparent protecting member may be sealed or bonded by a sealing member. As the sealing member which is also called a sealing agent, various kinds of resin such as thermosetting resin, photo-curable resin, moisture curable resin, and anaerobic curable resin such as epoxy resin, urethane resin, acrylic resin, vinyl acetate type resin, ethylene resin, silicone resin, and modified polymer resin can be used.

The optical device can be manufactured, for example, by the following method. (A-1) A first hologram diffraction grating and a third hologram diffraction grating are formed on a first surface of a manufacturing substrate (which doubles as a support in some instances). (A-2) A second hologram diffraction grating is formed on a second surface of the manufacturing substrate. (A-3) The first hologram diffraction grating and the third hologram diffraction grating formed on the first surface of the manufacturing substrate are transferred onto a first surface of a light guide plate, and the second hologram diffraction grating formed on the second surface of the manufacturing substrate is transferred onto a second surface of the light guide plate. Here, the support will be described later.

Alternatively, (B-1) A first hologram diffraction grating and a third hologram diffraction grating are formed on a first surface of a light guide plate. (B-2) A second hologram diffraction grating is formed on a manufacturing substrate (which doubles as a support in some instances). (B-3) The second hologram diffraction grating formed on the manufacturing substrate is transferred onto a second surface of the light guide plate.

Alternatively, (C-1) A second hologram diffraction grating is formed on a second surface of a light guide plate. (C-2) A first hologram diffraction grating and a third hologram diffraction grating are formed on a manufacturing substrate (which doubles as a support in some instances). (C-3) The first hologram diffraction grating and the third hologram diffraction grating formed on the manufacturing substrate are transferred onto a first surface of the light guide plate.

Alternatively, (D-1) A first hologram diffraction grating and a third hologram diffraction grating are formed on a first manufacturing substrate. (D-2) A second hologram diffraction grating is formed on a second manufacturing substrate (which doubles as a support in some instances). (D-3) The first hologram diffraction grating and the third hologram diffraction grating formed on the first manufacturing substrate are transferred onto a first surface of a light guide plate, and the second hologram diffraction grating formed on the second manufacturing substrate is transferred onto a second surface of the light guide plate.

Alternatively, (E-1) A first hologram diffraction grating is formed on a first manufacturing substrate. (E-2) A second hologram diffraction grating is formed on a second manufacturing substrate (which doubles as a support in some instances). (E-3) A third hologram diffraction grating is formed on a third manufacturing substrate. (E-4) The first hologram diffraction grating formed on the first manufacturing substrate and the third hologram diffraction grating formed on the third manufacturing substrate are transferred onto a first surface of a light guide plate, and the second hologram diffraction grating formed on the second manufacturing substrate is transferred onto a second surface of the light guide plate.

In the image display device, the image forming apparatus may be configured to have a plurality of pixels arranged in a two-dimensional matrix form. Here, a configuration of such an image forming apparatus is referred to as an "image forming apparatus of a first configuration" for the sake of convenience.

Examples of the image forming apparatus of the first configuration include an image forming apparatus configured with a reflective spatial light modulator and a light source, an image forming apparatus configured with a transmissive spatial light modulator and a light source, an image forming apparatus configured with an inorganic electro luminescence (EL) element or an inorganic EL element, an image forming apparatus configured with an inorganic EL, an image forming apparatus configured with a light emitting diode (LED), and an image forming apparatus configured with a semiconductor laser element. Among the image forming apparatuses, it is desirable to use the image forming apparatus configured with the LED or the image forming apparatus configured with the reflective spatial light modulator and the light source. In the display device according to the third aspect of the present disclosure, it is desirable to use the image forming apparatus configured with the spatial light modulator and the light source. As the spatial light modulator, a light valve, for example, a transmissive or reflective liquid crystal display device such as a liquid crystal on silicon (LCOS) or a digital micro mirror device (DMD) may be used, and as the light source, the light emitting element may be used. Furthermore, the reflective spatial light modulator may be configured with a polarizing beam splitter that reflects part of the light from the liquid crystal display device and the light source, guides the light to the liquid crystal display device, and transmits part of the light reflected by the liquid crystal display device, and guides the light to an optical system. As the light emitting element constituting the light source, a red light emitting element, a green light emitting element, a blue light emitting element, and a white light emitting element may be used, or white light may be obtained by mixing red light, green light, and blue light emitted from a red light emitting element, a green light emitting element, and a blue light emitting element using a light valve and then performing brightness uniformization. Examples of the light emitting element include a semiconductor laser element, a solid state laser, and an LED. It is desirable to decide the number of pixels on the basis of a specification required in the image display device, and specific values of the number of pixels include 320×240, 432×240, 640×480, 854×480, 1024×768, and 1920×1080. A collimating optical system to be described later has a function of converting position information of a pixel into angle information in a light guide unit. As the collimating optical system, a system having positive optical power as a whole which is configured with one or more of a convex lens, a concave lens, a free-form surface prism, and a hologram lens may be used.

Alternatively, in the image display device, the image forming apparatus may be equipped with a light source and a scanning unit that scans parallel light emitted from the light source. Further, for the sake of convenience, a configuration of such an image forming apparatus is referred to as an "image forming apparatus of a second configuration."

As the light source in the image forming apparatus of the second configuration, the light emitting element may be used, and specifically, a red light emitting element, a green light emitting element, a blue light emitting element, and a white light emitting element may be used, or white light may be obtained by mixing red light, green light, and blue light emitted from a red light emitting element, a green light emitting element, and a blue light emitting element using a light valve and then performing brightness uniformization. Examples of the light emitting element include a semiconductor laser element, a solid state laser, and an LED. In the image forming apparatus of the second configuration, it is desirable to decide the number of pixels (virtual pixels) on the basis of a specification required in the image display device, and specific values of the number of pixels include 320×240, 432×240, 640×480, 854×480, 1024×768, and 1920×1080. Further, in the case in which a color image display is performed, when the light source is configured with the red light emitting element, the green light emitting element, and the blue light emitting element, it is desirable to perform color combination, for example, using a cross prism. As the scanning unit, a micro electro mechanical systems (MEMS) mirror or a galvanomirror that horizontally and vertically scans the light emitted from the light source and has a micro mirror rotatable in a two-dimensional direction may be used. A relay optical system to be described below may be configured with a well-known relay optical system.

In the image forming apparatus of the first configuration or the image forming apparatus of the second configuration, light converted into a plurality of parallel light is incident to the light guide plate through the optical system (which is an optical system that converts incident light into parallel light and may be referred to as a "parallel light emitting optical system," and specifically, for example, a collimating optical system or a relay optical system), but a request for the parallel light is based on that it is necessary to store optical wavefront information when the light is incident on the light guide plate even after it is emitted from the light guide plate via the first deflection unit and the second deflection unit. In order to generate a plurality of parallel light, specifically, for example, it is desirable to position, for example, a light emitting portion of the image forming apparatus at a position of a front focal point in the parallel light emitting optical system. The parallel light emitting optical system has a function of converting the position information of the pixel into the angle information in the optical system of the optical device. As the parallel light emitting optical system, an optical system having positive optical power as a whole which is configured with one or more of a convex lens, a concave lens, a free-form surface prism, and a hologram lens may be used. A light shielding part having an opening may be arranged between the parallel light emitting optical system and the light guide plate in order to prevent undesired light from being emitted from the parallel light emitting optical system and being incident on the light guide plate.

Alternatively, for example, as the image forming apparatus or the light source configured with the light emitting element and the light valve, in addition to a combination of a backlight that emits white light as a whole and a liquid crystal display device including red light emitting pixels, green light emitting pixels, and blue light emitting pixels, the following configurations can be provided.

[Image Forming Apparatus-A]

An image forming apparatus-A includes (α) a first imaging apparatus including a first light emitting panel in which first light emitting elements emitting blue light are arranged in a two-dimensional matrix form, (β) a second imaging apparatus including a second light emitting panel in which second light emitting elements emitting green light are arranged in a two-dimensional matrix form, (γ) a third imaging apparatus including a third light emitting panel in which third light emitting elements emitting red light are arranged in a two-dimensional matrix form, and (δ) a device (for example, a dichroic prism. The same in the following description) that combines the light emitted from the first imaging apparatus, the light emitted from the second imaging apparatus, and the light emitted from the third imaging apparatus into one optical path, wherein a light emitting/non-emitting state of each of the first light emitting element, the second light emitting element, and the third light emitting element is controlled.

[Image Forming Apparatus-B]

An image forming apparatus-B includes (α) a first image forming apparatus including a first light emitting element that emits blue light and a first light passing control device that controls transmission/non-transmission of emission light emitted from the first light emitting element emitting the blue light (a sort of light valve and configured with, for example, a liquid crystal display device, a digital micro mirror device (DMD), or an LCOS. The same in the following description), (β) a second image forming apparatus including a second light emitting element that emits green light and a second light passing control device that controls transmission/non-transmission of emission light emitted from the second light emitting element emitting the green light, (γ) a third image forming apparatus including a third light emitting element that emits red light and a third light passing control device that controls transmission/non-transmission of emission light emitted from the third light emitting element emitting the red light, and (δ) a device that combines light passing through the first light passing control device, light passing through the second light passing control device, and light passing through the third light passing control device into one optical path, wherein, an image is displayed by controlling the transmission/non-transmission of the emission light emitted from the light emitting elements through the light passing control device. A light guide member, a microlens array, a mirror or a reflector, or a condenser lens may be used as a device (a light guide member) that guides the emission light emitted from the first light emitting element, the emission light emitted the second light emitting element, and the emission light emitted from the third light emitting element to the light passing control device.

[Image Forming Apparatus-C]

An image forming apparatus-C includes (A) a first image forming apparatus including a first light emitting panel in which first light emitting elements emitting blue light are arranged in a two-dimensional matrix form and a blue light passing control device (light valve) that controls transmission/non-transmission of emission light emitted from the first light emitting panel, (B) a second image forming apparatus including a second light emitting panel in which second light emitting elements emitting green light are arranged in a two-dimensional matrix form and a green light passing control device (light valve) that controls transmission/non-transmission of emission light emitted from the second light emitting panel, (γ) a third image forming apparatus including a third light emitting panel in which third light emitting elements emitting red light are arranged in a two-dimensional matrix form and a red light passing control device (light valve) that controls transmission/non-transmission of emission light emitted from the third light emitting panel, and (δ) a device that combines light passing through the blue light passing control device, light passing through the green light passing control device, and light passing through the red light passing control device into one light path, wherein an image is displayed by controlling the transmission/non-transmission of the emission light emitted from the first light emitting panel, the emission light emitted from the second light emitting panel, and the emission light emitted from the third light emitting panel through the light passing control devices (light valves).

[Image Forming Apparatus-D]

An image forming apparatus-D is a color display image forming apparatus of a field sequential scheme, and includes (α) a first imaging apparatus including a first light emitting element that emits blue light, (β) a second imaging apparatus including a second light emitting element that emits green light, (γ) a third imaging apparatus including a third light emitting element that emits red light, (δ) a device that combines the lights emitted from the first imaging apparatus, the lights emitted from the second imaging apparatus, and the lights emitted from the third imaging apparatus into one optical path, (ε) a light passing control device (light valve) that controls transmission/non-transmission of light emitted from the device that combines into one optical path, wherein an image is displayed by controlling the transmission/non-transmission of the emission light emitted from the light emitting elements through the light passing control device.

[Image Forming Apparatus-E]

An image forming apparatus-E is also a color display image forming apparatus of a field sequential scheme, and includes (α) a first imaging apparatus including a first light emitting panel in which first light emitting elements emitting blue light are arranged in a two-dimensional matrix form, (β) a second imaging apparatus including a second light emitting panel in which second light emitting elements emitting green light are arranged in a two-dimensional matrix form, (γ) a third imaging apparatus including a third light emitting panel in which third light emitting elements emitting red light are arranged in a two-dimensional matrix form, (δ) a device that combines the light emitted from the first imaging apparatus, the light emitted from the second imaging apparatus, and the light emitted from the third imaging apparatus into one optical path, (ε) a light passing control device (light valve) that controls transmission/non-transmission of light emitted from the device that combines into one optical path, wherein an image is displayed by controlling the transmission/non-transmission of the emission light emitted from the light emitting panels through the light passing control device.

[Image Forming Apparatus-F]

An image forming apparatus-F is a passive matrix type or active matrix type color display image forming apparatus that displays an image by controlling light emitting/non-light emitting states of a first light emitting element, a second light emitting element, and a third light emitting element.

[Image Forming Apparatus-G]

An image forming apparatus-G is a color display image forming apparatus of a field sequential scheme that includes a light passing control device (light valve) that controls transmission/non-transmission of emission light emitted from light emitting element units arranged in a two-dimensional matrix form, and displays an image by controlling the light emitting/non-emitting states of a first light emitting element, a second light emitting element, and a third light emitting element in the light emitting unit in a time division manner and controlling transmission/non-transmission of emission light emitted from the first light emitting element, emission light emitted from the second light emitting element, and emission light emitted from the second light emitting element through the light passing control device.

The light guide plate has two parallel surfaces (a first surface and a second surface) extending in parallel to an axis line of the light guide plate (a longitudinal direction, or a horizontal direction which is referred to as an "x axis" for the sake of convenience). A width direction (a height direction or a vertical direction) of the light guide plate is referred to as a "y axis" for the sake of convenience. When a surface of the light guide plate on which light is incident is defined to be a light guide plate incidence surface, and a surface of the light guide plate from which light exits is a light guide plate emission surface, the light guide plate incidence surface and the light guide plate emission surface may be configured with the second surface or the light guide plate incidence surface may be configured with the second surface, and the light guide plate emission surface may be configured with the first surface. The interference fringe of the hologram diffraction grating generally extends in parallel to the y axis.

As the material of forming the light guide plate, quartz glass, optical glass such as BK7 or SK5, soda lime glass (blue sheet glass), white sheet glass, borosilicate glass, various tempered glasses, or glass that has undergone chemical treatment (for example, various types of glass including gorilla (registered trademark) and Eagle XG (registered trademark) available from Corning Co., Ltd) may be used. By applying chemical treatment, it is possible to increase a specific ion density and enhance a glass plate. Alternatively, as a material of forming the light guide plate, a plastic material (for example, PMMA, polycarbonate resin, acrylic resin, amorphous polypropylene resin, or styrene resin including AS resin) may be used. A shape of the light guide plate is not limited to a flat plate and may have a curved shape. As a material of forming the support, a material of forming the light guide plate, other plastic films, or a dicing tape (dicing film) may be used.

A light shielding member may be arranged outside the first surface of the light guide plate so as to cover the first deflection unit. In this case, an orthogonal projection image of the first deflection unit to the light guide plate can be included in an orthogonal projection image of the light shielding member to the light guide plate.

Alternatively, a light shielding member that shields incidence of external light to the optical device may be arranged in a region of the optical device on which the light emitted from the image forming apparatus is incident. Since the light shielding member which shields the incidence of external light on the optical device is disposed in the region of the optical device on which the light emitted from the image forming apparatus is incident, external light does not enter the region of the optical device in which the light emitted from the image forming apparatus is incident, and the like, and thus it is possible to prevent generation of undesirable stray light or the like from being generated and a deterioration of an image display quality in the display device. Here, it is desirable that the region of the optical device on which the light emitted from the image forming apparatus is incident is included in the orthogonal projection image of the light shielding member to the optical device.

Specifically, the light shielding member may be arranged on the first surface side of the light guide plate, apart from the optical device. In the display device having such a configuration, the light shielding member may be made of, for example, an opaque plastic material. The light shielding member may extend integrally from a housing of the image display device, may be attached to the housing of the image display device, may extend integrally from the frame, or may be attached to the frame. Alternatively, the light shielding member may be attached to the optical device, may be attached to or arranged on a portion of the optical device opposite the side on which the image forming apparatus is disposed, and the light shielding member may be arranged in a dimmer to be described below. In this case, it is desirable that the orthogonal projection image of an end portion of the dimmer to the optical device be included in the orthogonal projection image of the light shielding member to the optical device. For example, the light shielding member made of an opaque material may be formed on the surface of the optical device on the basis of a physical vapor deposition (PVD) technique or a chemical vapor deposition (CVD) technique, may be formed by a printing technique or the like, or a film, a sheet, or a foil made of an opaque material (a plastic material, a metal material, an alloy material, or the like) may be bonded. It is desirable that the projection image of the end portion of the dimmer to the optical device be included in the projection image of the light shielding member to the optical device.

The dimmer may be arranged on the first surface side of the light guide plate. For example, the dimmer includes
 a first substrate,
 a second substrate which is opposite to the first substrate,
 a first transparent electrode disposed on an opposite surface of the first substrate which is opposite to the second substrate,
 a second transparent electrode disposed on an opposing surface of the second substrate which is opposite to the first substrate, and
 a dimming layer which is sandwiched between the first transparent electrode and the second transparent electrode. In this case, for example,
 the first transparent electrode is configured with a plurality of band-like first transparent electrode segments extending in a first direction,
 the second transparent electrode is configured with a plurality of band-like second transparent electrode segments extending in a second direction different from the first direction,
 control of a light shielding ratio of a portion of the dimmer corresponding to an overlapping region of the first transparent electrode segment and the second transparent electrode segment (a minimum unit region in which the light shielding ratio of the dimmer varies) is performed on the basis of control of a voltage to be applied to the first transparent electrode segment and the second transparent electrode segment. In other words, the light shielding ratio is controlled on the basis of a simple matrix scheme. The first direction and the second direction may be orthogonal to each other.

Alternatively, a thin film transistors (TFT) may be disposed in each of the minimum unit regions for controlling the light shielding ratio of the minimum unit regions in which the light shielding ratio of the dimmer varies. In other words, the light shielding ratio may be controlled on the basis of an active matrix method. Alternatively, at least one of the first transparent electrode and the second transparent electrode may be a so-called solid electrode (an electrode which is not patterned).

The light guide plate may be configured to double as the first substrate, and through this configuration, it is possible to reduce the weight of the entire display device, and there is no possibility that the user of the display device has an uncomfortable feeling. The second substrate can be formed to be thinner than the first substrate. In the display device equipped with the dimmer, the size and the position of an actual dimming region of the dimmer are decided on the basis of a signal for displaying an image in the image forming apparatus. The size of the dimmer may be the same as, larger than, or smaller than the light guide plate. In short, it is desirable the second deflection unit (or the virtual image formation region) be located in the orthogonal projection image of dimmer.

A maximum light transmittance of the dimmer is 50% or more, and a minimum light transmittance of the dimmer is 30% or less. Further, an upper limit of the maximum light transmittance of the dimmer may be 99%, and the lower limit of the minimum light transmittance of the dimmer may be 1%. Here, a relation of (light transmittance)=1−(light shielding ratio) is held.

In some instances, the light passing through the dimmer may be colored in desired color through the dimmer. In this case, a color to be colored through the dimmer may be variable, or a color to be colored through the dimmer may be fixed. In the former case, for example, a dimmer in which red coloring is performed, a dimmer in which green coloring is performed, and a dimmer in which blue coloring is performed may be stacked. In the latter case, brown may be used as the color to be colored through the dimmer which is not limited thereto.

Further, in some instances, the dimmer may be detachably arranged. In order to detachably dispose the dimmer, for example, the dimmer may attached to the frame, for example, using a screw made of a transparent plastic, or a groove may be formed in the frame, and the dimmer may be engaged with the groove, or the dimmer may be attached to the frame by attaching a magnet to the frame, or a slide part may be attached in the frame, and the dimmer may be inserted into the slide part. Further, it is desirable that a connector be attached to the dimmer, and the dimmer be electrically connected to a control circuit that controls the light shielding ratio (light transmittance) of the dimmer (which is included in, for example, a control device that controls the image forming apparatus and a moving device) via the connector and the wiring. The dimmer may be curved.

The display device and the like according to the present disclosure equipped with dimmer may further include an environmental illuminance measuring sensor which measures illuminance of an environment in which the display device is placed, and the light shielding ratio of the dimmer may be controlled on the basis of a measurement result of the environmental illumination distance measuring sensor. Alternatively, the display device and the like according to the present disclosure equipped with dimmer may further include an environmental illuminance measuring sensor that measures illuminance of an environment in which the display device is placed, and brightness of an image formed by the image forming apparatus may be controlled on the basis of a measurement result of the environmental illuminance measuring sensor. The above configurations may be combined.

Alternatively, the display device and the like according to the present disclosure equipped with the dimmer may further include a transmitted light illuminance measuring sensor that measures illuminance based on light passing through the dimmer from an external environment, and the light shielding ratio of the dimmer may be controlled on the basis of a measurement result of the transmitted light illuminance measuring sensor. Alternatively, the display device and the like according to the present disclosure equipped with the dimmer may further include a transmitted light illuminance measuring sensor that measures illuminance based on light passing through the dimmer from an external environment, and brightness of an image formed by the image forming apparatus may be controlled on the basis of a measurement result of the transmitted light illuminance measuring sensor. It is desirable that the transmitted light illuminance measuring sensor be arranged on the observer side rather than the optical device. At least two transmitted light illuminance measuring sensors may be arranged to measure illuminance based on light passing through a portion with a high light shielding ratio and measure illuminance based on light passing through a portion with a low light shielding ratio. The above configurations may be combined. Further, the above configurations may be combined with a configuration in which control is performed on the basis of the measurement result of the environmental illuminance measuring sensor.

The environmental illuminance measuring sensor and the transmitted light illuminance measuring sensor may be configured with well-known illuminance sensors, and the control of the environmental illuminance measuring sensor and the control of the transmitted light illuminance measuring sensor may be performed on the basis of a well-known control circuit.

As described above, the optical device is a semi-transmissive type (see-through type). Specifically, at least a part of the optical device facing the pupil of the observer may be semi-transmissive (see-through), and the outside can be seen through this part of the optical device (and the dimmer when the dimmer is arranged). The display device and the like according to the present disclosure may have one image display device (monocular type) or two image display devices (binocular type). When the dimmer is arranged, in the binocular type, on the basis of a signal for displaying an image, the light transmittance of some regions of the dimmer may be changed in both the image display devices, or the light transmittance of some regions of the dimmer may be changed in one image display device. In this specification, a term "semi-transmissive" may be used, but it does not mean that half or (50%) of incident light is transmitted or reflected and means that a part of incident light is transmitted, and the rest of the light is reflected.

When the dimmer is provided, the dimmer may be arranged in the front section. Further, the optical device may be attached to the dimmer. The optical device may be attached to the dimmer in close contact or may be attached to the dimmer in a state with a gap therebetween. Further, the dimmer may be fitted in a rim. Alternatively, at least one of the first substrate and the second substrate may be attached to, for example, the frame. However, the present disclosure is not limited thereto. From the observer side, the optical device and the dimmer may be arranged in the described order, or the dimmer and the optical device may be arranged in the described order.

In the display device and the like according to the present disclosure, the frame may be configured with a front section arranged in front of the observer and two temple sections pivotably attached to both ends of the front section via hinges. A modern section is attached to a leading end of each temple section. The front section may have a rim. The image display device is attached to the frame, but specifically, for example, the image forming apparatus is preferably attached to the temple section. Further, the front section and the two temple sections are integrally formed. In other words, when the entire display device and the like according to the present disclosure is viewed, the frame has substantially the same structure as ordinary glasses. The material of forming the frame including the pad portion may be made of the same material as a material of forming ordinary eyeglasses such as metal, alloy, plastic, or a combination thereof. Furthermore, a nose pad may be attached to the front section. In other words, when the display device and the like according to the present disclosure is viewed, an assembly of the frame (which may include the rim) and the nose pad has substantially the same structure as ordinary glasses. The nose pad may have a well-known configuration and structure.

Further, in the display device and the like according to the present disclosure, in terms of a design or easiness of installation, it is desirable that wirings (signal lines, power lines, and the like) from one or two image forming apparatuses extend from the leading end of the modern section to the outside via the inside of the temple section and the modern section and be connected to the control device (the control circuit or the control unit). Furthermore, each image forming apparatus may include a headphone unit, and a headphone unit wiring from each image forming apparatus may extend from the leading end of the modern section to the headphone unit via the inside of the temple section and the modern section. As the headphone unit, for example, an inner ear type headphone unit or a canal type headphone unit may be used. More specifically, it is desirable that the headphone unit wiring extend from the leading end of the modern section to the headphone unit so as to go around behind an auricle (an ear shell).

An imaging device may be attached to a middle portion of the front section. Specifically, the imaging device is configured with, for example, a solid-state imaging element including a CCD sensor or a CMOS sensor and a lens. For example, preferably, a wiring from the imaging device is connected to one image display device (or image forming apparatus) via, for example, the front section and included in a wiring extending from the image display device (or the image forming apparatus). The imaging device may be attached to the middle portion or the end portion of the frame or may be attached to the temple section.

Light beams which are emitted from the center of the image forming apparatus and pass through a nodal point of the image forming apparatus side are referred to as "central light beams," and among the central light beams, light beams that are vertically incident on the optical device are referred to as "central incident light beams."

Then, a point in which the central incident light beams are incident on the optical device is referred to as an "optical device center point," an axis line which passes through the optical device center point and is parallel to an axial direction of the optical device is referred to as an "x axis," and an axis line which passes through the optical device center point and is parallel to a normal line of the optical device is referred to as a "z axis."

An axis orthogonal to the x axis and the z axis is a y-axis, and an orthogonal coordinate system is formed by the x-axis, the y-axis, and the z-axis. In the display device and the like according to the present disclosure, a horizontal direction is a direction parallel to the x axis and hereinafter also referred to as an "x axis direction."

Here, the optical system is arranged between the image forming apparatus and the optical device, and coverts the light emitted from the image forming apparatus into parallel light. Then, the light beams converted into the parallel light by the optical system are incident on the optical device, guided, and emitted. Further, a center point of the first deflection unit is referred to as an "optical device center point."

Alternatively, when the display device is a binocular type,

The light guide plate is arranged closer to the center side of the observer's face than the image forming apparatus as a whole, A coupling member that couples the two image display devices is provided, the coupling member is attached to the side of the middle part of the frame which is located between the two pupils of the observer and faces the observer. The projection image of the coupling member may be included in the projection image of the frame.

As described above, since the structure in which the coupling member is attached to the middle portion of the frame located between the two pupils of the observer is employed, that is, unless the image display device has the structure attached to directly the frame, when the observer wears the frame on the head, the temple section spreads outward, and as a result, even when the frame is deformed, the image forming apparatus suffers no displacement (position change) caused by the deformation of the frame, and although the displacement occurs, it is extremely small. Therefore, it is possible to reliably prevent a convergence angle of left and right images from changing. Further, since there is no need to increase the rigidity of the front section of the frame, an increase in weight of the frame, deterioration in design property, and a cost increase are not caused. Further, since the image display device is not attached directly to the glasses type frame, it is possible to freely select a design or a color of the frame in accordance with the preference of the observer, and constraints to the design of the frame are also are small, and a degree of freedom of design is high. Further, the coupling member is located between the observer and the frame, and the projection image of the coupling member is included in the projection image of the frame. In other words, when the head-mounted display is viewed in the front of the observer, coupling member is hidden by the frame. Therefore, it is possible to implement the head mounted display with high design property.

The coupling member is preferably attached to the side of the middle portion of the front section facing the observer (corresponding to the bridge on the ordinary glasses) located between the two pupils of the observer.

Further, although the two image display devices are coupled by the coupling member, specifically, the image forming apparatus may be attached to each end portion of the coupling member so that a mounting state can be adjusted. In this case, it is desirable that each image forming apparatus be located more outward than the pupil of the observer. Furthermore, through this configuration, if a distance between a mounting portion center of one image forming apparatus and one end portion (one end) of the frame is indicated by $\alpha$, a distance from a center of the coupling member to one end portion (one end) of the frame is indicated by $\beta$, a distance between a mounting portion center of the other image forming apparatus and one end portion (one end) of the frame is indicated by $\gamma$, and a length of the frame is indicated by L, it is desirable to satisfy $0.01 \times L \leq \alpha \leq 0.30 \times L$, preferably, $0.05 \times L \leq \alpha \leq 0.25 \times L$, $0.35 \times L \leq \beta \leq 0.65 \times L$, preferably, $0.45 \times L \leq \beta \leq 0.55 \times L$, $0.70 \times L \leq \gamma \leq 0.99 \times L$, preferably, $0.75 \times L \leq \gamma \leq 0.95 \times L$. Specifically, the mounting of the image forming apparatus to each end portions of the coupling member is carried out, for example, such that through holes are formed at three positions on each of the end portions of the coupling member, threaded portions corresponding to the through holes are formed in the image forming apparatus, and screws are inserted into the respective through holes and screwed into the threaded portion formed in the image forming apparatus. A spring is inserted between the screw and the threaded portion. Thus, it is possible to adjust the mounted state of the image forming apparatus (an inclination of the image forming apparatus with respect to the coupling member), depending on a tightened state of the screw.

Here, the mounting portion center of the image forming apparatus refers a middle point of a portion in which a projection image of the image forming apparatus obtained when the image forming apparatus and the frame are projected onto a virtual plane in a state in which the image forming apparatus is attached to the coupling member overlaps the projection image of the frame in the axial direction of the frame. The center of the coupling member refers to a middle point of a portion in which the coupling member is in contact with the frame in a state in which the coupling member is attached to the frame in the axial direction of the frame. The length of the frame is the length of the projection image of the frame when the frame is curved. A projection direction is a direction vertical to the face of the observer.

Alternatively, the two image display devices are coupled through the coupling member, but specifically, the coupling member may couple the two light guide plates. Here, there are cases in which the two light guide plates are integrally manufactured, and in this case, the coupling member is attached to the integrally manufactured light guide plate, but such a configuration is also included in a configuration in which the coupling member couples the two light guide plates. If the distance between the center of one image forming apparatus and one end of frame is $\alpha'$ and the distance between the center of the other image forming apparatus and one end of the frame is $\gamma'$, it is desirable that values of $\alpha'$ and $\gamma'$ be set to be the same as the values of $\alpha$ and $\gamma$ described above. Here, the center of the image forming apparatus refers to a middle point of a portion in which a projection image of the image forming apparatus obtained when the image forming apparatus and the frame are projected onto a virtual plane in a state in which the image forming apparatus is attached to the light guide plate overlaps the projection image of the frame in the axial direction of the frame.

A shape of the coupling member is inherently arbitrary as long as the projection image of the coupling member is included in the projection image of the frame, and for example, a bar shape or an elongated plate shape may be used. A material of forming the coupling member may be metal, alloy, plastic, or a combination thereof.

Meanwhile, in the optical device and the like according to the first and second aspects of the present disclosure in which the first hologram diffraction grating is arranged on one surface of the light guide plate, and the second hologram diffraction grating is arranged on the other surface, it is necessary to accurately align the first hologram diffraction grating with the second hologram diffraction grating. Particularly, it is important to control and manage a degree of parallelization between an extension direction of the first interference fringe formed in the first hologram diffraction grating and an extension direction of the second interference fringe formed in the second hologram diffraction grating.

As described above, in the preferable configuration of the optical device and the like according to the first and second aspects of the present disclosure, the first hologram diffraction grating has a first interference fringe forming region in which a first interference fringe is formed and alignment marks that are disposed outside the first interference fringe forming region, and the second hologram diffraction grating has a second interference fringe forming region in which a second interference fringe is formed and alignment marks that are disposed outside the second interference fringe forming region, but more specifically, in the optical device, the first hologram diffraction grating has the first interference fringe forming region in which the first interference fringe is formed, and the second hologram diffraction grating has the second interference fringe forming region in which the second interference fringe is formed, in the first hologram diffraction grating, on an outer side of the first interference fringe forming region in the direction in which the first interference fringe extends, a 1A-th alignment mark and a 1B-th alignment mark are disposed to face each other with the first interference fringe forming region interposed therebetween, in the second hologram diffraction grating, on an outer side of the second interference fringe forming region in the direction in which the second interference fringe extends, a 2A-th alignment mark and a 2B-th alignment mark are disposed to face each other with the second interference fringe forming region interposed therebetween, the same interference fringe as the interference fringe formed in the first interference fringing forming region is formed in the 1A-th alignment mark and the 1B-th alignment mark, and the same interference fringe as the interference fringe formed in the second interference fringe forming region is formed in the 2A-th alignment mark and the 2B-th alignment mark. Further, there may be provided a configuration in which in a state in which a relative alignment between the first hologram diffraction grating and the second hologram diffraction grating is completed, the 1A-th alignment mark and the 2A-th alignment mark have shapes in which the 1A-th alignment mark and the 2A-th alignment mark do not overlap, and the 1B-th alignment mark and the 2B-th alignment mark have shapes in which the 1B-th alignment mark and the 2B-th alignment mark do not overlap, and in a state in which a relative alignment between the first hologram diffraction grating and the second hologram diffraction grating is completed, the 1A-th alignment mark and the 2A-th alignment mark are arranged at positions at which the 1A-th alignment mark and the 2A-th alignment mark do not overlap, and the 1B-th alignment mark and the 2B-th alignment mark are arranged at positions at which the 1B-th alignment mark and the 2B-th alignment mark do not overlap.

The hologram diffraction grating having the interference fringe forming region in which the interference fringe is formed may have a configuration in which the two alignment marks are disposed to face each other with the interference fringe forming regions interposed therebetween on the outer sides and of the interference fringe forming regions in the direction in which the interference fringe extends, in each of the alignment marks, the same interference fringe as the interference fringe formed in the interference fringe forming region is formed, and the plan shape of each of the alignment marks is an annular shape (a ring shape).

In a method of assembling the optical device according to the first or second aspect, the first hologram diffraction grating has the first interference fringe forming region in which the first interference fringe is formed, the second hologram diffraction grating has the second interference fringe forming region in which the second interference fringe is formed, in the first hologram diffraction grating, on an outer side of the first interference fringe forming region in the direction in which the first interference fringe extends, a 1A-th alignment mark and a 1B-th alignment mark are disposed to face each other with the first interference fringe forming region interposed therebetween, and in the second hologram diffraction grating, on an outer side of the second interference fringe forming region in the direction in which the second interference fringe extends, a 2A-th alignment mark and a 2B-th alignment mark are disposed to face each other with the second interference fringe forming region interposed therebetween.

A method of assembling the optical device according to the first aspect may include optically detecting the 1A-th alignment mark and the 2A-th alignment mark and optically detecting the 1B-th alignment mark and the 2B-th alignment mark, obtaining a first straight line connecting the 1A-th alignment mark and the 1B-th alignment mark and obtaining a second straight line connecting the 2A-th alignment mark and the 2B-th alignment mark, and performing a relative alignment of the first hologram diffraction grating and the second hologram diffraction grating so that an angle formed by the first straight line and the second straight line when the first straight line and the second straight line are projected onto a virtual plane is within a specified value.

Further, a method of assembling the optical device according to the second aspect may include forming the same interference fringe as the interference fringe formed in the first interference fringing forming region in the 1A-th alignment mark and the 1B-th alignment mark, forming the same interference fringe as the interference fringe formed in the second interference fringe forming region in the 2A-th alignment mark and the 2B-th alignment mark, and in a state in which the second hologram diffraction grating is supported by a support, causing light to be incident on the light guide plate from an end surface of the light guide plate, optically detecting light diffracted and reflected by the 1A-th alignment mark and the 1B-th alignment mark, causing light to be incident on the support from an end surface of the support, optically detecting light diffracted and reflected by the 2A-th alignment mark and the 2B-th alignment mark, and performing a relative alignment of the first hologram diffraction grating and the second hologram diffraction grating.

Further, an alignment device includes a stage that is movable in an X direction, a Y direction, and a Z direction and is rotatable on an XY plane, a first light source (first alignment light source) that causes light to be incident on a light guide plate from an end surface of the light guide plate placed on the stage and a first hologram diffraction grating is arranged, a second light source (second alignment light source) that causes light to be incident on a support from an end surface of the support supporting a second hologram diffraction grating above the first hologram diffraction grating, a first imaging device that detects an optical image of the 1A-th alignment mark based on the light which is incident from the first light source and diffracted and reflected by the 1A-th alignment mark disposed in the first hologram diffraction grating and an optical image of an optical image of the 2A-th alignment mark based on the light which is incident from the second light source and diffracted and reflected by the 2A-th alignment mark disposed in the second hologram diffraction grating, and a second imaging device that detects an optical image of the 1B-th alignment mark based on the light which is incident from the first light source and diffracted and reflected by the 1B-th alignment mark disposed in the first hologram diffraction grating and an optical image of an optical image of the 2B-th alignment mark based on the light which is incident from the second light source and diffracted and reflected by the 2B-th alignment mark disposed in the second hologram diffraction grating.

As described above, in the method of assembling the optical device according to the first aspect, the first straight line connecting the 1A-th alignment mark with the 1B-th alignment mark is obtained, the second straight line connecting the 2A-th alignment mark with the 2B-th alignment mark is obtained, and the relative alignment of the first hologram diffraction grating and the second hologram diffraction grating is performed so that the angle formed by the first straight line and the second straight line when the first straight line and the second straight line are projected onto the virtual plane is within a specified value. Therefore, the relative alignment between the first hologram diffraction grating and the second hologram diffraction grating can be performed on the basis of a simplified method. Further, in the method of assembling the optical device according to the second aspect, in the state in which the second hologram diffraction grating is supported by the support, the light is caused to be incident on the light guide plate from the end surface of the light guide plate, the light diffracted and reflected by the 1A-th alignment mark and the 1B-th alignment mark is optically detected, and light is caused to be incident on the support from the end surface of the support, the light diffracted and reflected by the 2A-th alignment mark and the 2B-th alignment mark is optically detected, and the relative alignment of the first hologram diffraction grating and the second hologram diffraction grating is performed. Therefore, the relative alignment of the first hologram diffraction grating and the second hologram diffraction grating can be performed on the basis of the simplified method. Furthermore, in the above hologram diffraction grating, the same interference fringe as the interference fringe formed in the interference fringe forming region is formed in the alignment mark, the plane shape of the alignment mark is annular, and in the preferred configuration of the optical device and the like according to the present disclosure or the display device and the like according to the present disclosure, in a state in which the relative alignment between the first hologram diffraction grating and the second hologram diffraction grating is completed, the shapes of the 1A-th alignment mark, the 2A-th alignment mark, the 1B-th alignment mark, and the 2B-th alignment mark are specified, or the arrangements of the alignment marks are specified. Therefore, the relative alignment of the first hologram diffraction grating and the second hologram diffraction grating can be performed reliably and easily on the basis of the simplified method. In the alignment device, since the first light source (first alignment light source) that causes light to be incident on the light guide plate from the end surface of the light guide plate on which the stage is arranged and the first hologram diffraction grating is arranged and the second light source (second alignment light source) that causes light to be incident on the support from the end surface of the support supporting the second hologram diffraction grating above the first hologram diffraction grating are provided, it is possible to detect the alignment marks reliably, accurately, and easily.

In the method of assembling the optical device according to the first and second aspects described above, in a state in which the first hologram diffraction grating is disposed on the light guide plate, the relative alignment of the first hologram diffraction grating and the second hologram diffraction grating may be performed, and the second hologram diffraction grating may be disposed on the light guide plate. In this case, preferably, in a state in which the first hologram diffraction grating is arranged in the light guide plate, the light guide plate is moved relative to the second hologram diffraction grating. Further, in this case, after the first hologram diffraction grating is attached to or formed on the light guide plate, the relative alignment of the first hologram diffraction grating and the second hologram diffraction grating may be performed, and the second hologram diffraction grating may be attached to the light guide plate, but the present disclosure is not limited thereto.

In the method of assembling the optical device according to the first aspect having the above-described various preferable configurations, Preferably, the relative alignment of the first hologram diffraction grating and the second hologram diffraction grating is performed in a state in which the second hologram diffraction grating is supported by the support. In this case, preferably, the same interference fringe as the interference fringe formed in the first interference fringe forming region is formed in the 1A-th alignment mark and the 1B-th alignment mark, the same interference fringe as the interference fringe formed in the second interference fringe forming region is formed in and the 2A-th alignment marks and the 2B-th alignment mark, the light is caused to be incident on the light guide plate from the end surface of the light guide plate, and light diffracted and reflected by the 1A-th alignment marks and the 1B-th alignment mark is optically detected, and the light is caused to be incident on the support from the end surface of the support, and light diffracted and reflected by the 2A-th alignment mark and the 2B-th alignment mark is optically detected.

Further, in the above-described configuration of the method of assembling the optical device according to the first aspect or in the method of assembling the optical device according to the second aspect including the above various preferable configurations, in a state in which the relative alignment of the first hologram diffraction grating and the second hologram diffraction grating is completed, the 1A-th alignment mark and the 2A-th alignment mark may have shapes in which the 1A-th alignment mark and the 2A-th alignment mark do not overlap, and the 1B-th alignment mark and the 2B-th alignment mark may have shapes in which the 1B-th alignment mark and the 2B-th alignment mark do not overlap, or in a state in which a relative alignment between the first hologram diffraction grating and the second hologram diffraction grating is completed, the 1A-th alignment mark and the 2A-th alignment mark may be arranged at positions at which the 1A-th alignment mark and the 2A-th alignment mark do not overlap, and the 1B-th alignment mark and the 2B-th alignment mark may be arranged at positions at which the 1B-th alignment mark and the 2B-th alignment mark do not overlap.

Preferably, the light which is incident on the 1A-th alignment mark and the 1B-th alignment mark, diffracted and reflected by the 1A-th alignment mark and the 1B-th alignment mark, and emitted from the light guide plate at an emission angle $i_{out}$ is emitted from the first light source in the method of assembling the optical device according to the first and second aspects or the first light source in the alignment device, and the light which is incident on the 2A-th alignment mark and the 2B-th alignment mark, diffracted and reflected by the 2A-th alignment mark and the 2B-th alignment mark, and emitted from the light guide plate at the emission angle $i_{out}$ is emitted from the second light source. Here, 0° may be used as an example of the emission angle $i_{out}$. Further, it is desirable to select a wavelength of the light emitted from the first light source and an incidence angle on the light guide plate so that such a state is obtained, and it is desirable to select a wavelength of the light emitted from the second light source and an incidence angle on the support so that such a state is obtained. Further, preferably, the parallel light is emitted from the first light source, and the parallel light is emitted from the second light source.

Furthermore, in the method of assembling the optical devices according to the first and second aspects having various preferred modes and configurations described above, the optical device and the like according to the present disclosure, and the display device and the like according to the present disclosure, the 1A-th alignment mark and the 2A-th alignment mark may be imaged through a first imaging device, and the 1B-th alignment mark and the 2B-th alignment mark may be imaged through a second imaging device. The imaging device may be an imaging device having a well-known configuration and structure.

Furthermore, in the method of assembling optical devices according to the first and second aspects having various preferred modes and configurations described above, the optical device and the like according to the present disclosure, the display device and the like according to the present disclosure, the 1A-th alignment mark, the 1B-th alignment mark, the 2A-th alignment mark, and the 2B-th alignment mark may be arranged on the end side of the light guide plate.

Furthermore, in the method for assembling an optical device according to the first aspect having various preferred modes and configurations described above, it is desirable that a maximum value of a specified value be 100 seconds, but the present disclosure is not limited thereto.

Further, in the hologram diffraction grating, each of the alignment marks may be disposed outside the portions of the interference fringe forming regions opposite to the portions of the interference fringe forming regions from which light is emitted.

The 1A-th alignment mark and the 1B-th alignment mark are arranged to face each other with the first interference fringe forming region interposed therebetween on the outer sides of the first interference fringe forming regions in the direction in which the first interference fringe extends, but specifically, the 1A-th alignment mark and the 1B-th alignment mark may be included in the projection image onto the xz plane of the first interference fringe forming region, or the 1A-th alignment mark and the 1B-th alignment mark may be included in the projection image onto the xz plane of the portion of the first hologram diffraction grating (for the sake of convenience, also referred to as an "end region of the first hologram diffraction grating") located closer to the end portion side of the light guide plate than the first interference fringing forming region. Similarly, the 2A-th alignment mark and the 2B-th alignment mark are arranged to face each other with the second interference fringe forming region interposed therebetween on the outer sides of the second interference fringe forming regions in the direction in which the second interference fringe extends, but specifically, the 2A-th alignment mark and the 2B-th alignment mark may be included in the projection image onto the xz plane of the second interference fringe forming region, or the 2A-th alignment mark and the 2B-th alignment mark may be included in the projection image onto the xz plane of the portion of the second hologram diffraction grating (for the sake of convenience, also referred to as an "end region of the first hologram diffraction grating") located closer to the end portion side of the light guide plate than the second interference fringing forming region.

In the display device and the like according to the present disclosure, a configuration of receiving a signal for displaying an image in the image display device (a signal for forming a virtual image in the optical device) from the outside may be provided. Through this configuration, information and data related to the image to be displayed on the image display device may be recorded, kept, and stored in, for example, a so-called cloud computer or a server, and when the display device is equipped with a communication device such as a mobile phone or a smartphone or when a communication device and the display device is incorporated, it is possible to perform reception and exchange of various kinds of information or data between the could computer or the server and the display device, and it is possible to receive signals based on various kinds of information or data, that is, signals for displaying images (signals for forming a virtual image in the optical device) on the image display device. Alternatively, in the image display device, signals for displaying an image (signals for forming a virtual image in the optical device) may be stored in the display device. Further, various kinds of information or various kinds of data are included in an image to be displayed on the image display device. Alternatively, the display device includes an imaging device, and the image picked up by the imaging device is transmitted to the cloud computer or the server via the communication device, various kinds of information or data corresponding to the image captured by the imaging device are searched for in the cloud computer or the server, various kinds of information or data which are searched are transmitted to the display device through the communication device, and an image indicating various kinds of information or data which are searched is displayed on the image display device.

When the image captured by the imaging device is transmitted to the cloud computer or the server through the communication device, the image captured by the imaging device may be displayed on the image display device and confirmed on the optical device. Specifically, an outer edge of a space region imaged by the imaging device may be displayed in a frame shape in the dimmer. Alternatively, a light shielding ratio of a region of the dimmer corresponding to the space region imaged by the imaging device may be set to be higher than a light shielding ratio of a region of the dimmer corresponding to the outer side of the space region imaged by the imaging device. In this configuration, for the observer, the spatial region imaged by the imaging device is viewed to be darker than the outer side of the spatial region imaged by the imaging device. Alternatively, the light shielding ratio of the region of the dimmer corresponding to the space region imaged by the imaging device may be set to be lower than the light shielding ratio of the region of the dimmer corresponding to the outer side of the space region imaged by the imaging device. In this configuration, for the observer, the spatial region imaged by the imaging device is viewed to be brighter than the outer side of the spatial region imaged by the imaging device. Accordingly, the observer can easily and certainly recognize an external portion which is imaged by the imaging device.

It is desirable to calibrate the position of the region of the dimmer corresponding to the space region imaged by the imaging device. Specifically, when the display device is equipped with, for example, a mobile phone or a smartphone, or when the display device is combined with a mobile phone, a smartphone, or a personal computer, the space region imaged by the imaging device can be displayed in the mobile phone, the smartphone, or the personal computer. Then, when there is a difference between the space region displayed in the mobile phone, the smartphone, or the personal computer and the region of the dimmer corresponding to the space region imaged by the imaging device, the region of the dimmer corresponding to the space region imaged by the imaging device may be moved, rotated, enlarged, or reduced using the control circuit that controls the light shielding ratio of the dimmer (which can be replaced with the mobile phone, the smart phone, or the personal computer) in order to eliminate the difference between the space region displayed in the mobile phone, the smartphone, or the personal computer and the region of the dimmer corresponding to the space region imaged by the imaging device.

The display device and the like according to present disclosure including various modified examples described above can be used, for example, for reception and display of electronic mails, display of various kinds of information on various sites on the Internet, display of various kinds of descriptions, symbols, signs, marks, emblems, pattern, and the like at the time of driving, operation, maintenance, disassembly, and the like of observation objects such as various devices, display of various kinds of descriptions, symbols, signs, marks, emblems, pattern, and the like related to observation objects such as persons or goods, display of moving images or still images, display of subtitles of movies and the like, display of descriptive text or closed captions related to videos synchronized with videos, or display of various kinds of descriptions related to observation objects in plays, Kabuki, Noh, Kyogen, operas, music festivals, ballets, various kinds of theaters, amusement parks, museums, sightseeing spots, excursion places, tourist information, or the like or descriptive text and the like for describing content or a progress status thereof, a background, and the like or can be used for display of closed captions.

In plays, Kabuki, Noh, Kyogen, operas, music festivals, ballets, various kinds of theaters, amusement parks, museums, sightseeing spots, excursion places, tourist information, or the like, preferably, text serving as an image associated with observation objects is displayed on the display device at an appropriate timing. Specifically, for example, in accordance with the progress status of a movie or the like or in accordance with the progress situation of a play or the like, on the basis of a predetermined schedule and time allocation, in accordance with an operation of an operator or under the control of a computer or the like, an image control signal is transmitted to the display device, and an image is displayed on the display device. Further, various kinds of descriptions related to observation objects such as various kinds of devices, persons, or goods are displayed, but by photographing (imaging) observation objects such as various kinds of devices, persons, or goods through the imaging device and analyzing photographing (imaging) content in the display device, various kinds of description related to observation objects such as various kinds of devices, persons, or goods which are created in advance can be displayed on the display device.

The image signal to the image forming apparatus includes brightness data (brightness information), chromaticity data (chromaticity information), or brightness data and chromaticity data which are related to, for example, an image to be displayed in addition to an image signal (for example, text data). The brightness data may be brightness data corresponding to brightness of a predetermined region including the observation object viewed through the optical device, and the chromaticity data may be chromaticity data corresponding to chromaticity of a predetermined region including the observation object viewed through the optical device. As described above, it is possible to control the brightness of the image to be displayed since the luminance data related to the image is included, it is possible to control the chromaticity of the image to be displayed since the chromaticity data related to the image is included, and it is possible to control the brightness and chromaticity of the image to be displayed since the chromaticity data and the chromaticity data related to the image are included. In the case of the brightness data corresponding to the brightness of the predetermined region including the observation object viewed through the image display device, it is desirable to set a value of the brightness data such that as a value of the brightness of the predetermined region including the observation object viewed through the image display device increases, a value of the brightness of the image increases (that is, so that the image is displayed brighter). Further, in the case of the chromaticity data corresponding to the chromaticity of the predetermined region including the observation object viewed through the image display device, it is desirable to set a value of the chromaticity data so that the chromaticity of the predetermined region including the observation object viewed through the image display device and the chromaticity of the image to be displayed have substantially a complementary color relation. The complementary color refers to a combination of colors having a relation in which they are located at opposite positions in a color circle. Green is a complementary color for red, purple is a complementary color for yellow, orange is a complementary color for blue. It also refers to a color that causes a decrease in color saturation when a certain color is mixed with another color at an appropriate ratio, for example, white in the case of light and black in case of an object, but complementarity of a visual effect when arranged in parallel is different from complementarity when mixed. It is also referred to as a surplus color, a contrast color, or an opposite color. However, an opposite color directly indicates a color opposite to a complementary color, but a range indicated by a complementary color is slightly large. A color combination of complementary colors has a synergistic effect in that colors are complemented, and it is referred to as complementary color harmony.

For example, the head mounted display (HMD) can be configured with the display device and the like according to the present disclosure. Accordingly, it is possible to reduce the weight and the size of the display device, it is possible to drastically reduce a discomfort feeling when the display device is worn, and furthermore, to reduce the manufacturing cost. The display device and the like according to the present disclosure can also be used as a stereoscopic display device. In this case, a polarizing plate or a polarizing film may be detachably attached to the optical device, or a polarizing plate or a polarizing film may be bonded to the optical device if necessary.

First Embodiment

Figure 2:
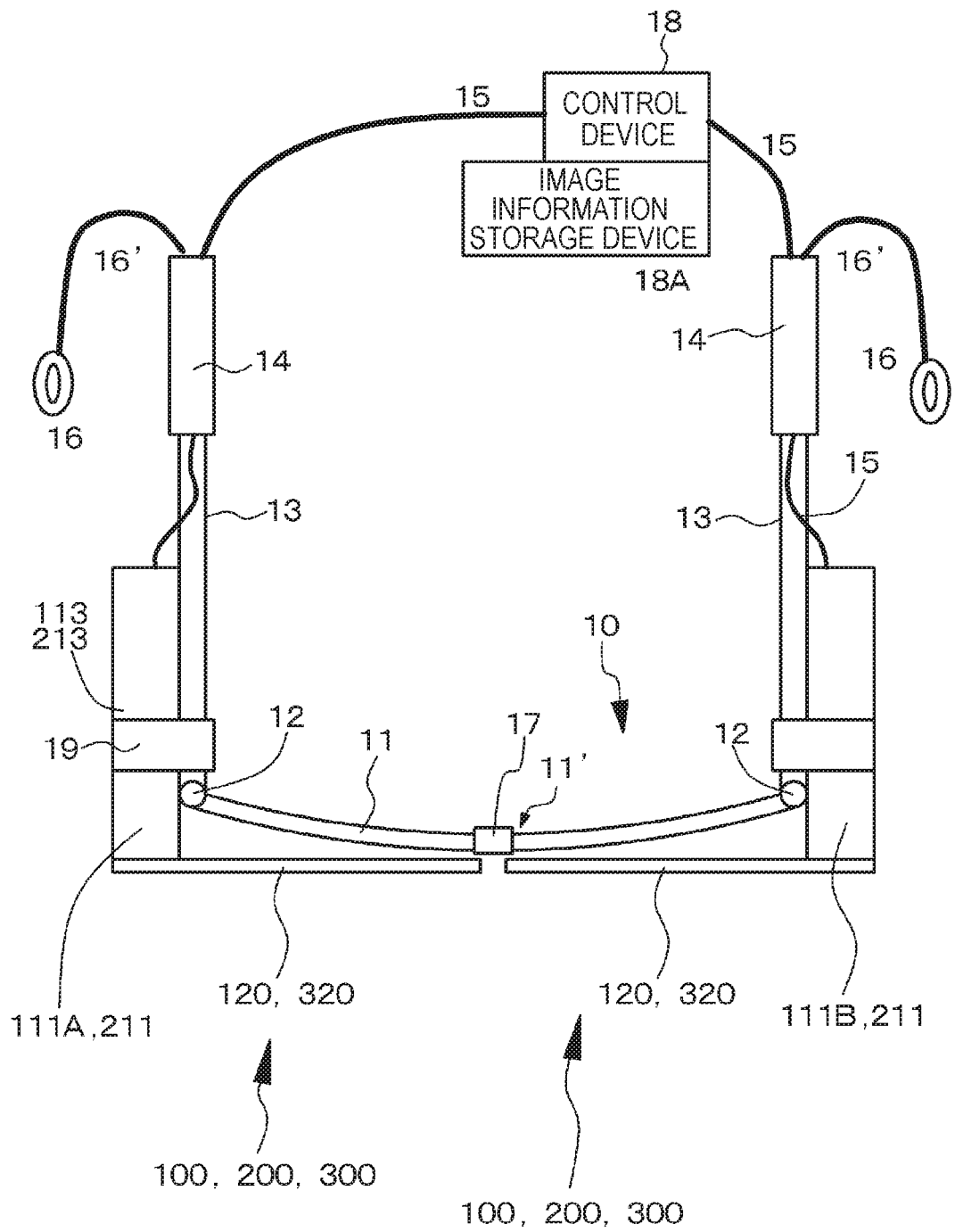
FIG. 2 is a schematic top view of the display device according to the first embodiment.
Figure 3:
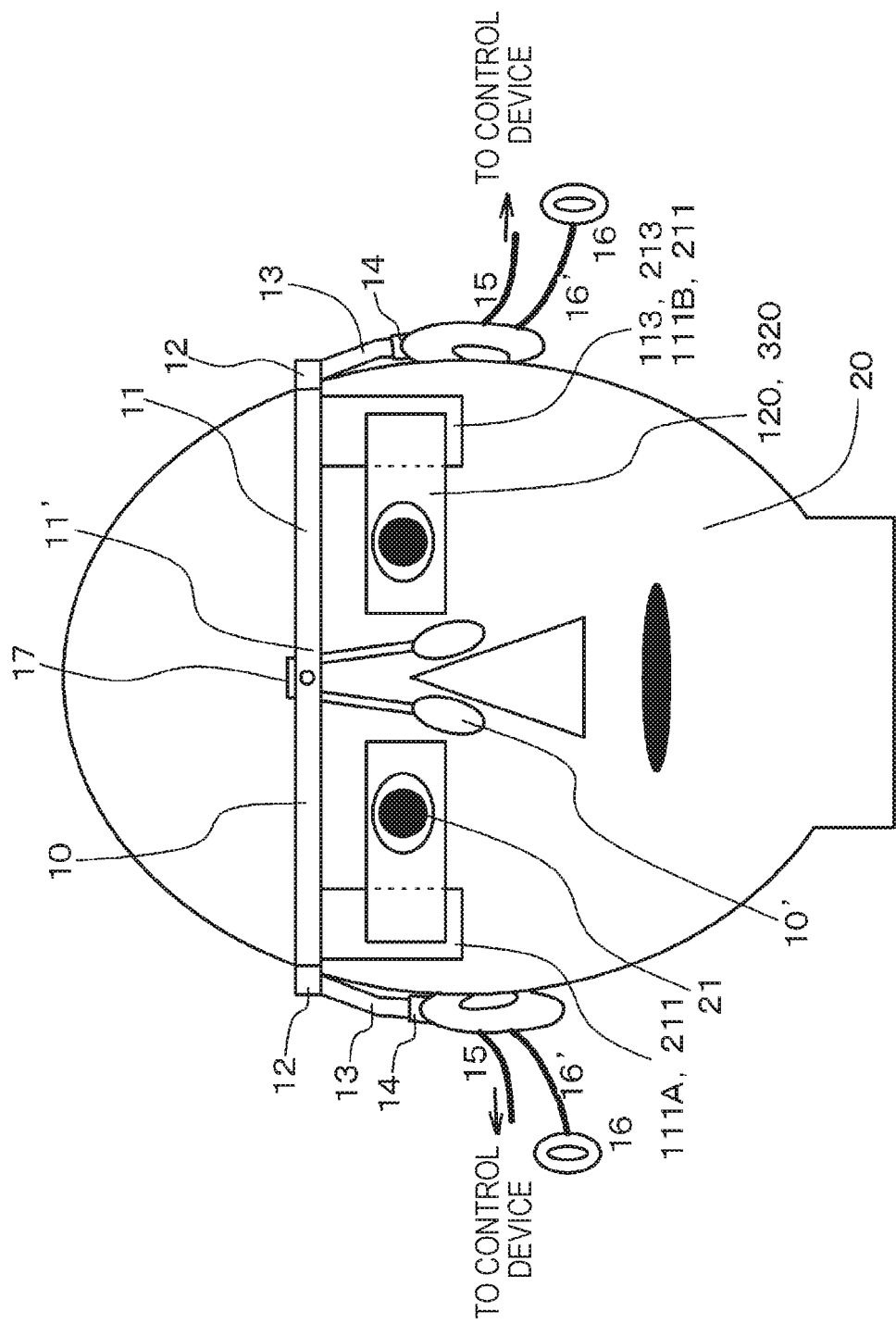
FIG. 3 is a schematic front view of the display device according to the first embodiment.
Figure 4A:
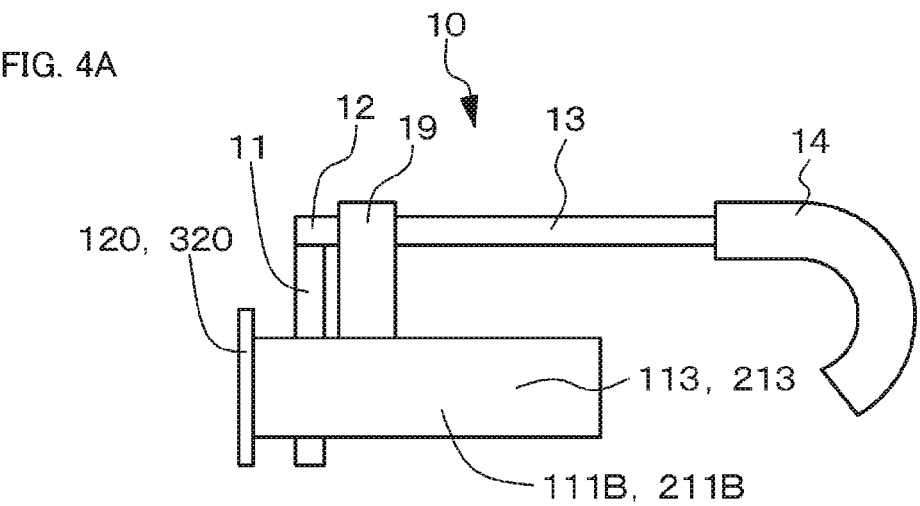
FIGS. 4A and 4B are a schematic side view illustrating the display device of the first embodiment and a diagram schematically illustrating propagation of light in a light guide plate constituting an image display device.
Figure 4B:
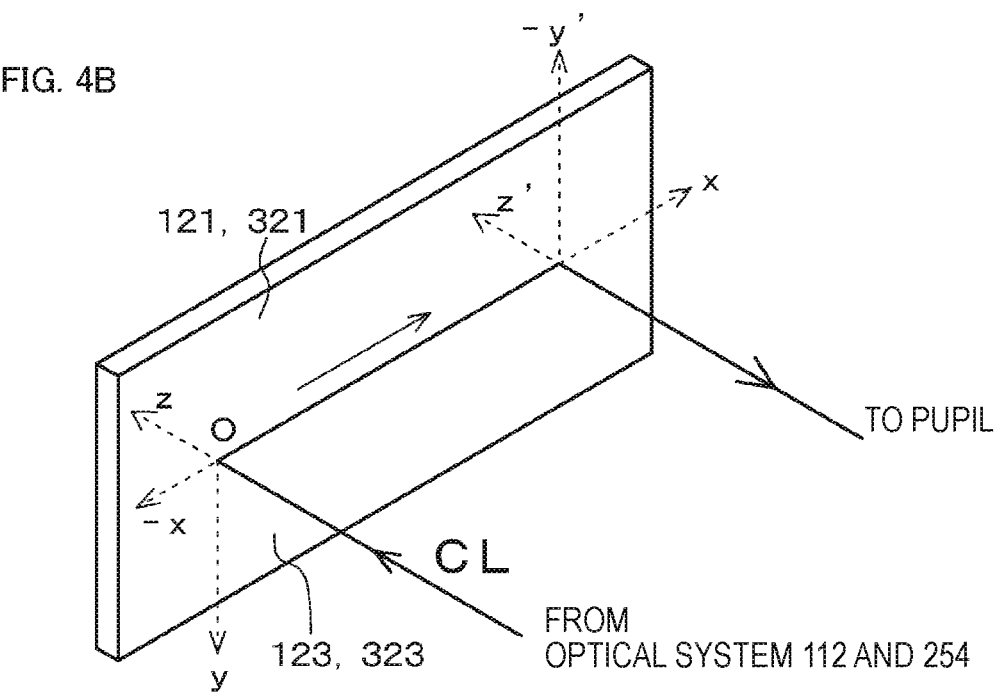
Figure 5:
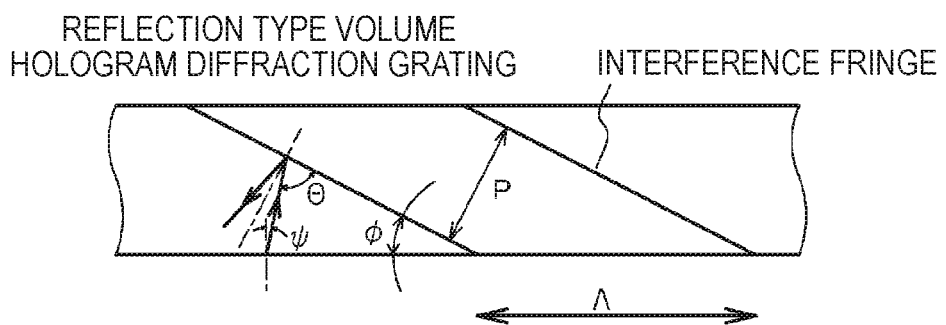
FIG. 5 is a schematic enlarged cross-sectional view illustrating a part of a reflection type volume hologram diffraction grating.

A first embodiment relates to optical devices according to first and second aspects of the present disclosure and display devices according to the first and second aspects of the present disclosure. FIG. 1 is a conceptual diagram of an image display device in a display device according to a first embodiment, FIG. 2 is a schematic top view of the display device according to the first embodiment, FIG. 3 is a schematic front view of the display device according to the first embodiment, FIG. 4A is a schematic side view of the display device according to the first embodiment, and FIG. 4B schematically illustrates propagation of light in a light guide plate constituting the image display device. FIG. 5 is a schematic enlarged cross-sectional view illustrating a part of a reflection type volume hologram diffraction grating.

More specifically, the display devices of the first embodiment or second to twelfth embodiments to be described later are a head mounted display (HMD) and include (a) a frame (for example, a glasses type frame 10) worn on the head of an observer 20, and (b) image display devices 100, 200, 300A, and 300B mounted on the frame 10, The image display devices 100, 200, 300A, and 300B according to the first embodiment or the second to twelfth embodiments to be described later include (a) image forming apparatuses 111, 111A, 111B, 211, 111', and 211', and (b) optical devices (light guide units) 120 and 320 from which light emitted from the image forming apparatuses 111, 111A, 111B, 211, 111', and 211' are incident and emitted.

The image display devices 100, 200, 300A, and 300B further include (c) optical systems (parallel light emission optical systems) 112 and 254 that convert the light emitted from the image forming apparatus 111, 111A, 111B, 211, 111', and 211' into parallel light, and light beams converted to parallel light by the optical systems 112 and 254 are incident on the optical devices 120 and 320 and emitted therefrom. Specifically, the display devices of the first embodiment or the second to twelfth embodiments to be described later are a binocular type including two image display devices but may be a monocular type including one image display device. The image forming apparatuses 111, 211, 111', and 211' displays, for example, an image of a single color (for example, green).

The image display devices 100, 200, 300A, and 300B may be fixedly attached to the frame 10 or may be detachably attached to the frame 10. The optical systems 112 and 254 are arranged between the image forming apparatuses 111, 211, 111', and 211' and the optical devices 120 and 320. Then, the light beams converted into the parallel light by the optical systems 112 and 254 are incident on the optical devices 120 and 320 and emitted. Further, the optical devices 120 and 320 are a semi-transmissive type (a see-through type). Specifically, at least portions of the optical device facing both eyes of the observer 20 (more specifically, light guide plates 121 and 321 and second deflection units 140 and 340 to be described later) are a semi-transmissive (see-through).

In the first embodiment or the second to twelfth embodiments to be described later, a point at which a central incident light beam vertically incident on the optical devices 120 and 320 among light beams which are emitted from the centers of the image forming apparatuses 111, 211, 111', and 211' and pass through nodal points of the optical systems 112 and 254 on the image forming apparatus side (central light beams CL) is incident on the optical devices 120 and 320 is referred to as an "optical device center point O," an axis line which passes through the optical device center point O and is coincident with an axial direction of the optical devices 120 and 320 is referred to as a "y axis," and an axis line which passes through the optical device center point O and is parallel to a normal line of the optical devices 120 and 320 is referred to as a "z axis." A center point of first deflection units 130 and 330 are the optical device center point O. In other words, as illustrated in FIG. 4B, in the image display devices 100, 200, 300A, and 300B, the center incident light beam CL which is emitted from the center of the image forming apparatuses 111, 211, 111', and 211' and passes through the nodal points of the optical systems 112 and 254 on the image forming apparatus side impinge vertically on the light guide plates 121 and 321. In other words, the central incident light beam CL enters the light guide plates 121 and 321 at an angle of incidence of 0°. In this case, the center of a displayed image is identical to a vertical direction of second surfaces 123 and 323 of the light guide plates 121 and 321.

The optical device 120 according to the first embodiment or the second to sixth embodiments to be described later includes (a) a light guide plate 121 that causes incident light to propagates thereinside through total reflection and then emit, (b) a first deflection unit 130 that deflects the light incident on the light guide plate 121 so that the light incident on the light guide plate 121 is totally reflected inside the light guide plate 121, and (c) a second deflection unit 140 that deflects the light that has propagated inside the light guide plate 121 through the total reflection so that part of the light that has propagated inside the light guide plate 121 through the total reflection is emitted from the light guide plate 121.

Here, the first deflection unit 130 is configured with a first hologram diffraction grating 131 and a second hologram diffraction grating 135, and the second deflection unit 140 is configured with a third hologram diffraction grating 141. Each of the hologram diffraction gratings 131, 135, and 141 is configured with a reflection type volume hologram diffraction grating. In other words, the first deflection unit 130 and the second deflection unit 140 function as a sort of semi-transparent mirror.

A first interference fringe is formed in the first hologram diffraction grating 131, a second interference fringe is formed in the second hologram diffraction grating 135, and a third interference fringe is formed in the third hologram diffraction grating 141.

Further, a relation of $\phi_2<\phi_3<\phi_1$ and $P_1=P_3=P_2$ is satisfied.

Here, $\phi_1$: a slant angle of the first interference fringe
$\phi_2$: a slant angle of the second interference fringe
$\phi_3$: a slant angle of the third interference fringe
$P_1$: a pitch of the first interference fringe
$P_2$: a pitch of the second interference fringe
$P_3$: a pitch of the third interference fringe Alternatively, a relation of $\lambda_2<\phi_3<\phi_1$ is satisfied.

Further, $\phi_1\neq\phi_2$ and $P_1=P_2$ is satisfied, and further, $\phi_2<\phi_3<\phi_1$ and $P_1=P_2=P_3$ is satisfied.

Here, $\lambda_1$: a peak wavelength of light which is incident on the light guide plate and deflected by the first hologram diffraction grating 131

$\lambda_2$: a peak wavelength of light which is incident on the light guide plate and deflected by the second hologram diffraction grating 135

$\lambda_3$: a peak wavelength of light which is deflected by the first hologram diffraction grating 131 and the second hologram diffraction grating 135, propagates inside the light guide plate through the total reflection, and is then deflected by the third hologram diffraction grating 141.

Further, the display devices according to the first embodiment or the second to sixth embodiments to be described later includes the optical device according to the first embodiment described above.

Here, incident light having the peak wavelength $\lambda_1$ is (mainly) diffracted by the first hologram diffraction grating 131 rather than the second hologram diffraction grating 135 in the incident light corresponding to the central angle of view, and the incident light having the peak wavelength $\lambda_2$ is (mainly) diffracted by the second hologram diffraction grating 135 rather than the first hologram diffraction grating 131 in the incident light corresponding to the central angle of view.

In other words, a part of the parallel light incident on the light guide plate 121 satisfies the Bragg condition under which diffraction reflection occurs in the first hologram diffraction grating 131 (a wavelength, an angle of incidence, and a grating plane pitch) but does not satisfy the Bragg condition under which reflection occurs in the second hologram diffraction grating 135. Further, the other part of the parallel light incident on the light guide plate 121 satisfies the Bragg condition under which diffraction reflection occurs in the second hologram diffraction grating 135 (a wavelength, an angle of incidence, and a grating plane pitch) but does not satisfy the Bragg condition under which reflection occurs in the first hologram diffraction grating 131. Therefore, part of the parallel light incident on the light guide plate 121 is mainly diffracted and reflected in the first hologram diffraction grating 131 but neither diffracted nor reflected in the second hologram diffraction grating 135 and passes through the second hologram diffraction grating 135. Similarly, the other part of the parallel light incident on the light guide plate 121 satisfies the Bragg condition under which diffraction reflection mainly occurs in the second hologram diffraction grating 135 but does not satisfy the Bragg condition under which diffraction reflection occurs in the first hologram diffraction grating 131. Therefore, the other part of the parallel light incident on the light guide plate 121 is diffracted and reflected by the second hologram diffraction grating 135 but neither diffracted nor reflected by the first hologram diffraction grating 131 and passes through the first hologram diffraction grating 131.

In the first embodiment or the second to fourth embodiments, and the sixth embodiment to be described later, the first deflection unit 130 is disposed on the first surface 122 and the second surface 123 of the light guide plate 121. The second deflection unit 140 including the third hologram diffraction grating 141 is disposed on the first surface 122 of the light guide plate 121. In other words, the first hologram diffraction grating 131 is arranged on the second surface 123 of the light guide plate 121, and the second hologram diffraction grating 135 is arranged on the first surface 122 facing the second surface 123 of the light guide plate 121. The first deflection unit 130 diffracts and reflects at least a part of the light incident on the light guide plate 121 so that a plurality of parallel lights incident on the light guide plate 121 are totally reflected inside the light guide plate 121, and the second deflection unit 140 diffracts and reflects the light that has propagated inside the light guide plate 121 through the total reflection twice or more and causes the parallel light to emit from the second surface 123 of the light guide plate 121 without change. In other words, in the first deflection unit 130, a plurality of parallel lights incident on the light guide plate 121 are diffracted and reflected so that the parallel light incident on the light guide plate 121 is totally reflected inside the light guide plate 121. On the other hand, in the second deflection unit 140, the parallel light that has propagated inside the light guide plate 121 through the total reflection is diffracted and reflected twice or more and then emitted from the light guide plate 121 toward the pupil 21 of the observer 20 in the state of the parallel light. As described above, a value of diffraction efficiency $\eta_3$ of the second deflection unit 140 is lower than values of diffraction efficiencies $\eta_1$ and $\eta_2$ of the first deflection unit 130. Specifically, a thickness $T_3$ of the third hologram diffraction grating 141 constituting the second deflection unit 140 is smaller than thicknesses $T_1$ and $T_2$ of the first hologram diffraction grating 131 and the second hologram diffraction grating 135 constituting the first deflection unit 130.

Each of first hologram diffraction grating 131, the second hologram diffraction grating 135, the third hologram diffraction grating 141 each of which is made of a photopolymer material forms an interference fringe corresponding to one type of wavelength band (or wavelength) and is fabricated by a method of a related art. A pitch of the interference fringe formed in the hologram diffraction grating is constant, and the interference fringe is linear and approximately parallel to the y axis. As described above, the second hologram diffraction grating 135 and the third hologram diffraction grating 141 are disposed (adhered) to the first surface 122 of the light guide plate 121, and the first hologram diffraction grating 131 is disposed (adhered) to the second surface 123 of the light guide plate 121.

Here, $$0.7°\leq|\phi_2-\phi_1|\leq4.7°$$

is satisfied. Alternatively, $$0\text{ nm}\leq|\lambda_3-\lambda_1|\leq40\text{ nm and }0\text{ nm}\leq|\lambda_2-\lambda_3|\leq40\text{ nm}$$

is satisfied. Further, when the diffraction efficiency of the first hologram diffraction grating 131 is $\tau_1$, the diffraction efficiency of the second hologram diffraction grating 135 is $\eta_2$, and the diffraction efficiency of the third hologram diffraction grating 141 is $\eta_3$, $\eta_1\eta_3 \geq 1.0$ and $\eta_2/\eta_3 \leq 1.0$ are satisfied, and preferably, $\eta_3 \leq 0.25$ is satisfied, and if the thickness of the first hologram diffraction grating 131 is indicated by $T_1$, the thickness of the second hologram diffraction grating 135 is indicated by $T_2$, and the thickness of the third hologram diffraction grating 141 is indicated by $T_3$, $1.0 \ \mu m \leq T_1, T_2 \leq 10 \ \mu m, T_1 \geq T_3$ and $T_2 \geq T_3$ are satisfied, and it is desirable that a value of $T_3$ satisfy $T_3 \geq 2.0 \ \mu m$ preferably, $T_3 \leq 1.6 \ \mu m$ The values of $\phi_1$, $\phi_3$, $\phi_2$, $P_1=P_3=P_2$, $\lambda_1$, $\lambda_3$, $\lambda_2$, $\eta_1$, $\eta_2$, $\eta_3$, $T_1$, $T_2$, and $T_3$ are set as shown in Table 1 below but not limited thereto.

TABLE 1

Figure 14:
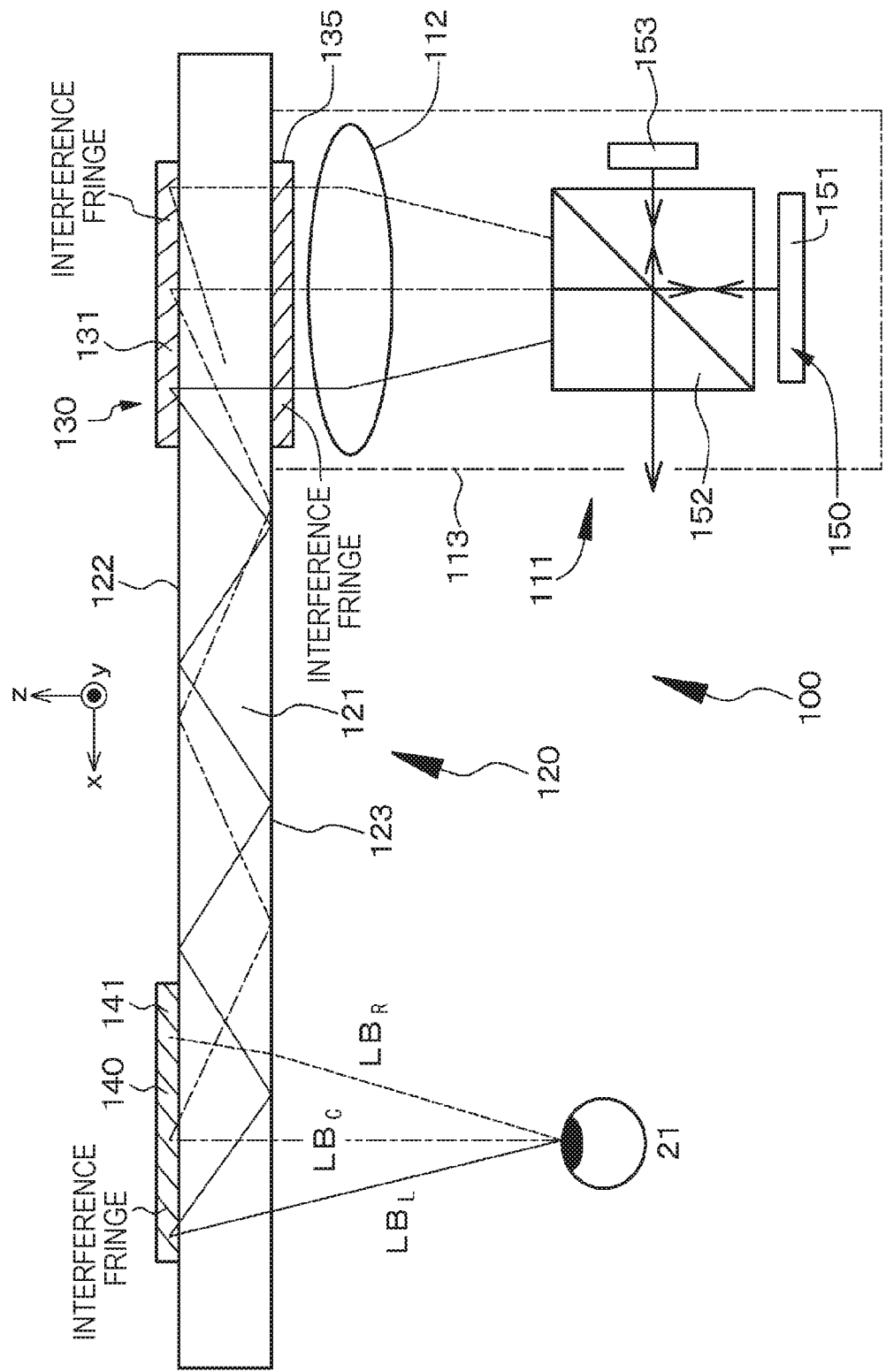
FIG. 14 is a conceptual diagram of an image display device in a display device according to a fifth embodiment.
Figure 16A:
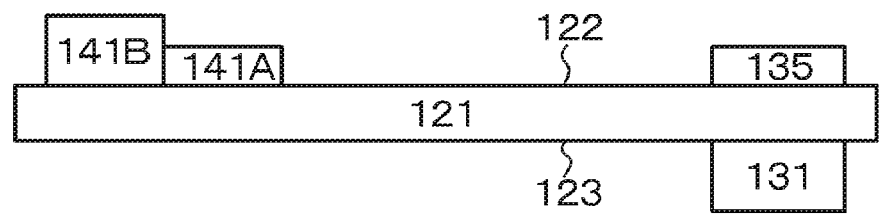
FIGS. 16A, 16B, 16C, 16D, 16E, and 16F are conceptual diagrams of an optical device in a display device according to a sixth embodiment.
Figure 16B:
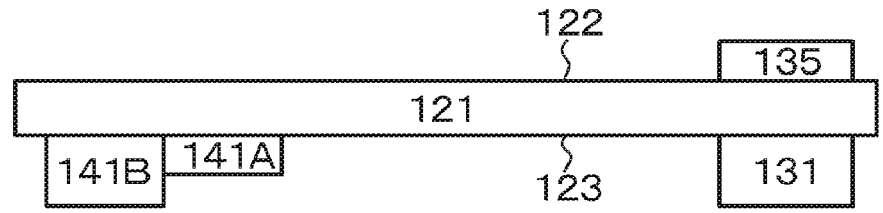
Figure 16C:
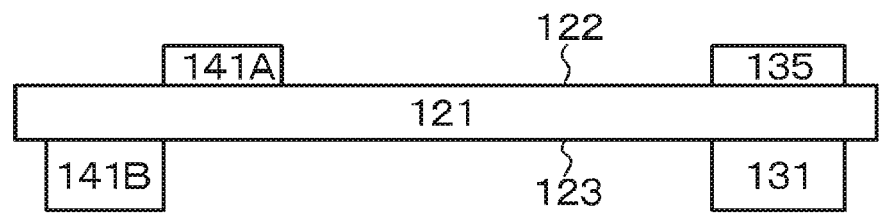
Figure 16D:
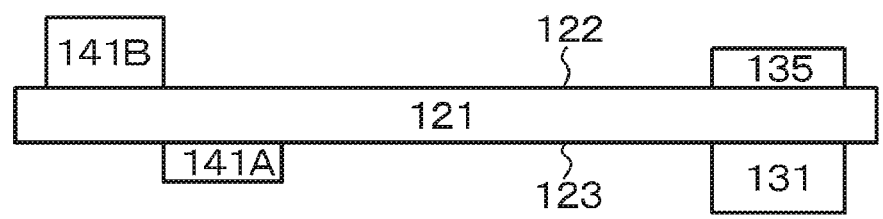
Figure 16E:
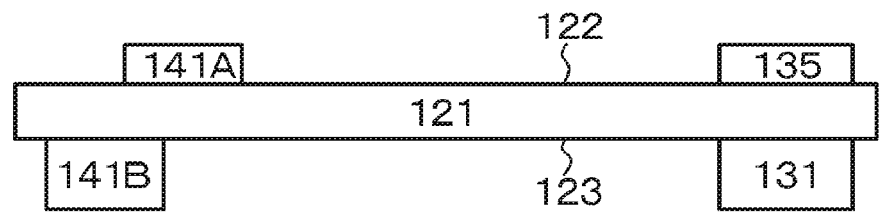
Figure 16F:
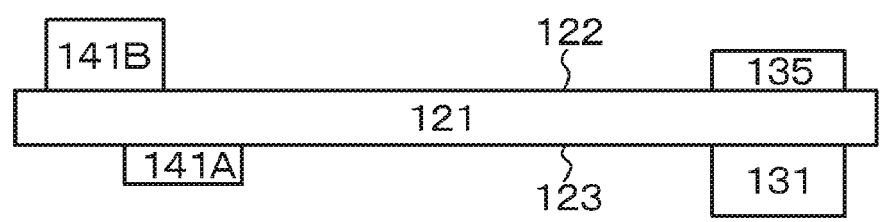

| | | first embodiment | fifth embodiment | reference example 5A | reference example 5B |
|---|---|---|---|---|---|
| $\phi_1$ | degree | 35.0 | 35.0 | 35.0 | 35.0 |
| $\phi_2$ | degree | 32.0 | 32.0 | 32.0 | 32.0 |
| $\phi_3$ | degree | 33.0 | 33.0 | 33.0 | 33.0 |
| $P_1$ | μm | 0.330 | 0.330 | 0.330 | 0.330 |
| $P_2$ | μm | 0.330 | 0.330 | 0.330 | 0.330 |
| $P_3$ | μm | 0.330 | 0.330 | 0.330 | 0.330 |
| $\lambda_1$ | nm | 540 | 540 | 540 | 540 |
| $\lambda_2$ | nm | 510 | 510 | 510 | 510 |
| $\lambda_3$ | nm | 520 | 520 | 520 | 520 |
| $\eta_1$ | | 0.60 | 0.80 | 0.80 | 0.60 |
| $\eta_2$ | | 0.60 | 0.70 | 0.70 | 0.50 |
| $\eta_3$ | | 0.15 | 0.15 | 0.15 | 0.15 |
| $T_1$ | μm | 3.0 | 4.0 | 4.0 | 3.0 |
| $T_2$ | μm | 3.0 | 4.0 | 4.0 | 3.0 |
| $T_3$ | μm | 1.0 | 1.0 | 1.0 | 1.0 |
| | | FIG. 1 | FIG. 14 | FIG. 1 | FIG. 1 |

Here, when the peak wavelength of the light which is deflected by the first hologram diffraction grating 131 and the second hologram diffraction grating 135, propagates inside the light guide plate 121 through the total reflection, and is then deflected by the third hologram diffraction grating 141 is indicated by $\lambda_3$, the image forming apparatuses 111 and 211 include the light sources 153 and 251 that emit light having the peak wavelength $\lambda_3$.

FIG. 5 is a schematic enlarged partial cross-sectional view of the reflection type volume hologram diffraction grating. In the reflection type volume hologram diffraction grating, an interference fringe having a slant angle $\phi$ is formed. Here, the slant angle $\phi$ refers to an angle formed by the surface and the interference fringe of the reflection type volume hologram diffraction grating. The interference fringe is formed from the inside to the surface of the reflection type volume hologram diffraction grating. The interference fringe satisfies the Bragg condition. In FIG. 5, "$\phi$" is the slant angle $\phi$, "$\psi$" is an angle of incidence, "$\Theta$" is a complementary angle of the angle of incidence with respect to the interference fringe, "P" is a pitch of the grating plane (an interval of a virtual plane including an interference fringe in a normal direction), and "$\Lambda$" is ae pitch of the interference fringe on the surface of the diffraction grating member. If it is assumed that there is no change in the angle at which the light enters the reflection type volume hologram diffraction grating and the angle at which the light is diffracted and reflected by the reflection type volume hologram diffraction grating and emitted from the reflection type volume hologram diffraction grating, and the value of slant angle $\phi$ increases, an optical path length increases. Therefore, a value of a wavelength $\lambda$ which satisfies a diffraction resonance condition increases. In other words, as the value of the slant angle 4 increases, the value of the wavelength $\lambda$ increases.

In the first embodiment or the second to twelfth embodiments to be described later, the light guide plates 121 and 321 are made of optical glass or a plastic material. In the first embodiment or in the second to twelfth embodiments to be described later, the light guide plates 121 and 321 have two parallel surfaces (the first surfaces 122 and 322 and the second surface 123 and 323) extending parallel to the light propagation direction (the x axis) by the internal total reflection of the light guide plates 121 and 321. The first surfaces 122 and 322 and the second surfaces 123 and 323 face each other. Further, the parallel light is incident from the second surfaces 123 and 323 corresponding to the light incidence surface, propagates the inside through the total reflection, and is then emitted from the second surfaces 123 and 323 corresponding to the light emission surface. However, the present invention is not limited thereto, and the light incidence surface may be configured with the second surfaces 123 and 323, and the light emission surface may be configured with the first surfaces 122 and 322.

In the first embodiment, the image forming apparatus 111 is an image forming apparatus of a first configuration and includes a plurality of pixels arranged in a two-dimensional matrix form. Specifically, the image forming apparatus 111 includes a reflective spatial light modulator 150 and a light source 153 configured with a light emitting diode (LED) emitting green light of a wavelength $\lambda_3$. The entire image forming apparatus 111 is accommodated in a housing 113 (indicated by a dashed line in FIG. 1), an opening (not illustrated) is disposed in the housing 113, and light is emitted from an optical system 112 (a parallel light emitting optical system and a collimating optical system) via the opening. The reflective spatial light modulator 150 includes a liquid crystal display device (LCD) 151 configured with an LCOS serving as a light valve and a polarizing beam splitter 152 that reflects part of the light emitted from the light source 153 and guides it to the liquid crystal display device 151, and transmits part of the light reflected by the liquid crystal display device 151 to be guided to the optical system 112. The liquid crystal display device 151 includes a plurality of pixels (liquid crystal cells) (for example, 640×480 pixels) arranged in a two-dimensional matrix form. The polarizing beam splitter 152 has a configuration and a structure which are known. Unpolarized light emitted from the light source 153 collides with the polarizing beam splitter 152. The polarizing beam splitter 152 transmits P polarized light components to be emitted to the outside of the system. On the other hand, S polarized light components are reflected by the polarizing beam splitter 152, enter the liquid crystal display device 151, are reflected inside the liquid crystal display device 151, and are emitted from the liquid crystal display device 151. Among the light emitted from the liquid crystal display device 151, light emitted from pixels displaying "white" include a lot of P-polarized light components, and light emitted from pixels displaying "black" includes a log of S-polarized light components. Therefore, among the light that is emitted from the liquid crystal display device 151 and collides with the polarizing beam splitter 152, the P polarized light component passes through the polarizing beam splitter 152 and is guided to the optical system 112. On the other hand, the S polarized light components are reflected by the polarizing beam splitter 152 and returned to the light source 153. The optical system 112 is configured with, for example, a convex lens, and an image forming apparatus 111 (more specifically, the liquid crystal display device 151) is disposed at a position of a focal length of the optical system 112 in order to generate the parallel light. Further, one pixel is configured with a green light emitting pixel that emits green light.

The frame 10 includes a front section 11 arranged in front of the observer 20, two temple sections 13 pivotably attached to both ends of the front section 11 via hinges 12, and modern sections 14 attached to leading ends of the temple sections 13 (also referred to as a "tip cell" or an "ear pad"). Further, a nose pad 10' is attached. In other words, an assembly of the frame 10 and the nose pad 10' basically has substantially the same structure as ordinary glasses. Further, each housing 113 is detachably attached to the temple section 13 through a mounting member 19. The frame 10 is made of metal or plastic. Each housing 113 may be non-detachably attached to the temple section 13 through the mounting member 19. For the observer who owns and wears glasses, each housing 113 may be detachably attached to the temple section of the frame of the glasses owned by the observer through the mounting member 19. Each housing 113 may be attached to the outside of the temple section 13 or may be attached to the inside of the temple section 13.

Further, a wiring (a signal line, a power line, or the like) 15 extending from one image forming apparatus 111A extends from a leading end of the modern section 14 to the outside inside the temple section 13 and the modern section 14 and is connected to a control device 18 (a control circuit or a control unit). Further, each of the image forming apparatuses 111A and 111B includes a headphone unit 16, and a headphone unit wirings 16' extending from each of the image forming apparatuses 111A and 111B extends from the leading end of the modern section 14 to the headphone unit 16 inside the temple section 13 and the modern section 14. More specifically, the headphone unit wiring 16' extends from the leading end of the modern section 14 to the headphone unit 16 so as to go around behind an auricle (an ear shell). By employing such a configuration, it is possible to provide a neat display device without giving an impression that the headphone unit 16 and the headphone unit wiring 16' are messily arranged.

The wirings 15 (the signal line, the power line, and the like) are connected to the control device (control circuit) 18. The control device 18 is equipped with, for example, an image information storage device 18A. Further, an image display process is performed in the control device 18. The control device 18 and the image information storage device 18A can be configured with well-known circuits.

Further, in the, an imaging device 17 configured with a solid-state imaging device including a CCD or CMOS sensor and a lens (not illustrated) is attached to a middle section 11' of the front section 11 through a suitable mounting member (not illustrated). The signal from the imaging device 17 is output, for example, to the image forming apparatus 111A via a wiring (not illustrated) extending from the imaging device 17.

In the optical device or display device according to the first embodiment or the second to sixth embodiments to be described later, a relation of the slant angles $\phi_1$, $\phi_2$, and $\phi_3$ and pitches $P_1$, $P_2$, and $P_3$ of the interference fringes of the three hologram diffraction gratings 131, 135, and 141 is specified, or a relation between the peak wavelengths $\lambda_1$, $\lambda_2$, and $\lambda_3$ of the light deflected by the three hologram diffraction gratings 131, 135, and 141 is defined.

Figure 40A:
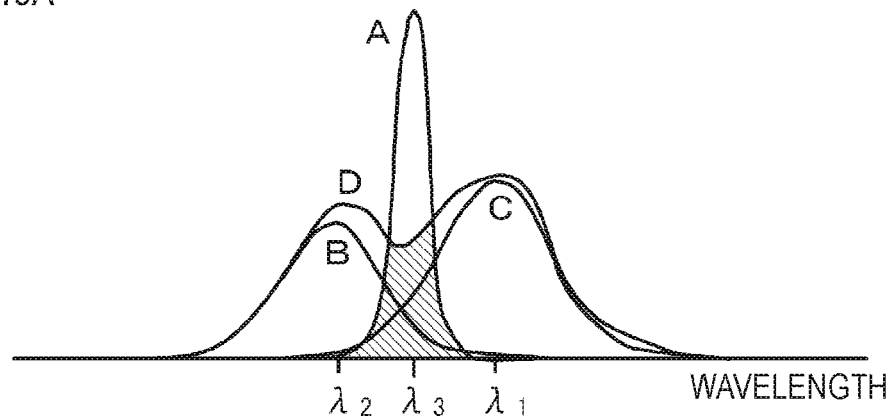
FIGS. 40A, 40B, and 40C are schematic diagrams for describing a relation between light incident on the optical device in the display device according to the first embodiment and brightness of an image observed by the observer.
Figure 40B:
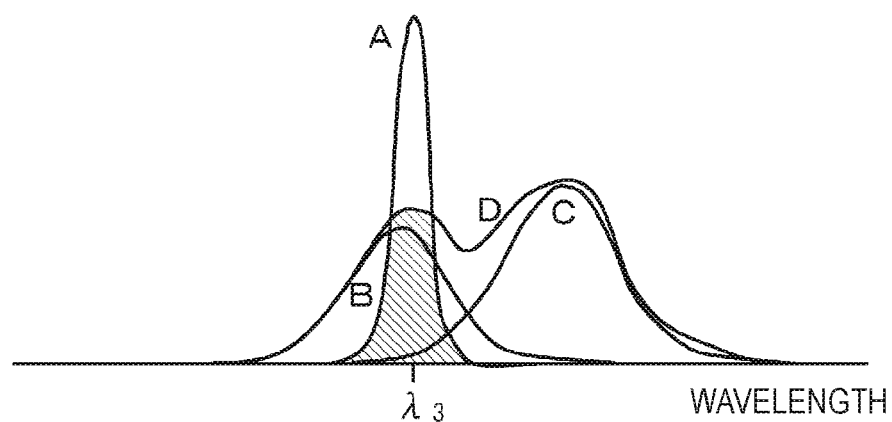
Figure 40C:
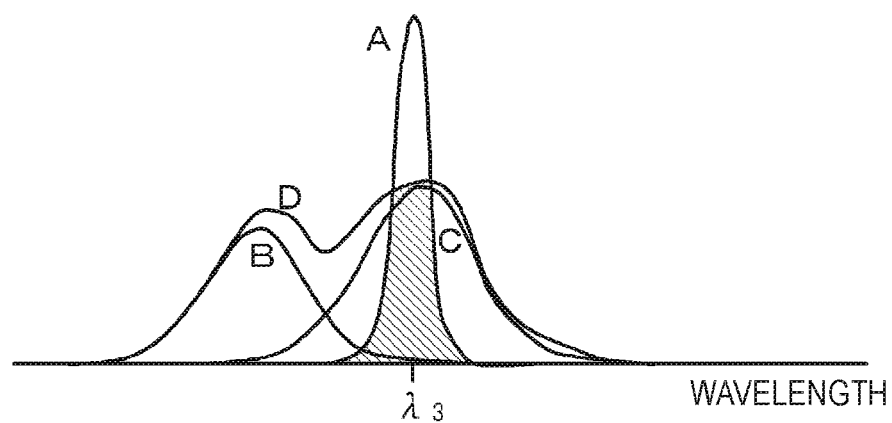
Figure 43A:
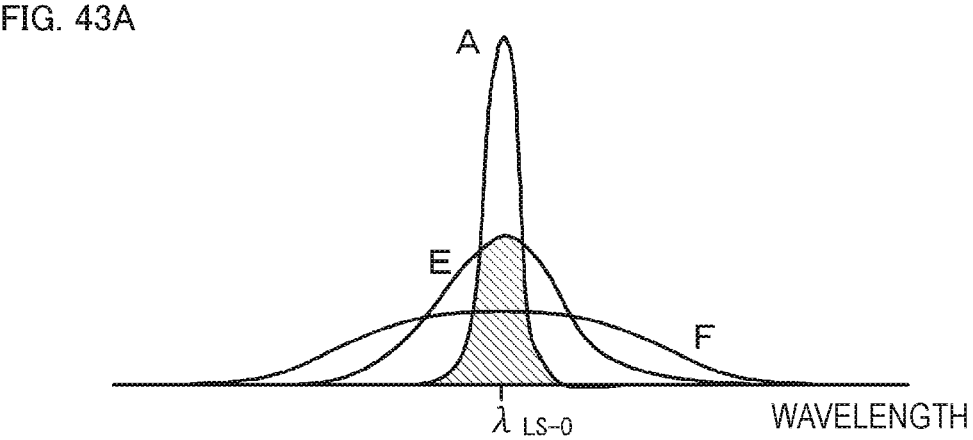
FIGS. 43A, 43B and 43C are schematic diagrams for describing a relation between light incident on an optical device in a display device of a related art and brightness of an image observed by the observer.
Figure 43B:
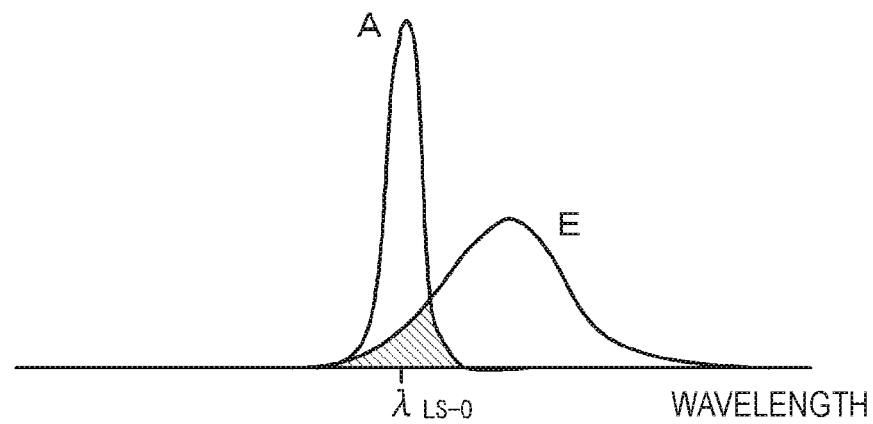
Figure 43C:
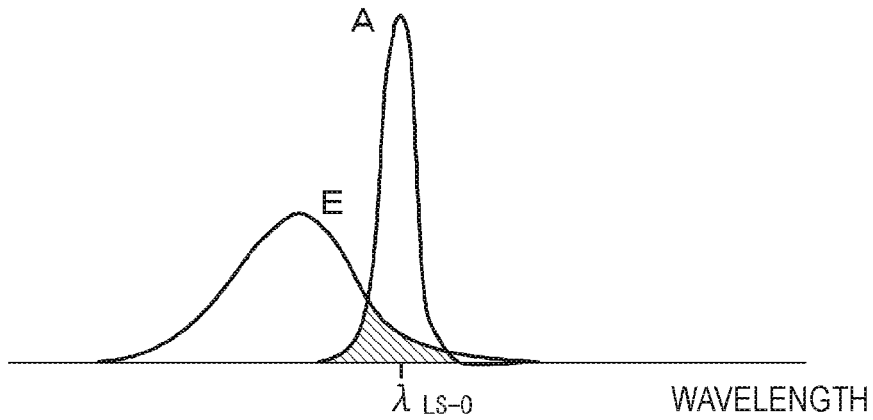

FIGS. 40A, 40B, and 40C are schematic diagrams for describing the relation between the light incident on the optical device in the display device according to the first embodiment and the brightness of the image observed by the observer. In FIGS. 40A, 40B and 40C, an optical spectrum of the light incident on the optical device 120 is indicated by a curve "A," a diffraction efficiency change curve based on the first hologram diffraction grating 131 is indicated by "C," and a "diffraction efficiency change curve" based on the second hologram diffraction grating 135 is indicated by "B," and a combined diffraction efficiency change curve based on the first hologram diffraction grating 131 and the second hologram diffraction grating 135 is indicated by "D." As described above, when the brightness of the image viewed by the observer is desired to be increased, the thickness of the hologram diffraction grating is increased to increase the diffraction efficiency of the entire first deflection unit. When the first deflection unit is configured with one hologram diffraction grating, the diffraction efficiency change curve E (see FIGS. 43A, 43B, and 43C) with respect to the wavelength of the light incident on the first deflection unit has a sharp peak. However, the optical device according to the first embodiment or the second to sixth embodiments to be described later, the first deflection unit 130 is configured with the two hologram diffraction gratings 131 and 135 having different diffraction characteristics as described above. As a result, if the peak wavelength of the light incident on the optical device 120 is indicated by $\lambda_{LS-0}(=\lambda_3)$, all the light beam $LB_C$, the light beam $LB_L$, and the light beam $LB_R$ illustrated in FIG. 1 overlap in a high efficiency portion of the diffraction efficiency change curve D based on the two hologram diffraction gratings 131 and 135 (see FIGS. 40A, 40B, and 40C). Here, the light beam $LB_C$, the light beam $LB_L$, and the light beam $LB_R$ are located in the xy plane passing through the optical device center point O. In other words, the peak (or its vicinity) of the optical spectrum of the light incident to the optical device 120 (see the curve "A") may be located between the peak (or its vicinity) in the diffraction efficiency change curve C based on the first hologram diffraction grating 131 and the peak (or its vicinity) in the diffraction efficiency change curve B based on the second hologram diffraction grating 135. Here, in FIG. 40A, FIG. 40B, and FIG. 40C, hatched regions are portions in which the light incident on the optical device 120 contribute to the brightness of the image viewed by the observer. As a result, the brightness of the image viewed by the observer does not significantly change on the image right side, the image center, and the image left side, and thus the brightness of the image can be made as uniform as possible.

Figure 41:
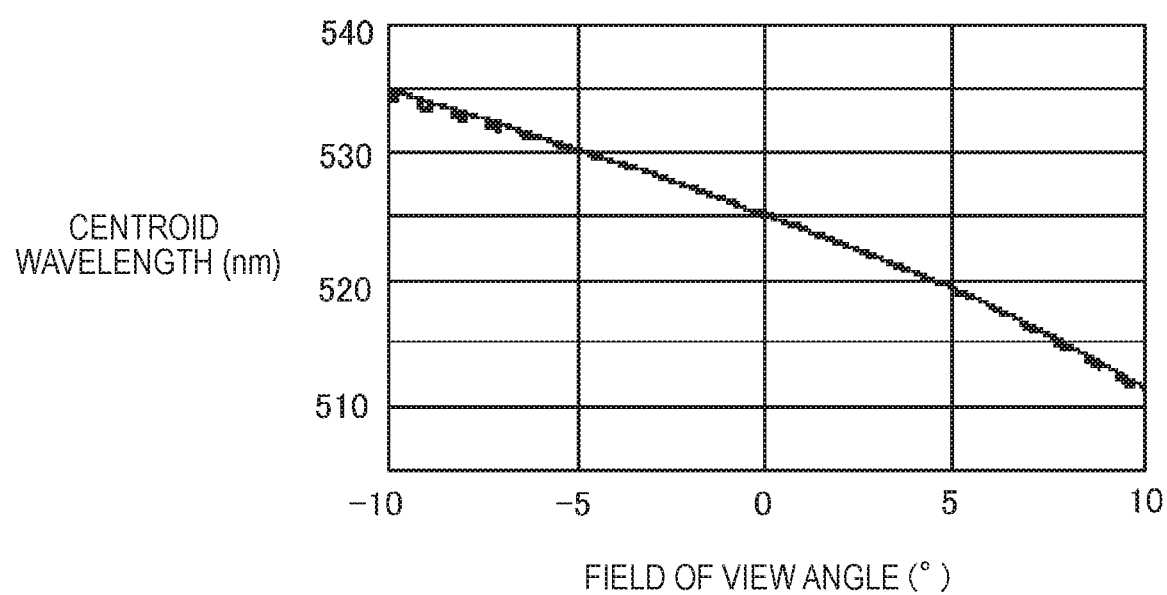
FIG. 41 is a graph of obtaining a relation between an angle of view and a centroid wavelength in the first embodiment and a display device of a related art.
Figure 46:
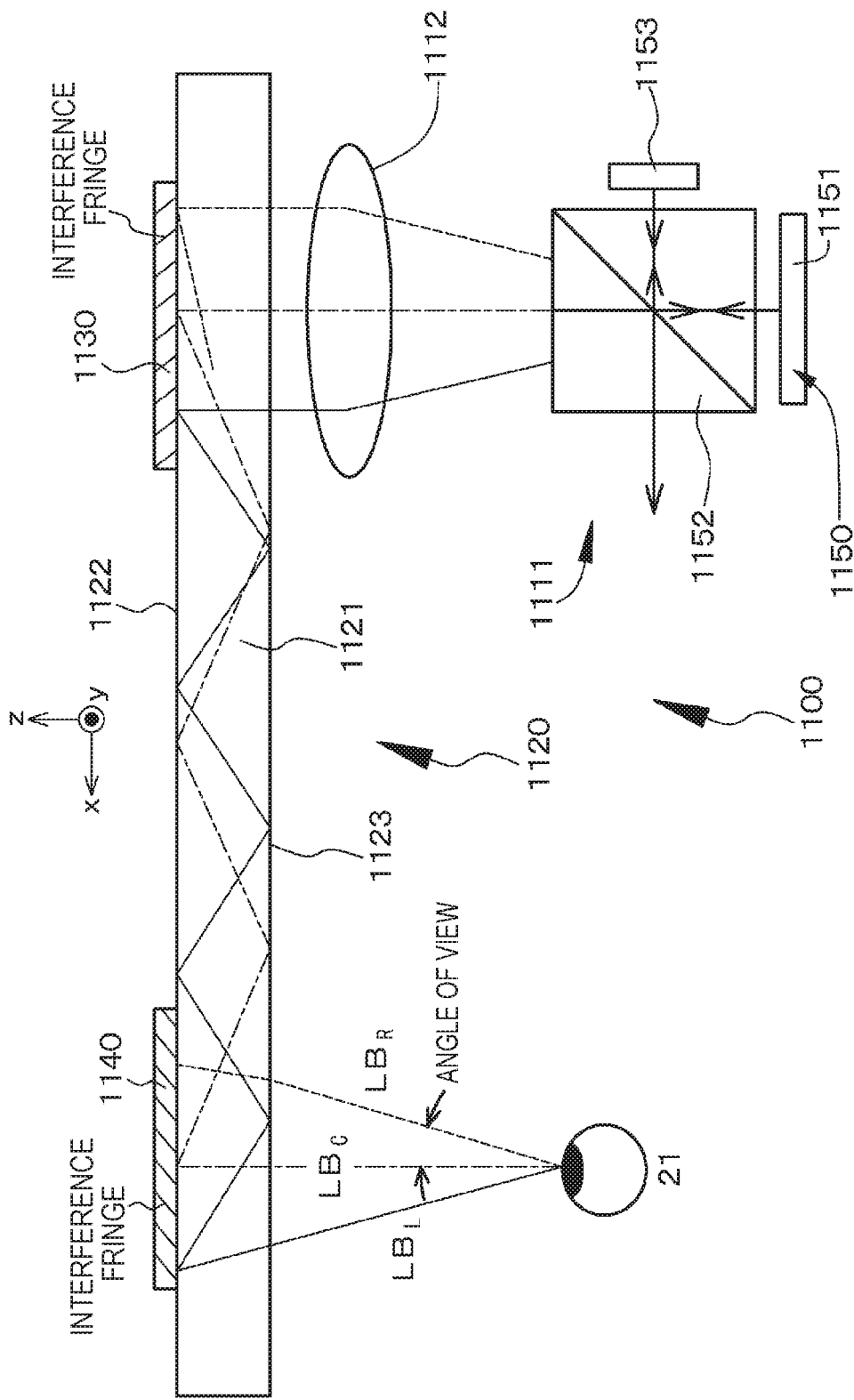
FIG. 46 is a conceptual diagram of an image display device in a virtual image display device of a related art.

A relation between the angle of view and the centroid wavelength in the optical device according to the first embodiment in which the first deflection unit 130 is configured with the two hologram diffraction gratings 131 and 135 and a relation between the angle of view and the centroid wavelength in an optical device of a related art (see FIG. 46) in which the first deflection unit is configured with one hologram diffraction grating are illustrated in a graph of FIG. 41. In FIG. 41, a solid line indicates a result of the first embodiment, and a dotted line (substantially overlapping with the solid line) indicates a result of an example of the related art. In FIG. 41, a horizontal axis indicates the angle of view, and a vertical axis indicates the centroid wavelength. Further, as illustrated in FIG. 46, the angle of view refers to the angle in a horizontal plane formed by the light beam $LB_C$ (the light beam of the central angle of view) and the light beam incident on the pupil 21 of the observer. Referring to FIG. 41, regardless of whether the first deflection unit is configured with the two hologram diffraction gratings or one hologram diffraction grating, no difference in the centroid wavelength is recognized. In other words, regardless of whether the first deflection unit is configured with the two hologram diffraction gratings or one hologram diffraction grating, it is understood that there is substantially no difference in a color of an obtained image.

In the optical device and the display device according to the first embodiment or the second to sixth embodiments to be described later, the light sources 153 and 251 may be configured with two light sources, that is, a first light source and a second light source, and the combined optical spectrum of the light incident on the first deflection unit 130 may be controlled by controlling the intensity of light from the first light source and the intensity of light from the second light source. In this case, it is preferable that the peak wavelength in the combined optical spectrum of the light emitted from the two light sources be $\lambda_3$.

Second Embodiment

Figure 6:
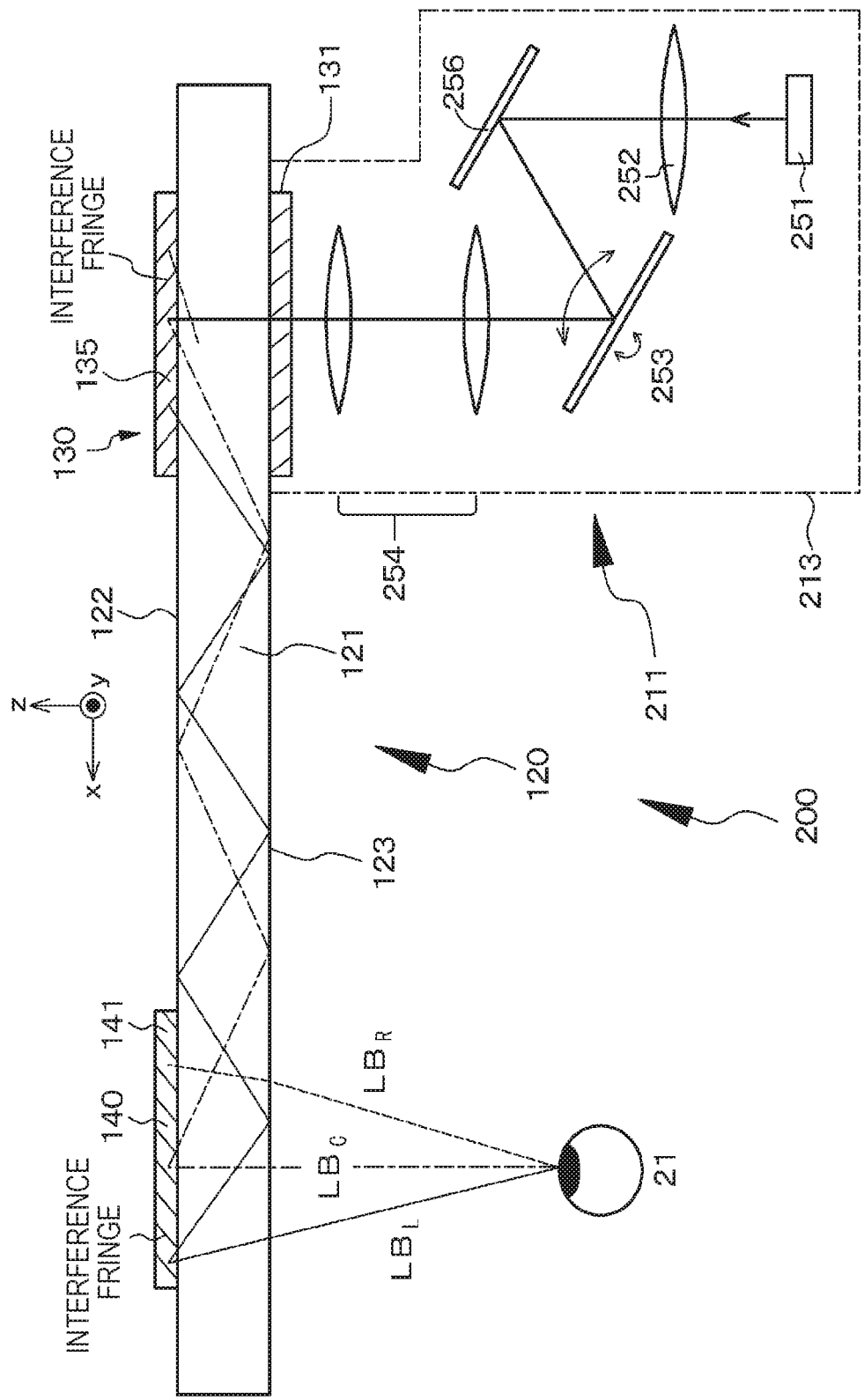
FIG. 6 is a conceptual diagram of an image display device in a display device according to a second embodiment.

The second embodiment is a modification of the first embodiment. As illustrated in FIG. 6 which is a conceptual diagram of the image display device 200 in the display device (the head mounted display) according to the second embodiment, the image forming apparatus 211 according to the second embodiment is configured with an image forming apparatus having a second configuration. In other words, the light source 251 and a scanning unit 253 that scans parallel light emitted from the light source 251 are provided. More specifically, the image forming apparatus 211 includes (a) the light source 251, (b) the collimating optical system 252 that converts light emitted from the light source 251 into parallel light, (c) the scanning unit 253 that scans the parallel light emitted from the collimating optical system 252, and (d) a relay optical system 254 that relays and emits the parallel light scanned by the scanning unit 253.

Here, the entire image forming apparatus 211 is accommodated in a housing 213 (indicated by a dashed line in FIG. 6), an opening (not illustrated) is disposed in the housing 213, and light is emitted from the relay optical system 254 via the opening. Each housing 213 is detachably attached to the temple section 13 by the mounting member 19.

The green light of the wavelength $\lambda_3$ emitted from the light source 251 including the light emitting diode (LED) enters the collimating optical system 252 having positive optical power as a whole and is then emitted as the parallel light. The parallel light is reflected by a total reflection mirror 256, undergoes horizontal scanning and vertical scanning performed by the scanning unit 253 configured with an MEMS capable of freely rotating a micro mirror in a two-dimensional direction and scanning the incident parallel light two-dimensionally, and is converted into a sort of two-dimensional image, so that virtual pixels (the number of pixels can be set to be the same as, for example, that in the first embodiment) are generated. Then, the light from the virtual pixels passes through the relay optical system (parallel light emission optical system) 254 configured with a well-known relay optical system, and light beam converted into the parallel light are incident on the optical device 120.

Since the optical device 120 that guides and emits the light beams converted into the parallel light which is emitted by the relay optical system 254 and incident thereon has the same configuration and structure as the optical device described in the first embodiment, detailed description thereof is omitted. Further, as described above, the display device according to the second embodiment has substantially the same configuration and structure as the display device according to the first embodiment except that the image forming apparatus 211 are different, and thus detailed description is omitted.

Third Embodiment

Figure 7:
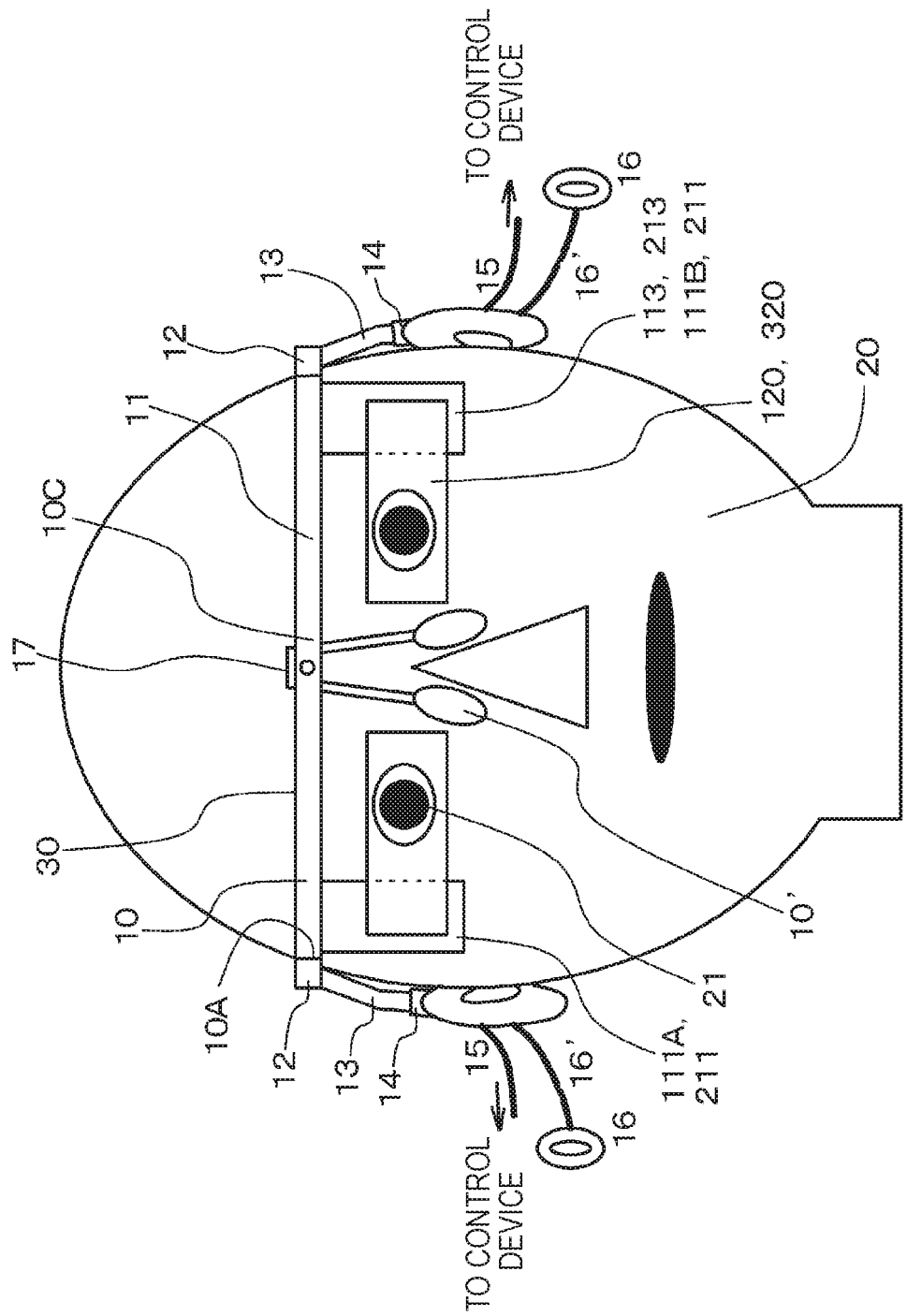
FIG. 7 is a schematic front view of a display device according to a third embodiment.
Figure 8:
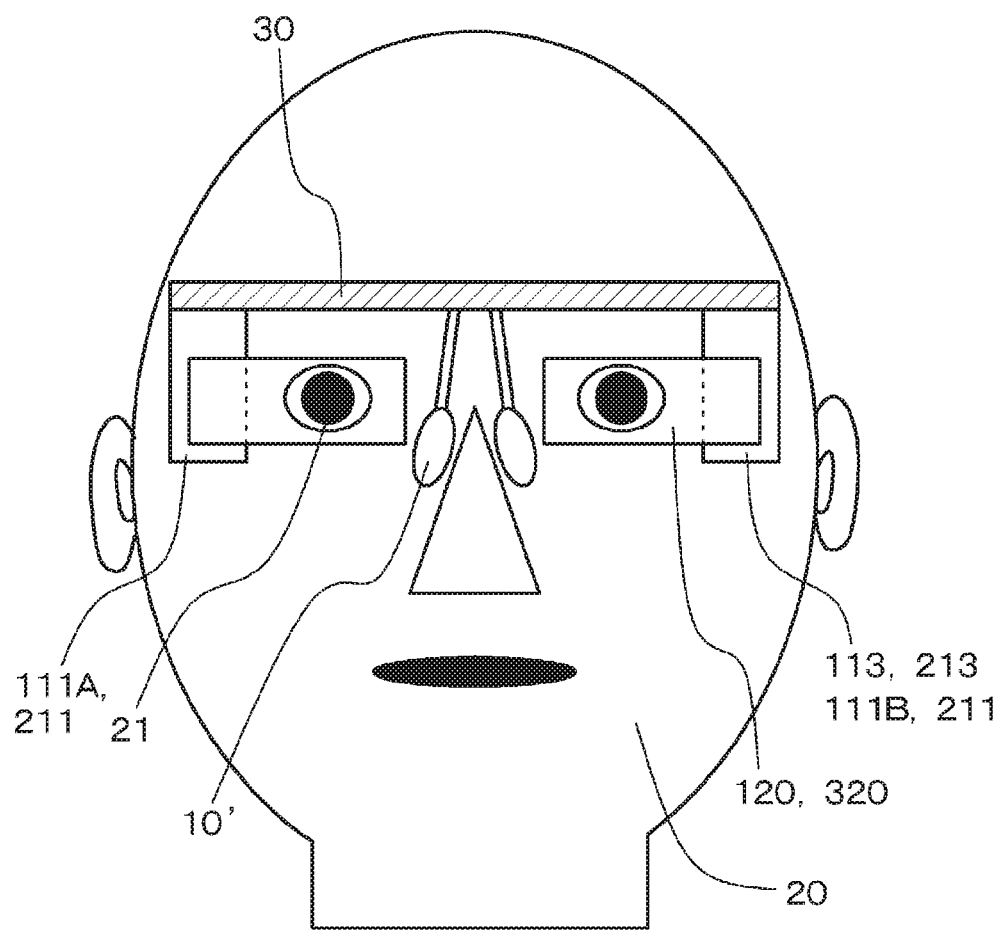
FIG. 8 is a schematic front view of the display device according to the third embodiment (in a state in which a frame is assumed to be removed).
Figure 9:
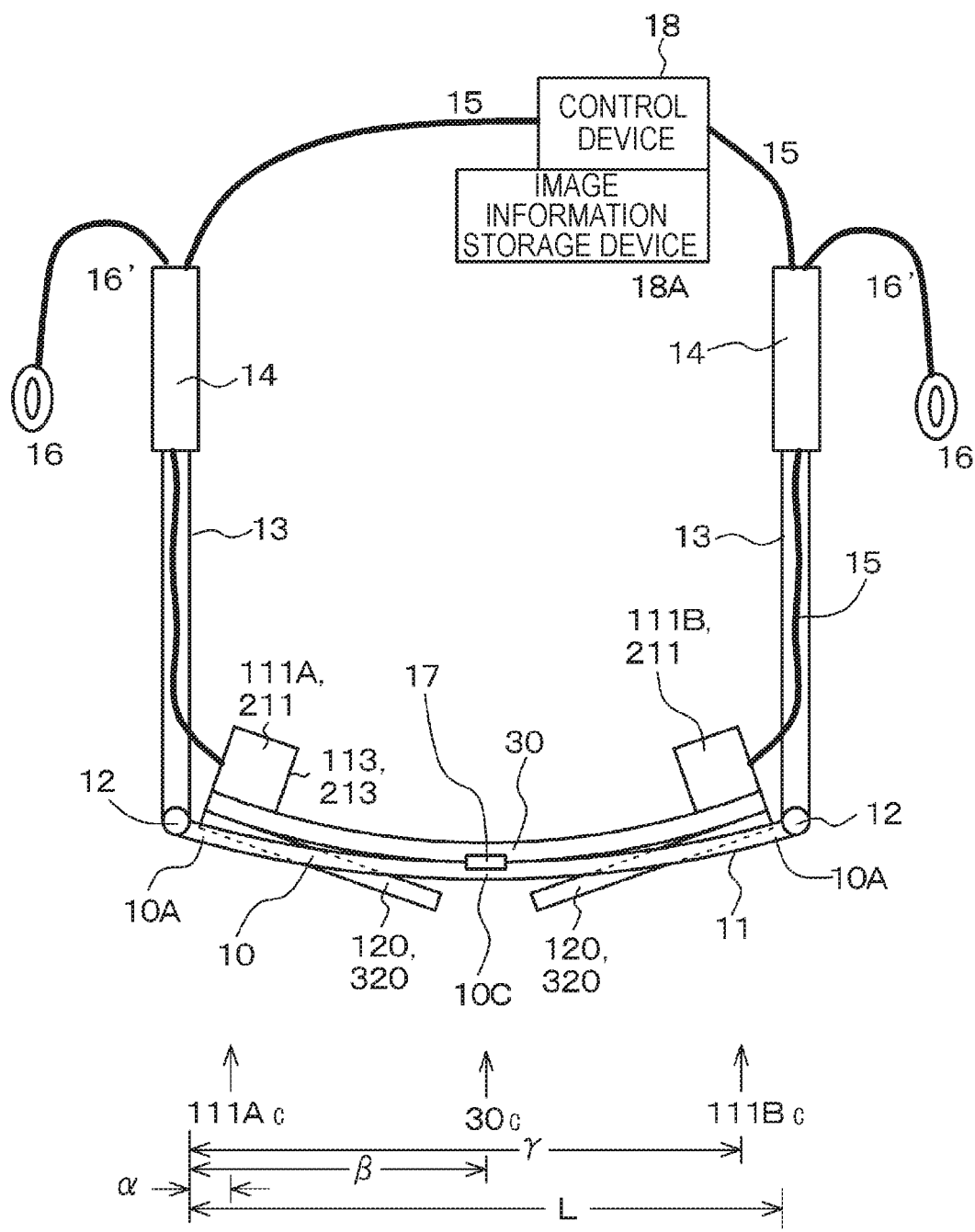
FIG. 9 is a schematic top view of the display device according to the third embodiment.
Figure 10:
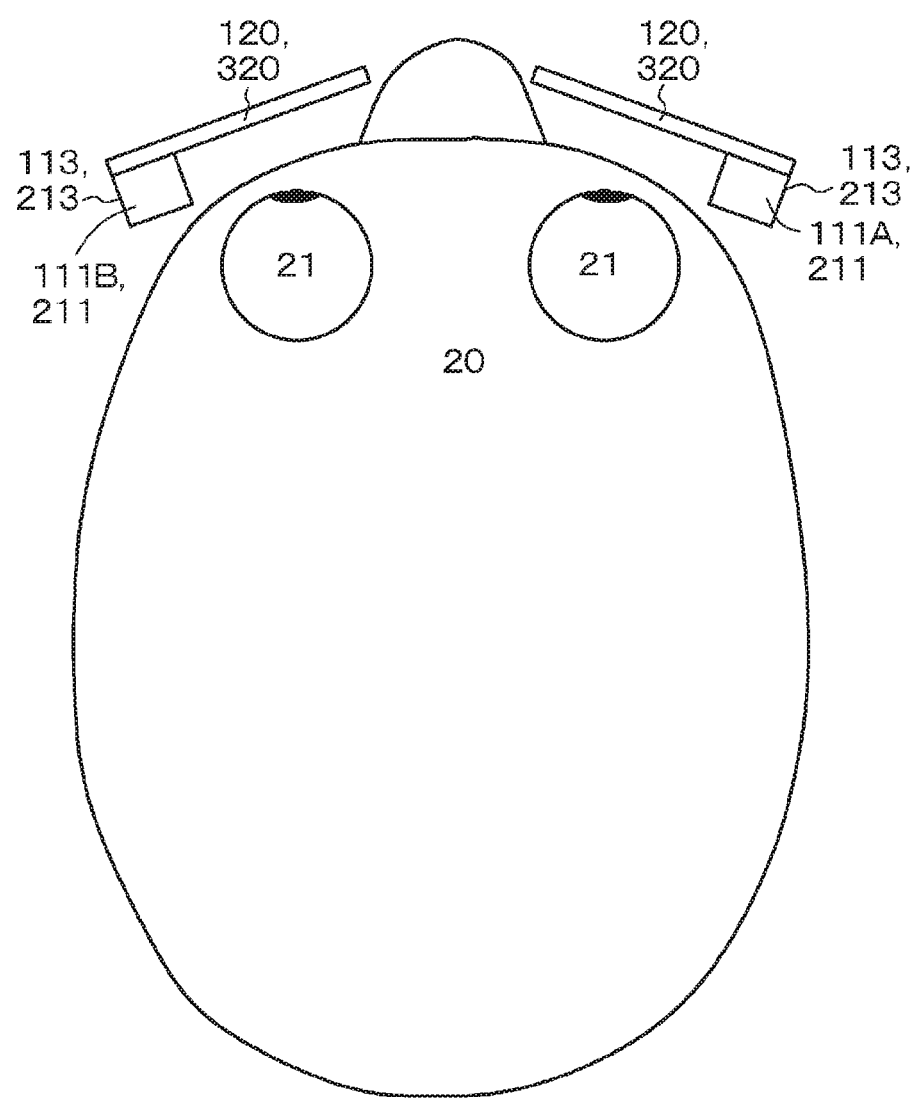
FIG. 10 is a top view illustrating a state in which the display device of the third embodiment is worn on the head of the observer (here, only an image display device is illustrated, and illustration of a frame is omitted).

The third embodiment is a modification of the first and second embodiments. FIG. 7 is a schematic front view of a head-mounted display according to the third embodiment, and FIG. 8 is a schematic front view of the head-mounted display according to the third embodiment (here, a state in which the frame is assumed to be removed). FIG. 9 illustrates a schematic top view of the head-mounted display according to the third embodiment, and FIG. 10 is a top view illustrating a state in which the head mounted display of the third embodiment is worn on the head of the observer 20. In FIG. 10, for the sake of convenience, only the image display device is illustrated, and illustration of the frame is omitted. In the following description, the image display device is described as a representative of the image display device 100, but it will be appreciated that the image display device 200 can be applied.

The head-mounted display according to the third embodiment further includes a coupling member 30 that couples the two image display devices 100. The coupling member 30 is attached to a side of a middle portion 10C of the frame 10 facing the observer located between the two pupils 21 of the observer 20 (that is, between the observer 20 and the frame 10) using, for example, a screw (not illustrated). Furthermore, a projection image of the coupling member 30 is included in a projection image of the frame 10. In other words, when the head mounted display is viewed in the front of the observer 20, the coupling member 30 is hidden by the frame 10, and the coupling member 30 is not visually recognized. Further, although the two image display devices 100 are coupled by the coupling member 30, specifically, each of the image forming apparatus 111A and 111B is stored in the housing 113, and the housing 113 is attached to each end portion of the coupling member 30 so that a mounted state can be adjusted. Each of the image forming apparatuses 111A and 111B is located more outward than the pupil 21 of the observer 20. Specifically, if a distance between a mounting portion center $111A_C$ of one image forming apparatus 111A and one end portion (one end) 10A of the frame 10 is indicated by $\alpha$, a distance from a center $30_C$ of the coupling member 30 to one end portion (one end) 10A of the frame 10 is indicated by $\beta$, a distance between a mounting portion center $111B_C$ of the other image forming apparatus 111B and one end portion (one end) 10A of the frame 10 is indicated by $\gamma$, and a length of the frame 10 is indicated by L, the following relations are held:

$\alpha = 0.1 \times L$ $\beta = 0.5 \times L$ $\gamma = 0.9 \times L$

Figure 12:
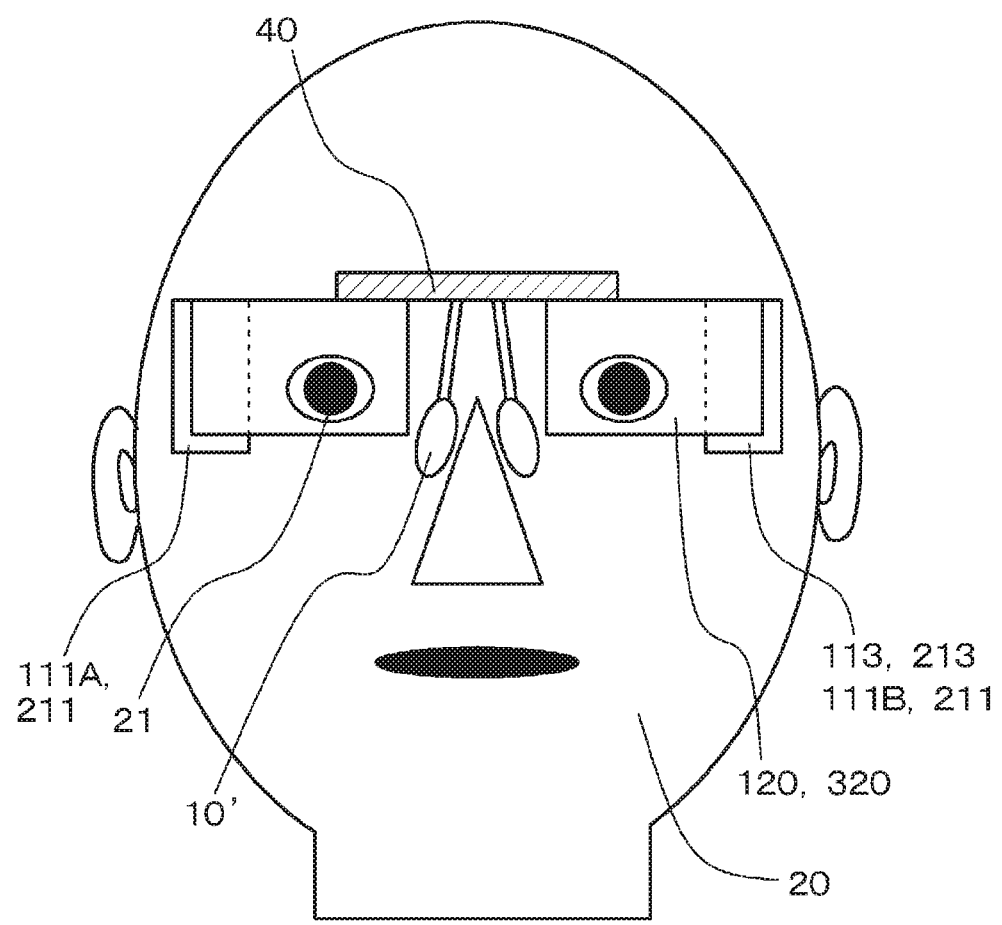
FIG. 12 is a schematic front view of the display device of the fourth embodiment (in a state in which a frame is assumed to be removed).
Figure 13:
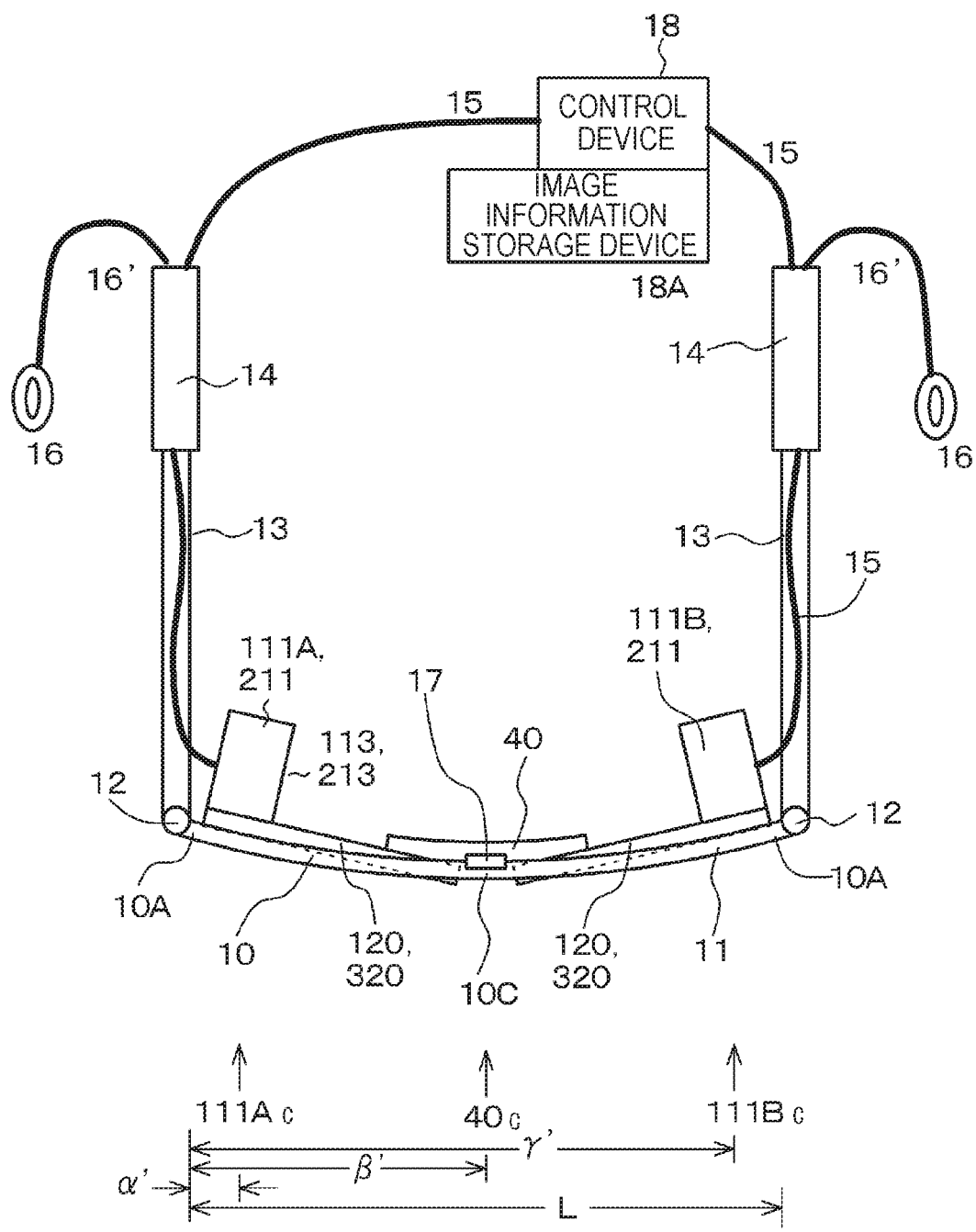
FIG. 13 is a schematic top view of the display device of the fourth embodiment.

Specifically, the mounting of the image forming apparatuses (specifically, the image forming apparatuses 111A and 111B) to the respective end portions of the coupling member 30 is carried out, for example, such that through holes (not illustrated) are formed at three positions on each of the end portions of the coupling member, holes with a tap (threaded portion) (not illustrated) corresponding to the through holes are formed in the image forming apparatuses 111A and 111B, and screws (not illustrated) are inserted into the respective through holes and screwed into the holes formed in the image forming apparatuses 111A and 111B. A spring is inserted between the screw and the hole. Thus, it is possible to adjust the mounted state of the image forming apparatus (an inclination of the image forming apparatus with respect to the coupling member), depending on a tightened state of the screw. After the mounting, the screw is hidden by a lid (not illustrated). In FIGS. 8 and 12, in order to clearly illustrate the coupling members 30 and 40, the coupling members 30 and 40 are hatched. The coupling member 30 is attached to the middle portion 10C of the frame 10 (corresponding to the bridge in the ordinary glasses) located between the two pupils 21 of the observer 20. The nose pad 10' is attached to the side of the coupling member 30 facing the observer 20. In FIG. 9 and FIG. 13, illustration of the nose pad 10' is omitted. The frame 10 and the coupling member 30 are made of metal or plastic, and the shape of the coupling member 30 is a curved bar shape.

As described above, in the head-mounted display (HMD) according to the third embodiment, the coupling member 30 couples the two image display devices 100, and the coupling member 30 is attached to the middle portion 10C of the frame 10 located between the two pupils 21 of the observer 20. In other words, each of the image display devices 100 is not directly attached to the frame 10. Therefore, when the observer 20 wears the frame 10 on the head, the temple section 13 spreads outward, and as a result, even when the frame 10 is deformed, the image forming apparatuses 111A and 111B suffer no displacement (position change) caused by the deformation of the frame 10, and although the displacement occurs, it is extremely small. Therefore, it is possible to reliably prevent a convergence angle of left and right images from changing. Further, since there is no need to increase the rigidity of the front section 11 of the frame 10, an increase in weight of the frame 10, deterioration in design property, and a cost increase are not caused. Further, since the image display device 100 is not attached directly to the glasses type frame 10, it is possible to freely select a design or a color of the frame 10 in accordance with the preference of the observer, and constraints to the design of the frame 10 are also are small, and a degree of freedom of design is high. Further, when the head-mounted display is viewed in the front of the observer, coupling member 30 is hidden by the frame 10. Therefore, it is possible to implement the head mounted display with high design property.

Fourth Embodiment

Figure 11:
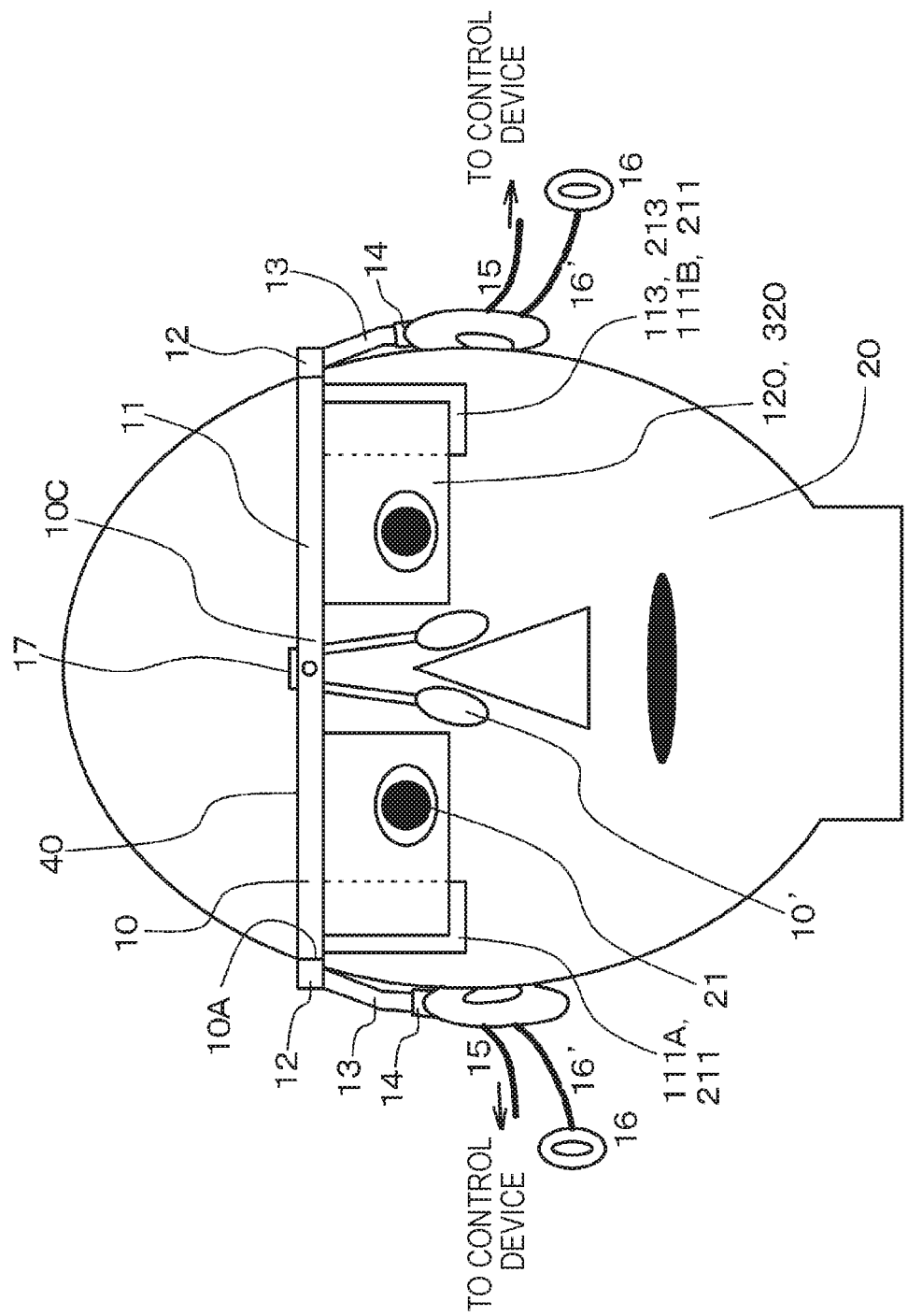
FIG. 11 is a schematic front view of a display device of a fourth embodiment.

The fourth embodiment is a modification of the third embodiment. FIG. 11 is a schematic front view of the head mounted display according to the fourth embodiment, and FIG. 12 is a schematic front view of the head mounted display according to the fourth embodiment (here, a state in which the frame is assumed to be removed). FIG. 13 is a schematic top view of the head mounted display according to the fourth embodiment.

In the head-mounted display according to the fourth embodiment, a rod-like coupling member 40 couples the two optical devices 120 instead of coupling the two image forming apparatuses 111A and 111B, unlike the third embodiment. Further, a configuration in which the two optical devices 120 are integrally formed, and the coupling member 40 is attached to the integrated optical device 120.

Here, even in the head mounted display of the fourth embodiment, the coupling member 40 is attached to the middle portion 10C of the frame 10 located between the two pupils 21 of the observer 20, for example, using a screw, and each image forming apparatus 111 is located more outward than the pupil 21 of the observer 20. Further, each image forming apparatus 111 is attached to an end portion of the optical device 120. If the distance from a center $40_C$ of the coupling member 40 to one end of the frame 10 is indicated by $\beta$, and the length of the frame 10 is indicated by L, $\beta=0.5\times L$ is satisfied. Here, values of $\alpha'$ and the value of $\gamma'$ in the fourth embodiment are the same as the values of $\alpha$ and $\gamma$ in the third embodiment.

In the fourth embodiment, the frame 10 and each image display device have the same configuration and structure as the frame 10 and the image display device described in the third embodiment. Therefore, detailed description thereof is omitted. Further, the head mounted display of the fourth embodiment also has substantially the same configuration and structure as the head mounted display of the third embodiment except the above difference, and thus detailed explanation is omitted.

Fifth Embodiment

The fifth embodiment is a modification of the first to fourth embodiments. FIG. 14 is a conceptual diagram of an image display device in a display device according to the fifth embodiment. The display device according to the fifth embodiment has a configuration in which arrangement positions of the first hologram diffraction grating 131 and the second hologram diffraction grating 135 of the display device according to the first embodiment illustrated in FIG. 1 are switched with each other. According to an experiment by the present inventors, this configuration can suppress a decrease in the resolution when the thickness of the hologram diffraction grating is increased. In the case of the fifth embodiment, values of $\phi_1$, $\phi_2$, $\phi_3$, $P_1=P_3=P_2$, $\lambda_1$, $\lambda_3$, $\lambda_2$, $\eta_1$, $\eta_2$, $\eta_3$, $T_1$, $T_2$, and $T_3$ have the values shown in Table 1 but not limited thereto. Differences between the first embodiment and the fifth embodiment are indicated by coloring the column of the fifth embodiment. In the fifth embodiment, a film thickness $T_1$ of the first hologram diffraction grating 131 and a film thickness $T_2$ of the second hologram diffraction grating 135 are thicker than those in the first embodiment. Accordingly, a diffraction efficiency $\eta_1$ of the first hologram diffraction grating 131 and a diffraction efficiency $\eta_2$ of the second hologram diffraction grating 135 are high. In the fifth embodiment, both the first hologram diffraction grating 131 and the second hologram diffraction grating 135 are made of a photopolymer material, and $\eta_1>\eta_2$. Here, in the hologram diffraction grating made of the photopolymer material, generally, the diffraction efficiency tends to decrease as the wavelength decreases. Therefore, when the second hologram diffraction grating having the smaller peak wavelength than the first hologram diffraction grating is configured with a hologram diffraction grating with low diffraction efficiency, it is easier to manufacture the hologram diffraction grating.

Table 1 illustrates values of various parameters such as $\phi_1$ in reference examples 5A and 5B. The reference example 5A corresponds to the configuration illustrated in FIG. 1, that is, the configuration in which the arrangement positions of the first hologram diffraction grating 131 and the second hologram diffraction grating 135 are opposite to those of the fifth embodiment. Differences between the fifth embodiment and the reference example 5A are illustrated by coloring the column of the reference example 5A. Further, the reference example 5B corresponds to the configuration illustrated in FIG. 1 but differs from the reference example 5A in that the film thickness $T_1$ of the first hologram diffraction grating 131 and the film thickness $T_2$ of the second hologram diffraction grating 135 are thin, and the diffraction efficiency $\eta_1$ of first hologram diffraction grating 131 and the diffraction efficiency $\eta_2$ of the second hologram diffraction grating 135 are decreased. Differences between the reference example 5A and the reference example 5B are illustrated by coloring the column of the reference example 5B.

In the fifth embodiment, the resolutions of the optical devices in the reference example 5A and the reference example 5B were evaluated based on an MTF. Here, the MTF is a performance evaluation method based on a contrast reproduction ratio, an MTF at a specific spatial frequency corresponds to the resolution, and the resolution increases as a value increases. For the horizontal direction, the MTF was measured in the light beam $LB_C$, the light beam $LB_L$, and the light beam $LB_R$ illustrated in FIG. 1 (located in the xy plane passing through the optical device center point O). Further, for the vertical direction, the MTF was measured on an upper end side of the light beam $LB_C$ of FIG. 1 corresponding to a positive side in the y axis direction, on a center part corresponding to a zero point in the y axis, and a lower end side corresponding to a negative side in the y axis. The results are shown in the following Table 2. Table 2 shows brightness values of the fifth embodiment and the reference example 5A when luminance of an observation image output from the optical device of the reference example 5B is assumed to be 1.0.

TABLE 2

|  | Fifth embodiment | Reference example 5A | Reference example 5B |
| --- | --- | --- | --- |
| Light beam $LB_L$ | 35 | 33 | 45 |
| Light beam $LB_C$ | 50 | 45 | 52 |
| Light beam $LB_R$ | 52 | 47 | 53 |
| Upper end side | 75 | 66 | 79 |
| Center part | 70 | 65 | 75 |
| Lower end side | 74 | 67 | 78 |
| Brightness | 1.2 | 1.2 | 1.0 |

If the fifth embodiment is compared with the reference example 5A, the MTF value is improved by about 10% although it has the same brightness. The reason is estimated as follows. In other words, of the hologram diffraction gratings in the first deflection unit 130, the light diffracted by the hologram diffraction grating on the first surface 122 side does not reach the surface of the hologram diffraction grating and is not reflected on the surface, whereas the light diffracted by the hologram diffraction grating on the second surface 123 side is reflected on the surface of the hologram diffraction grating (referred to as an "opposite surface" for the sake of convenience). Since the surface of the hologram diffraction grating is lower in flatness than the glass surface, the MTF value decreases due to light reflection on the opposite surface of the hologram diffraction grating on the second surface 123 side. However, when $\eta_1 > \eta_2$ is set, a contribution of diffraction of the second hologram diffraction grating 135 with respect to a total light quantity is smaller than a contribution of diffraction of the first hologram diffraction grating 131 with respect to the total light quantity. Further, since the contribution of diffraction of the second hologram diffraction grating 135 in which light reflection can occur on the surface of the hologram diffraction grating can occur is small, the MTF value is improved accordingly.

If the reference example 5A is compared with the reference example 5B, when the thicknesses $T_1$ and $T_2$ of the first hologram diffraction grating 131 and the second hologram diffraction grating 135 are increased from 3.0 μm to 4.0 μm, the brightness becomes 1.2 times. However, when the film thickness of the hologram diffraction grating is increased, the resolution tends to decrease as can be seen from Table 2. As a countermeasure against this, it is effective to switch the arrangement positions of the first hologram diffraction grating 131 and the second hologram diffraction grating 135 as in the fifth embodiment.

According to the experiment by the present inventors, when the value of $T_2$ exceeds 3.0 μm, the configuration illustrated in FIG. 14 is higher in the MTF improvement effect than the configuration illustrated in FIG. 1. It is because it is presumed that the film thickness of the hologram diffraction grating exceeds 3.0 μm because the surface flatness of the hologram diffraction grating tends to deteriorate.

Furthermore, the film thickness of the third hologram diffraction grating 141 is preferably 2.0 μm or less, more preferably 1.6 μm or less. If it exceeds 2.0 μm, the decrease in the brightness in the light beam $LB_L$ and the light beam $LB_R$ with respect to the brightness in the light beam $LB_C$ is increased, and the balance gets worse. Further, when the film thickness is set to 1.6 μm or less, it is possible to maintain the high resolution. According to various kinds of experiments, when the film thickness of the third hologram diffraction grating 141 was changed from 1.0 μm to 1.4 μm, the diffraction efficiency was about 1.1 times, but the MTF value was not substantially changed. However, when the film thickness was 1.4 μm to 1.7 μm, the diffraction efficiency was about 1.1 times, and the MTF value decreased by about 10%. This is because a theoretical boundary value of the MTF value of the thin hologram diffraction grating and the thick hologram diffraction grating is around 1.6 μm or because when the film thickness exceeds 1.6 μm, the surface flatness of the hologram diffraction grating is presumed to decrease easily.

Even when $T_1 > T_2$ is set, $\eta_1 > \eta_2$ can also be achieved, and the same phenomenon and the same effects as described above could be confirmed.

Further, the reference example 5A and the reference example 5B, or in the case of the reference examples 6A to 6F to be described later are also included in the optical device of the present disclosure, and it will be appreciated that these characteristics have no problem practically.

Sixth Embodiment

The sixth embodiment is a modification of the first to fifth embodiments. It is assumed that the light guided by the light guide plate 121 collides with the second deflection unit 140, and light extraction takes place three times. When the light extraction takes place twice or more in this manner, anyone from children to adults, that is, from observers with a small interpupillary distance to observers with a large interpupillary distance can observe images. For example, if the diffraction efficiency of the second deflection unit is 20%, among the light of 100% ($=I_0$), the light reaches the pupil of the observer at the following ratios:

a first light extraction ratio: 20% ($=I_1=I_0 \times 0.2$);
a second light extraction ratio: 16% ($=I_2=\{I_0-I_1\} \times 0.2$); and a third light extraction ratio: 13% (=$I_3$={$I_0$-$I_1$-$I_2$}×0.2), and the image becomes dark toward the light propagation direction. Further, if the diffraction efficiency of the second deflection unit is 15%, the light reaches the pupil of the observer at the following ratios:

a first light extraction ratio: 15% (=$I_1$=$I_0$×0.15);
a second light extraction ratio: 13% (=$I_2$={$I_0$-$I_1$}×.15); and
a third light extraction ratio: 11% (=$I_3$={$I_0$-$I_1$-$I_2$}×.15).

Typically, in order to increase the range in which the image can be observed, the diffraction efficiency of the second deflection unit 140 is designed to be low. However, as described above, as the distance of the region of the second deflection unit 140 from the first deflection unit 130 increases, the brightness of the image becomes darker. In order to increase the brightness of the image, it is necessary to increase the brightness of the light source, but this leads to an increase in the power consumption of the entire display device.

FIG. 15 illustrates a film thickness dependence relation of the diffraction efficiency of the hologram diffraction grating and the half-value width. Here, a value Δn of the refractive index modulation degree is 0.045. It can be understood that it is possible to increase the diffraction efficiency by about 5% by increasing the thickness of the hologram diffraction grating by 0.2 μm.

Further in the sixth embodiment, the second hologram diffraction grating 135 and the third hologram diffraction grating 141 are disposed (adhered) to the first surface 122 of the light guide plate 121, and the first hologram diffraction grating 131 is disposed (adhered) to the second surface 123 of the light guide plate 121. Further, in the third hologram diffraction grating 141, the region located far from the first deflection unit 130 has the higher diffraction efficiency than the region located close to the first deflection unit 130. Alternatively, in the third hologram diffraction grating 141, the region located far from the first deflection unit 130 is thicker than the region located close to the first deflection unit 130. Specifically, the thickness of the third hologram diffraction grating was changed stepwise. Through this configuration, it is possible to obtain the more uniform image observed by the observer along the axial direction of the light guide plate 121.

More specifically, when the third hologram diffraction grating 141 is configured with a 3A-th hologram diffraction grating 141A located close to the first deflection unit 130 and a 3B-th hologram diffraction grating 141B located farther from the first deflection unit 130, the diffraction efficiency of the 3A-th hologram diffraction grating 141A is indicated by $\eta_{eA}$, and the diffraction efficiency of the 3B-th hologram diffraction grating 141B is indicated by $\eta_{3B}$, $\eta_{3B} > \eta_{3A}$ is satisfied. Alternatively, if the thickness of the 3A-th hologram diffraction grating 141A is indicated by $T_{3A}$, and the thickness of 3B-th hologram diffraction grating 141B is indicated by $T_{3B}$, $T_{3B} > T_{3A}$ is satisfied.

Further, a configuration in which the 3A-th hologram diffraction grating 141A and the 3B-th hologram diffraction grating 141B are arranged on the first surface 122 of the light guide plate 121 (see FIG. 16A), a configuration in which the 3A-th hologram diffraction grating 141A and the 3B-th hologram diffraction grating 141B are arranged on the second surface 123 (see FIG. 16B), a configuration in which the 3A-th hologram diffraction grating 141A is arranged on the second surface 123 of the light guide plate 121, and the 3B-th hologram diffraction grating 141B is arranged on the first surface 122 of the light guide plate 121 (see FIG. 16C), or a configuration in which the 3A-th hologram diffraction grating 141A is arranged on the first surface 122 of the light guide plate 121, and the 3B-th hologram diffraction grating 141B is arranged on the second surface 123 of the light guide plate 121 (see FIG. 16D) may be provided. However, the third hologram diffraction grating 141 is not limited to the configuration with the two hologram diffraction gratings 141A and 141B, but the third hologram diffraction grating 141 can also be configured with three or more hologram diffraction gratings. When the third hologram diffraction grating is configured with two or more hologram diffraction gratings, one hologram diffraction grating (or one hologram diffraction grating group) is arranged on the first surface 122 of the light guide plate 121, and the other hologram diffraction grating (or the other hologram diffraction grating group) is arranged on the second surface 123 of the light guide plate 121, an orthogonally projection image of one hologram diffraction grating (or one hologram diffraction grating group) to the light guide plate 121 and an orthogonally projection image of the other hologram diffraction grating (or the other hologram diffraction grating group) to the light guide plate 121 may be in a state in which there is no gap between the orthogonally projection images (see FIGS. 16A, 16B, 16C and 16D), or the orthogonally projection images may overlap each other in a boundary portion in which they are facing to each other (see FIGS. 16E and 16F). Further, in this cases, it is desirable that the slant angle of the 3A-th hologram diffraction grating 141A be the same as the slant angle of the 3B-th hologram diffraction grating 141B. In FIGS. 16A to 16F, the thickness of the hologram diffraction grating is illustrated to be emphasized, and in FIGS. 16E and 16F, the state in which the orthogonally projection images overlap in the boundary portion in which they are facing to each other is illustrated to be emphasized.

The diffraction efficiencies and the light extraction ratios in sixth embodiments A to F and the diffraction efficiencies and the light extraction ratios in reference examples 6A to 6F are shown in Tables 3A and 3B, and in the sixth embodiment, it can be understood that it is possible to obtain the more uniform image observed by the observer along the axial direction of the light guide plate 121. In Tables 3A and 3B, "η" indicates the diffraction efficiency, and "I" indicates the light extraction ratio.

TABLE 3A

|  | embodiment 6A | | reference example 6A | |
| --- | --- | --- | --- | --- |
| emission | η | I | η | I |
| first | 25% | 25% | 25% | 25% |
| second | 25% | 19% | 25% | 19% |
| third | 30% | 17% | 25% | 14% |

|  | embodiment 6B | | reference example 6B | |
| --- | --- | --- | --- | --- |
| emission | η | I | η | I |
| first | 20% | 20% | 20% | 20% |
| second | 20% | 16% | 20% | 16% |
| third | 25% | 16% | 20% | 13% |

TABLE 3A-continued

|  | embodiment 6C | | reference example 6B | |
|---|---|---|---|---|
| emission | η | I | η | I |
| first | 15% | 15% | 15% | 15% |
| second | 20% | 13% | 15% | 13% |
| third | 20% | 14% | 15% | 11% |

TABLE 3B

|  | embodiment 6D | | reference example 6D | |
|---|---|---|---|---|
| emission | η | I | η | I |
| first | 25% | 25% | 25% | 25% |
| second | 25% | 19% | 25% | 19% |
| third | 30% | 17% | 25% | 14% |
| fourth | 30% | 12% | 25% | 11% |

|  | embodiment 6E | | reference example 6E | |
|---|---|---|---|---|
| emission | η | I | η | I |
| first | 20% | 20% | 20% | 20% |
| second | 20% | 16% | 20% | 16% |
| third | 25% | 16% | 20% | 13% |
| fourth | 25% | 12% | 20% | 10% |

|  | embodiment 6F | | reference example 6F | |
|---|---|---|---|---|
| emission | η | I | η | I |
| first | 15% | 15% | 15% | 15% |
| second | 15% | 13% | 15% | 13% |
| third | 20% | 14% | 15% | 11% |
| fourth | 20% | 12% | 15% | 9% |

Seventh Embodiment

The seventh embodiment relates to a display device according to a third aspect of the present disclosure. Conceptual diagrams of an image display device in a display device according to the seventh embodiment are illustrated in FIG. 17 (a modification of the image display device in the display device according to the first embodiment) or FIG. 18 (a modification of the image display device in the display device according to the second embodiment). A difference between the optical device according to the seventh embodiment and the optical devices of the first to sixth embodiments lies in that the first deflection unit is configured with one hologram diffraction grating (the first hologram diffraction grating), and the image forming apparatus includes a first light source having a peak wavelength $\lambda_{LS\text{-}1}$ and a second light source having a peak wavelength $\lambda_{LS\text{-}2}$.

Figure 18:
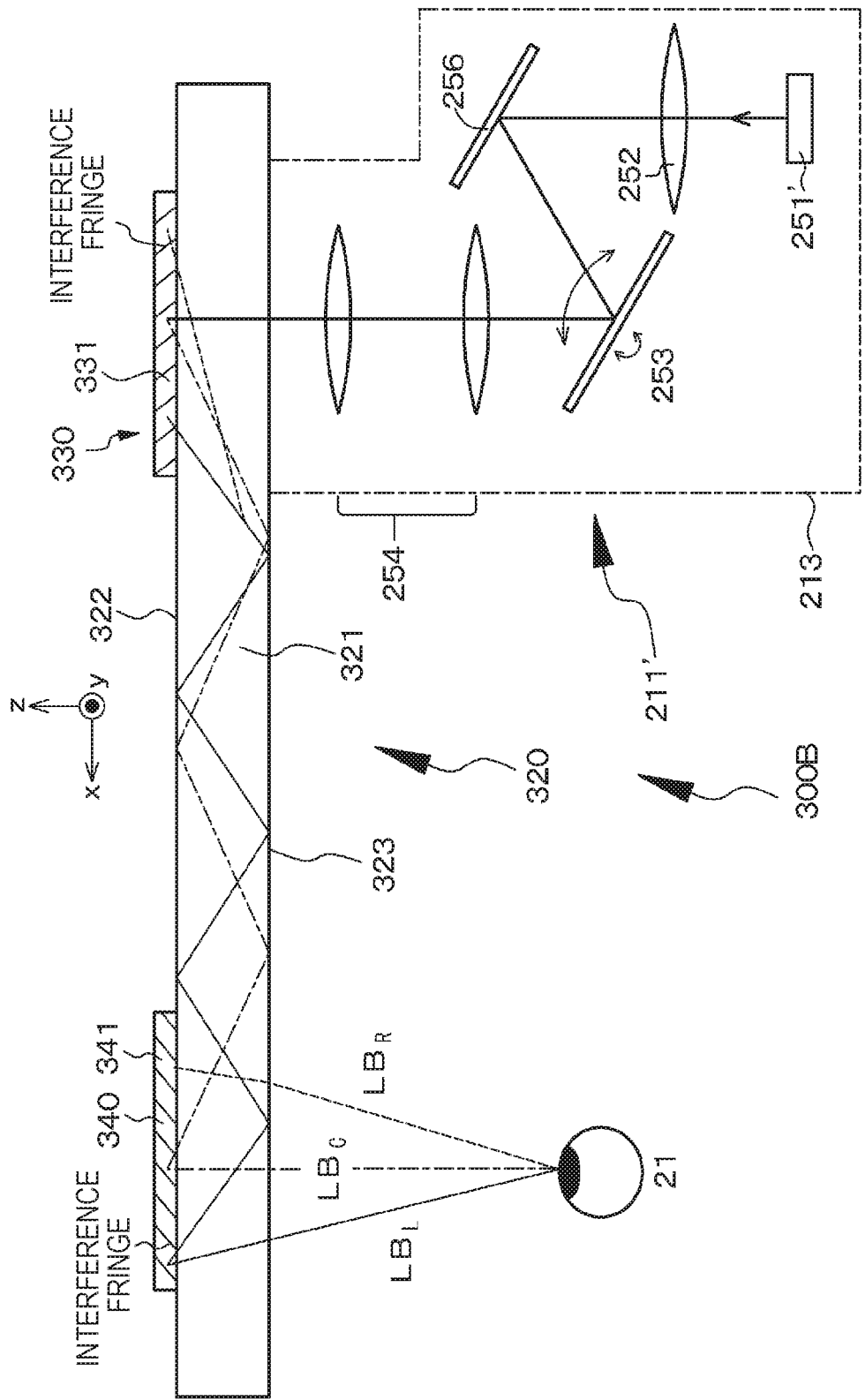
FIG. 18 is a conceptual diagram of an image display device in a modified example of the display device according to the seventh embodiment.

In other words, in the display device according to the seventh embodiment, the optical device includes (a) a light guide plate 321 that allows incident light to propagate inside through the total reflection and then emit, (b) a first deflection unit 330 that deflects the light incident on the light guide plate 321 so that the light incident on the light guide plate 321 is totally reflected inside the light guide plate 321, and (c) a second deflection unit 340 that deflects the light that has propagated inside the light guide plate 321 through the total reflection so that part of the light that has propagated inside the light guide plate 321 through the total reflection is emitted from the light guide plate 321, and the image forming apparatuses 111' and 211' include a first light source having a peak wavelength $\lambda_{LS\text{-}1}$ (for example, configured with a green light-emitting LED) and a second light source having a peak wavelength $\lambda_{LS\text{-}2}$ (for example, configured with a green light-emitting LED of the same color or the same system as the first light source), and the image forming apparatuses 111' and 211' forms an image on the basis of the light emitted from the first light source and the light emitted from the second light source. In FIGS. 17 and 18, the light emitted from the first light source and the light emitted from the second light source are illustrated by one light source 153' or 251', but the first light source and the second light source may be separately arranged. In other words, the arrangement of the first light source and the second light source is inherently arbitrary.

Here, $$0\ \text{nm} < |\lambda_{LS\text{-}2} - \lambda_{LS\text{-}1}| \leq 160\ \text{nm}$$

is satisfied, and specifically, $$\lambda_{LS\text{-}1} = 540\ \text{nm}$$

$$\lambda_{LS\text{-}2} = 510\ \text{nm},$$

the image display devices 300A and 300B control (specifically, independently control) the intensity of the light from the first light source and the intensity of the light from the second light source.

The first deflection unit 330 and the second deflection unit 340 are configured with a first hologram diffraction grating 331 and a second hologram diffraction grating 341, and specifically, each of the hologram diffraction gratings 331 and 341 is configured with a reflection type volume hologram diffraction grating. The slant angle and the pitch of the interference fringe formed in the first hologram diffraction grating 331 are indicated by $\phi_1'$ and $P_1'$, the slant angle and the pitch of the interference fringe formed in the second hologram diffraction grating 341 are indicated by $\phi_2'$ and $P_2'$, and the peak wavelength of the light which is deflected by the first deflection unit 330, propagates inside the light guide plate 321 through the total reflection, and is then deflected by the second deflection unit 340 is indicated by $\lambda'$. In this case, $$\phi_1' = \phi_2' \text{ and } P_1' = P_2', \text{ and}$$

$$\lambda_{LS\text{-}2} < \lambda' < \lambda_{LS\text{-}1}$$

Furthermore, if the diffraction efficiency of the first hologram diffraction grating 331 is $\eta_1'$, and the diffraction efficiency of the second hologram diffraction grating 341 is $\eta_2'$, $$\eta_1' \geq \eta_2'$$

preferably, $$\eta_1' > \eta_2',$$

and if the thickness of the first hologram diffraction grating 331 is $T_1'$, and the thickness of the second hologram diffraction grating 341 is $T_2'$, $$T_1' \geq T_2'$$

preferably, $$T_1' > T_2'$$

The values of $\phi_1' = \phi_2'$, $P_1' = P_2'$, $\lambda'$, $\lambda_{LS\text{-}1}$, $\lambda_{LS\text{-}2}$, $\eta_1'$, $\eta_2'$, $T_1'$, and $T_2'$ are set as shown in the following Table 4 but not limited to these values.

[Table 4]

$\phi_1' = \phi_2' = 33.0°$ $P_1' = P_2' = 0.330$ μm $\eta_1' = 0.60$ $\eta_2' = 0.15$ $T_1' = 3.0$ μm $T_2' = 1.0$ μm $\lambda_{LS-1} = 540$ nm $\lambda_{LS-2} = 510$ nm $\lambda' = 520$ nm Except for the above-mentioned points, the configuration and structure of the optical device and the display device according to the seventh embodiment can be made similar to the structure and structure of the optical device and the display device described in the first to sixth embodiments, and thus detailed description is omitted.

Figure 42A:
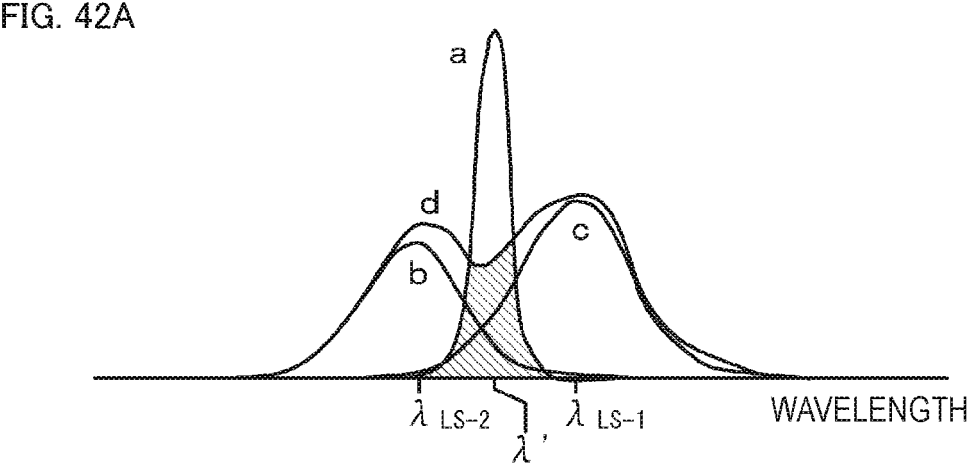
FIGS. 42A, 42B, and 42C are schematic diagrams for describing a relation between light incident on the optical device in the display device of the seventh embodiment and brightness of an image observed by the observer.
Figure 42B:
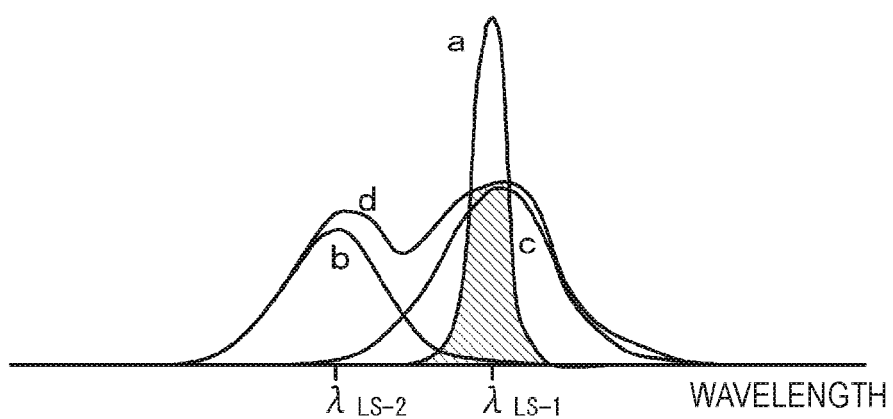
Figure 42C:
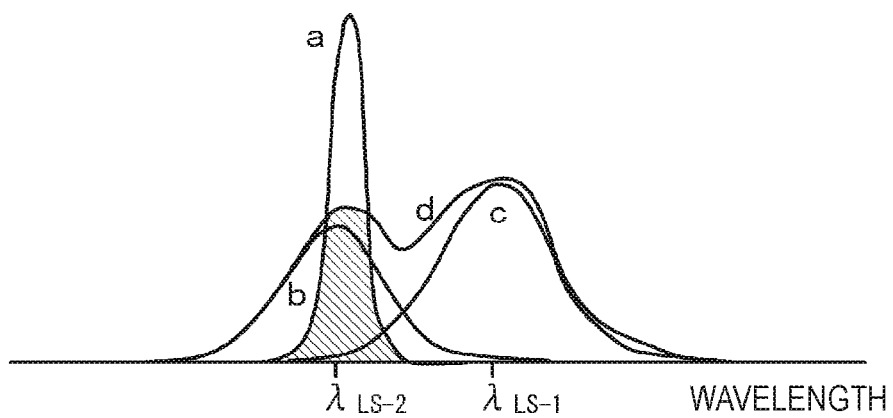

In the image display devices 300A and 300B according to the seventh embodiment, the image forming apparatuses 111' and 211' include the two light sources and form an image on the basis of the light emitted from the light sources. FIGS. 42A, 42B, and 42C are schematic diagrams for describing a relation between the light incident on the optical device in the display device according to the seventh embodiment and the brightness of the image observed by the observer. FIGS. 42A, 42B, and 42C, a curve "c" indicates an optical spectrum of the light emitted from the first light source having the peak wavelength $\lambda_{LS-1}$, a curve "b" having the peak wavelength $\lambda_{LS-2}$ indicates an optical spectrum of the light emitted from the second light source, and a curve "d" indicates a combined optical spectrum of the light emitted from the first light source and the second light source. Further, the image display devices 300A and 300B according to the seventh embodiment, in all of the light beam LB$_C$, the light beam LB$_R$, and the light beam LB$_L$ illustrated in FIGS. 17 and 18, the peak of the diffraction efficiency change curves "a" based on the first hologram diffraction grating 131 overlaps the high light intensity portion of the combined optical spectrum d (see FIGS. 42A, 42B, and 42C). In other words, it is desirable that the peak (or its vicinity) of the diffraction efficiency change curve (see the curve "a") based on the hologram diffraction grating 131 is located between the peak (or its vicinity) in the optical spectrum curve c of the light emitted from the first light source and the peak (or its vicinity) in the optical spectrum curve b of the light emitted from the second light source. In FIGS. 42A, 42B, and 42C, hatched regions are portions in which the light incident on the optical device 320 contribute to the brightness of the image viewed by the observer. As a result, the brightness of the image viewed by the observer does not significantly change on the image right side, the image center, and the image left side, and thus the brightness of the image can be made as uniform as possible.

Eighth Embodiment

Figure 19:
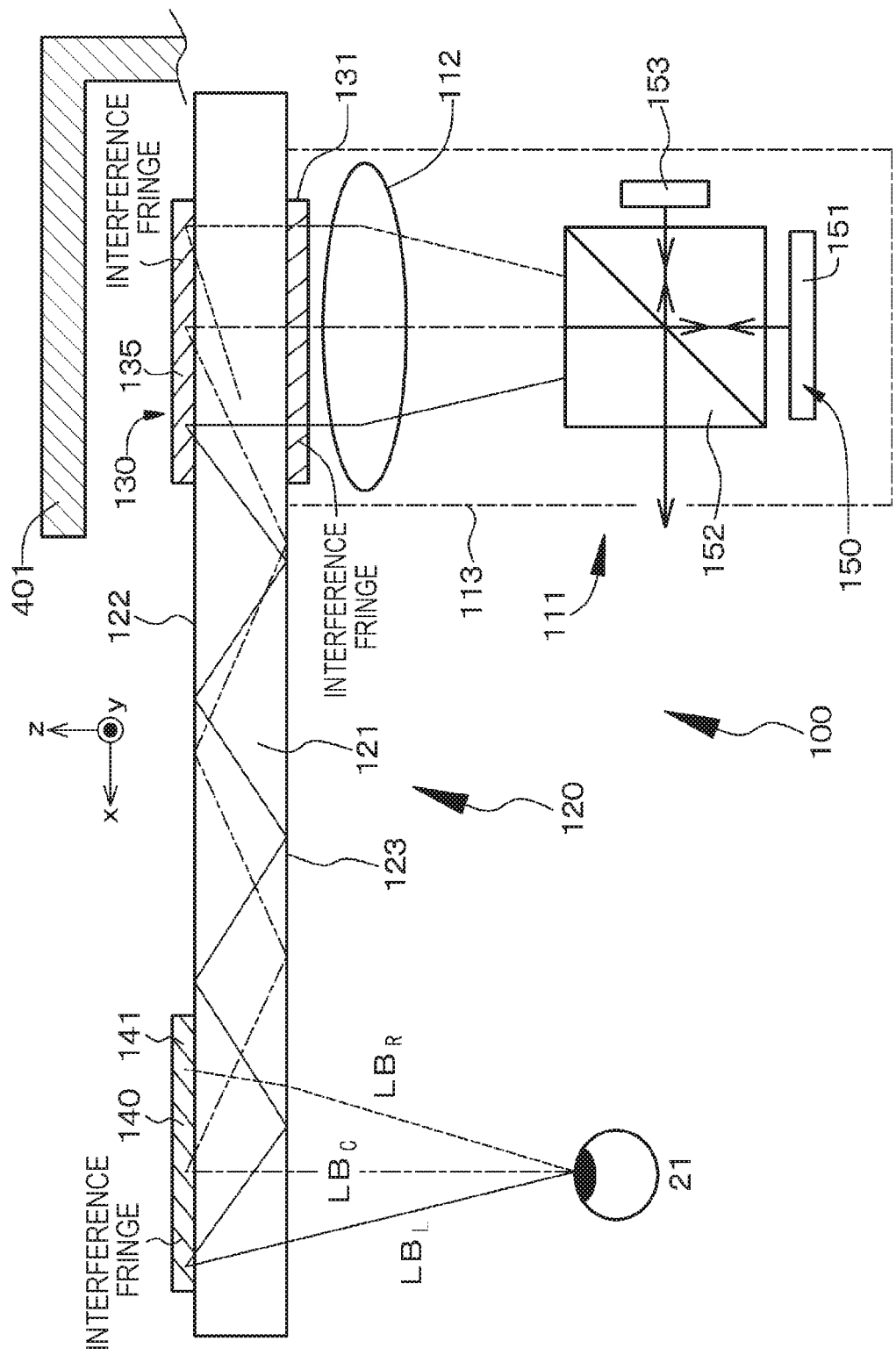
FIG. 19 is a conceptual diagram of an image display device in a display device according to an eighth embodiment.
Figure 20:
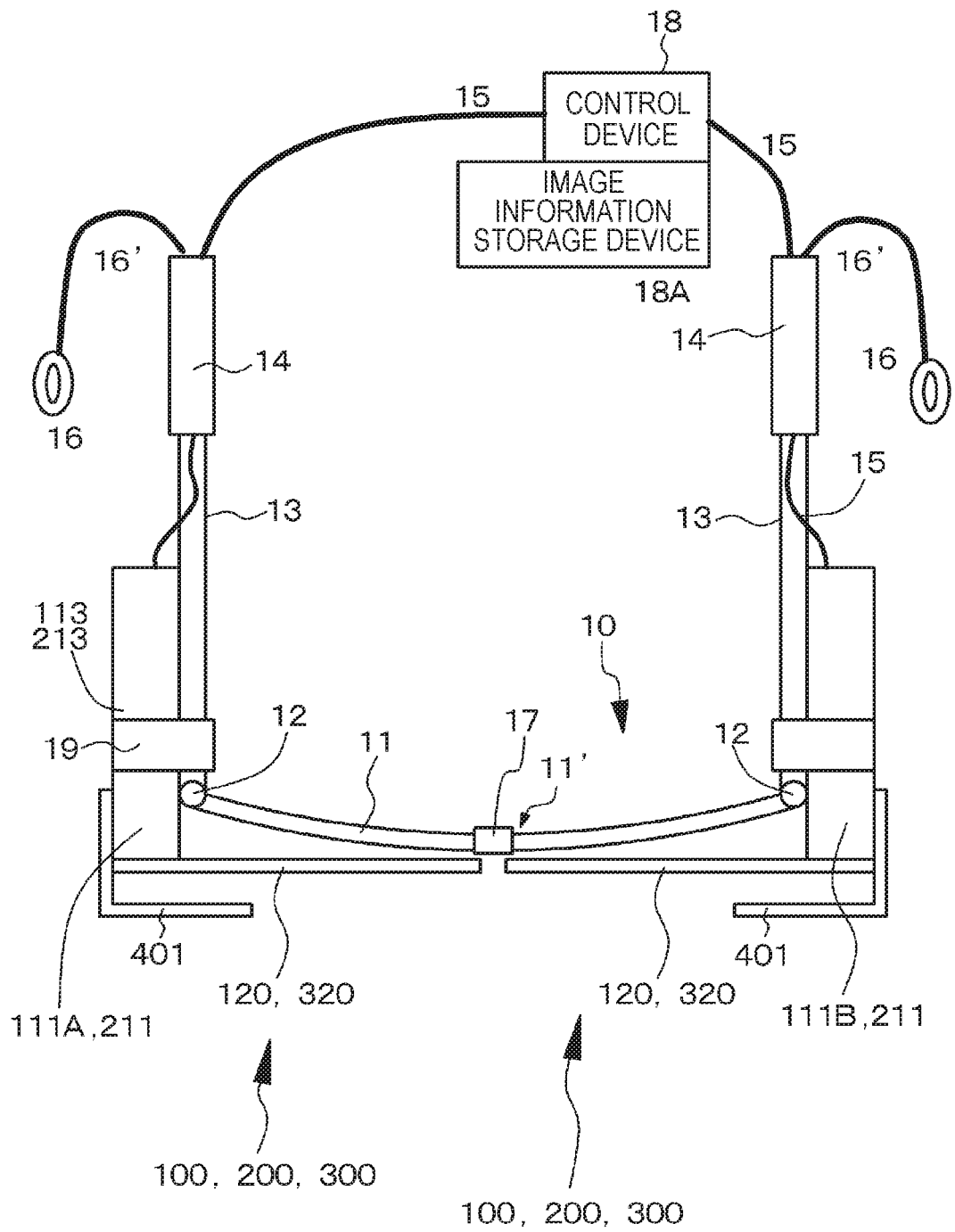
FIG. 20 is a schematic top view of the display device according to the eighth embodiment.
Figure 21:
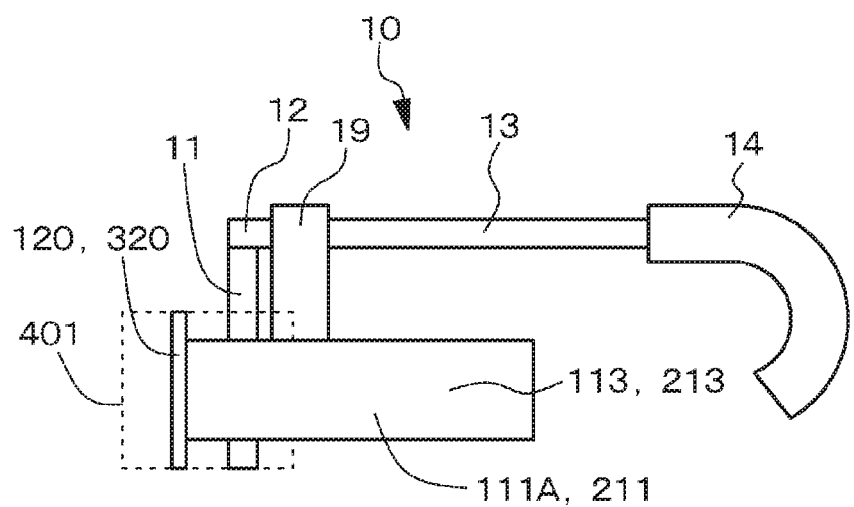
FIG. 21 is a schematic side view of the display device according to the eighth embodiment.

The eighth embodiment is a modification of the first to seventh embodiments. A conceptual diagram of an image display device is illustrated in FIG. 19, a schematic top view of a display device is illustrated in FIG. 20, a schematic side view of the display device is illustrated in FIG. 21, and in the display device according to the eighth embodiment, a light shielding member 401 is arranged or disposed outside the first surface 122 of the light guide plate 121 to cover the first deflection unit 130, the first hologram diffraction grating 131, and the second hologram diffraction grating 135 (hereinafter, referred to collectively as "first deflection unit 130 and the like"). Here, an orthogonally projection image of the first deflection unit 130 or the like to the light guide plate 121 is included in an orthogonally projection image of the light shielding member 401 to the light guide plate 121. Further, the following description of the eighth to eleventh embodiments will proceed on the basis of the optical device and the display device described in the first embodiment, but it will be appreciated that the eighth embodiment can be applied to other embodiments.

Specifically, for example, the light shielding member 401 that shields the incidence of external light on the optical device 120 is arranged in the region of the optical device 120 on which the light emitted from the image forming apparatus 111 is incident, specifically, the region in which the first deflection unit 130 and the like are disposed. Here, the region of the optical device 120 on which the light emitted from the image forming apparatus 111 is incident is included in within the projection image of the light shielding member 401 to the optical device 120. The light shielding member 401 is disposed on the side opposite to the side on which the image forming apparatus 111 of the optical device 120 is arranged, apart from the optical device 120. The light shielding member 401 is made, for example, of an opaque plastic material, and the light shielding member 401 integrally extends from the housing 113 of the image forming apparatus 111, is attached to the housing 113 of the image forming apparatus 111, integrally extends from the frame 10, or is attached to the frame 10 or the optical device 120. In the illustrated example, the light shielding member 401 integrally extends from the housing 113 of the image forming apparatus 111. As described above, since the light shielding member 401 which shields the incidence of external light on the optical device 120 is disposed in the region of the optical device 120 on which the light emitted from the image forming apparatus is incident, external light does not enter the region of the optical device 120 in which the light emitted from the image forming apparatus 111 is incident, specifically, the first deflection unit 130 and the like, and thus it is possible to prevent generation of undesirable stray light or the like and a deterioration of an image display quality in the display device.

Figure 22:
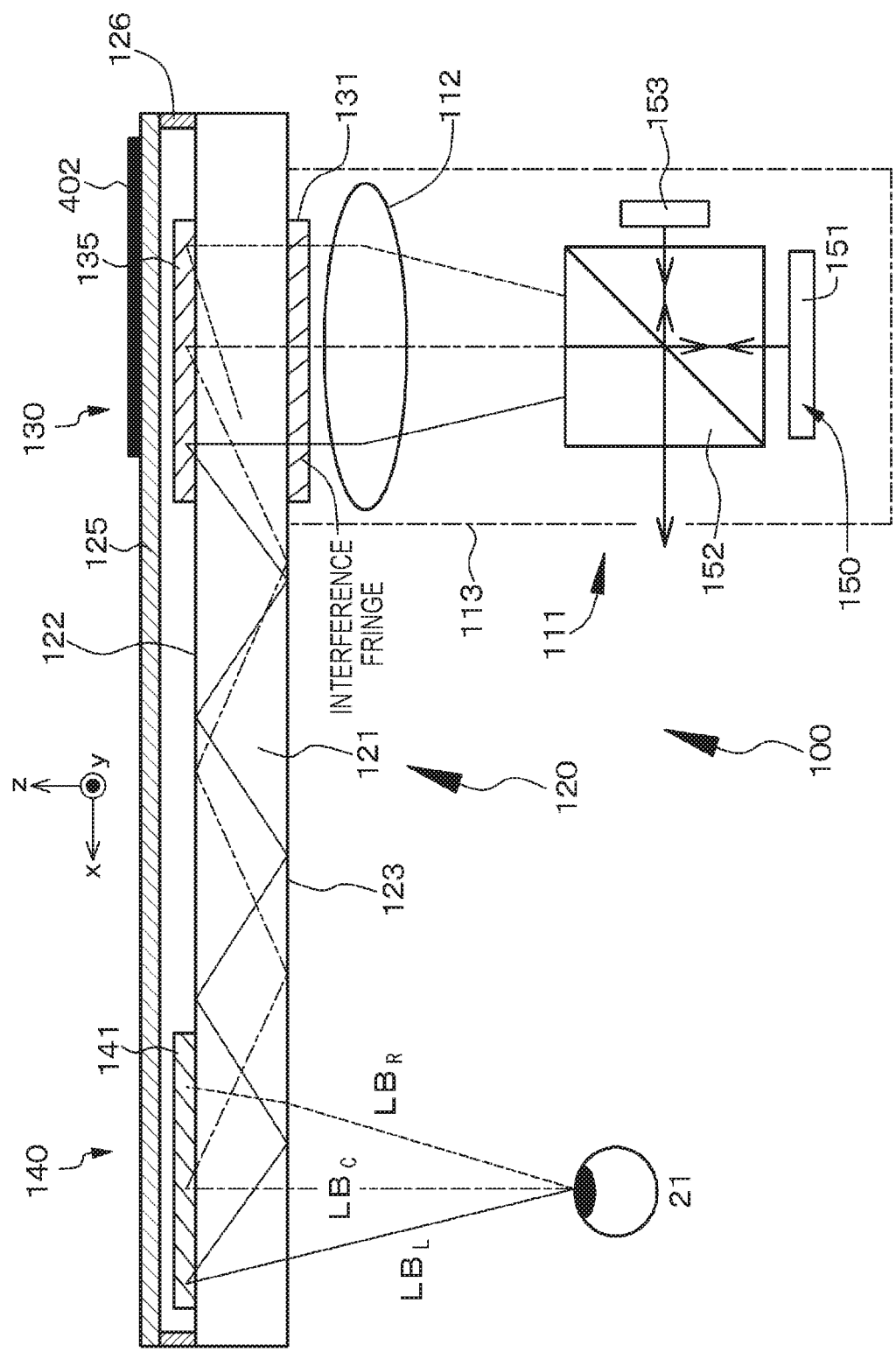
FIG. 22 is a conceptual diagram of a modified example of an image display device in the display device according to the eighth embodiment.

Alternatively, as illustrated in FIG. 22, a light shielding member 402 is arranged in a portion of the optical device 120 on the side opposite to the side on which the image forming apparatus 111 is disposed. Specifically, the light shielding member 402 can be formed by printing opaque ink on the optical device 120 (specifically, a transparent protecting member 125 covering the first surface 122 of the light guide plate 121). An outer edge of the light guide plate 121 and an outer edge of the transparent protecting member 125 are sealed or adhered by a sealing member 126. Here, it is possible to combine the light shielding member 401 with the light shielding member 402.

Ninth Embodiment

Figure 23:
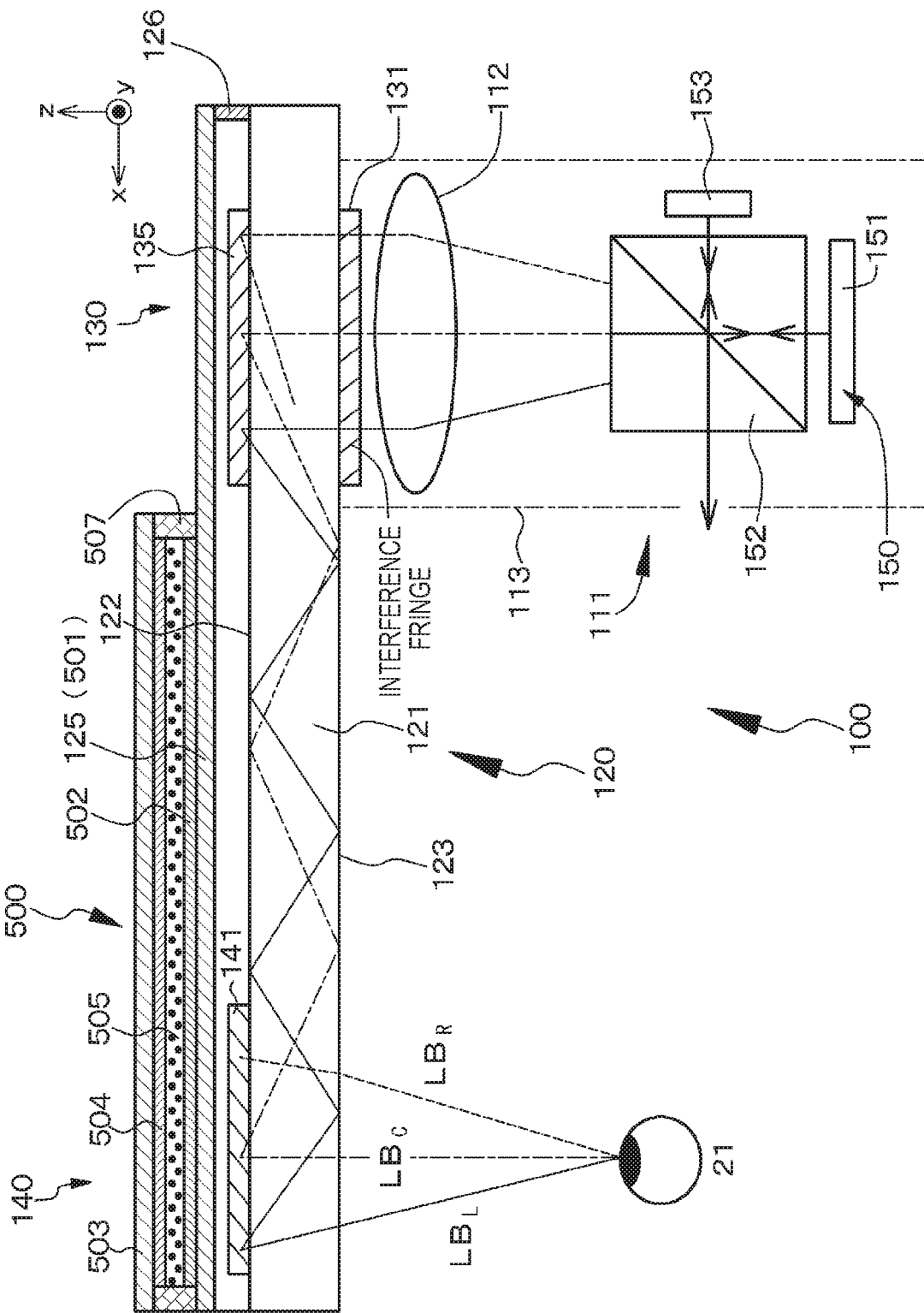
FIG. 23 is a conceptual diagram of an image display device in a display device according to a ninth embodiment.
Figure 24:
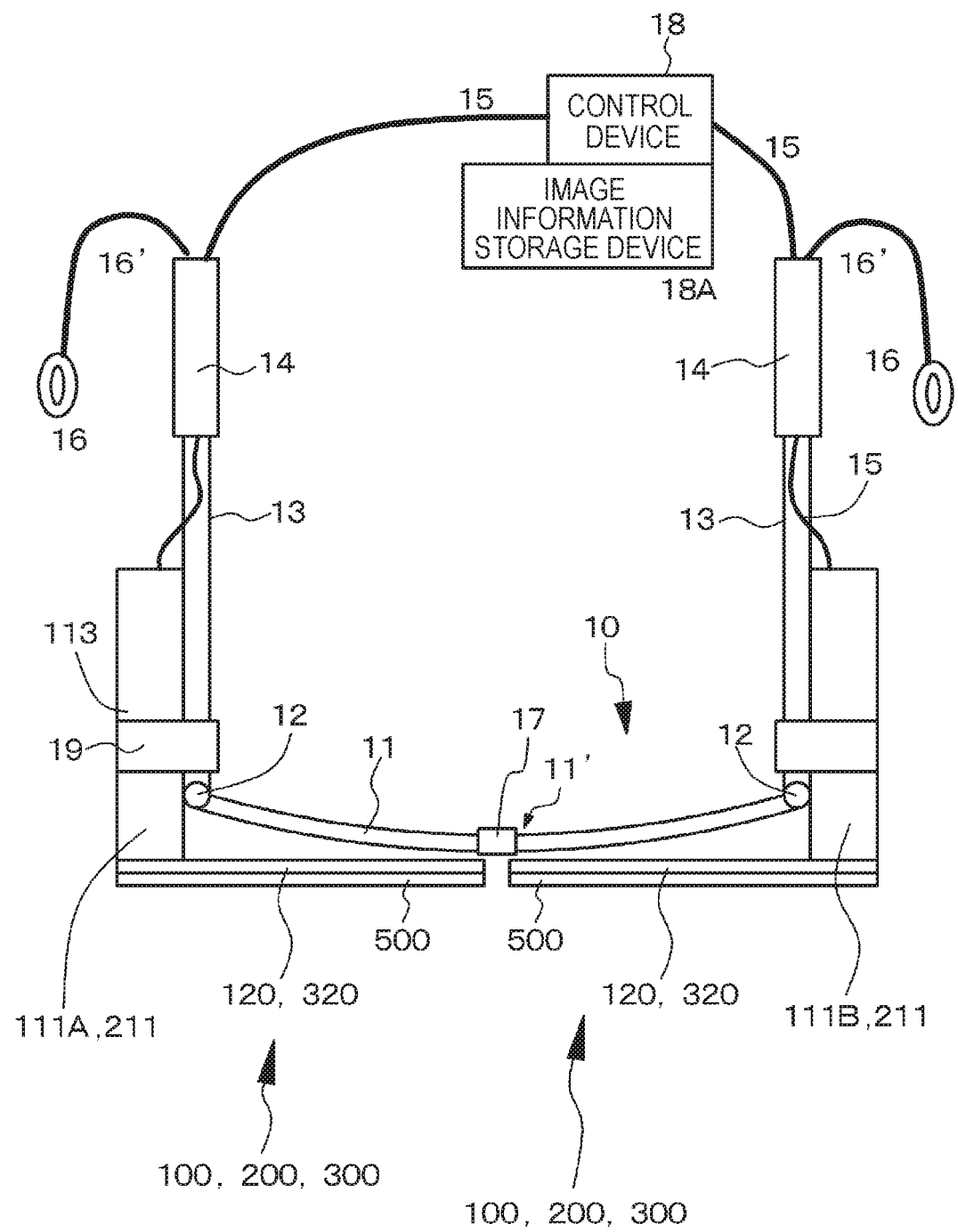
FIG. 24 is a schematic top view of the display device according to the ninth embodiment.
Figure 25A:
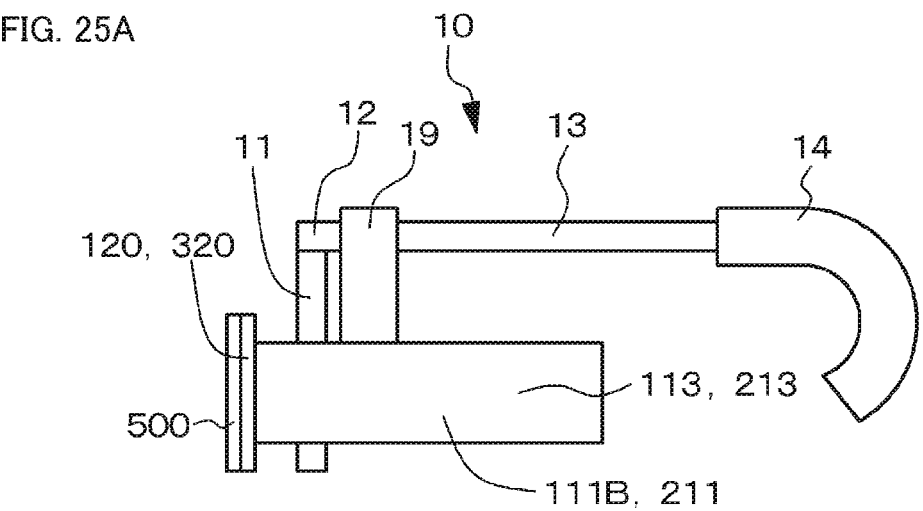
FIGS. 25A and 25B are a schematic side view of the display device according to the ninth embodiment and a schematic front view of an optical device and a dimmer in the display device according to the ninth embodiment.
Figure 25B:
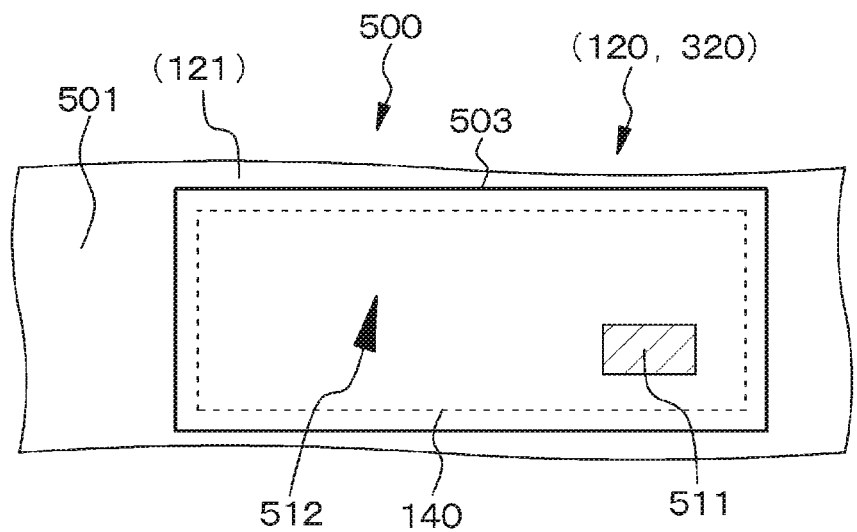
Figure 26A:
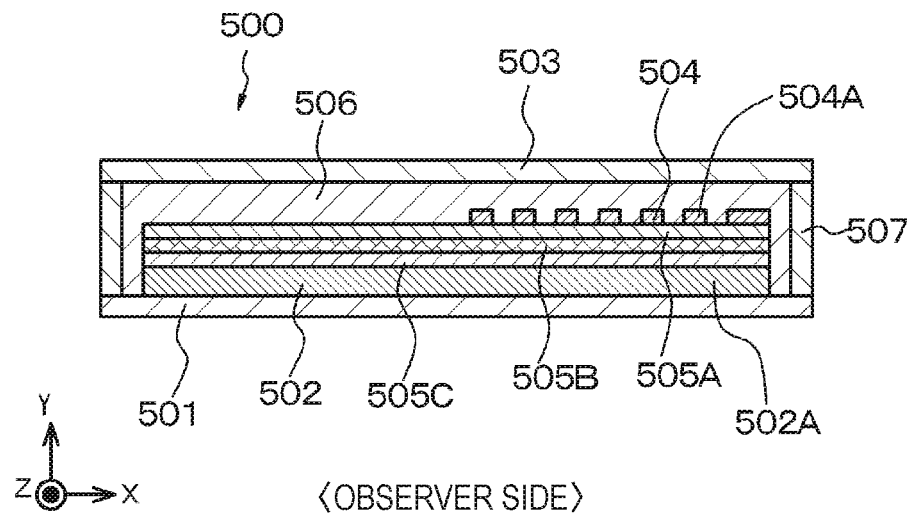
FIGS. 26A and 26B are a schematic cross-sectional view of the dimmer in the display device according to the ninth embodiment and a schematic front view of the dimmer.
Figure 26B:
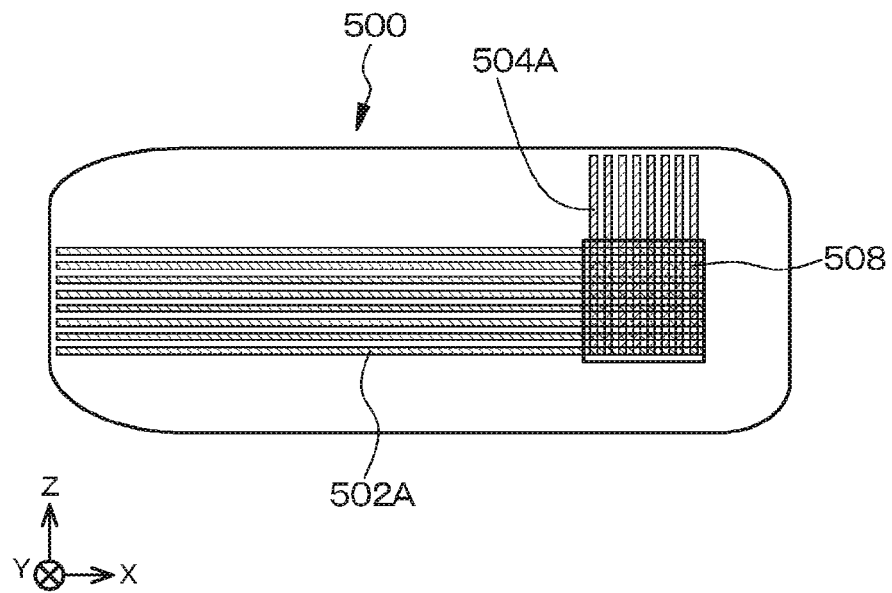

The ninth embodiment is a modification of the first to eighth embodiments. FIG. 23 is a conceptual diagram of an image display device according to the ninth embodiment, FIG. 24 is a schematic top view of the display device according to the ninth embodiment, and FIG. 25A is a schematic side view of the display device according to the ninth embodiment. FIG. 25B is a schematic front view of an optical device and a dimmer, FIG. 26A is a schematic cross-sectional view of the dimmer, and FIG. 26B is a schematic plane view of the dimmer.

In the ninth embodiment, a dimmer 500 is arranged on the first surface side of the light guide plate 121. The dimmer 500 adjusts the amount of external light incident from the outside. A virtual image forming region of the optical device 120 overlaps with the dimmer 500, and when a virtual image is formed in a part of the virtual image forming region on the basis of the light emitted from the image forming apparatus 111, the dimmer 500 is controlled such that a light shielding ratio of a virtual image projection region 511 of the dimmer 500 in which a projection image of the virtual image to the dimmer 500 is higher than a light shielding ratio of the remaining region 512 of the dimmer 500. In the dimmer 500, the position of the virtual image projection region 511 is not fixed but varies depending on the formation position of the virtual image, and the number of the virtual image projection regions 511 also changes depending on the number of virtual images (or the number of a series of virtual image groups, the number of blocked virtual image groups, or the like).

When the dimmer 500 operates, the light shielding ratio of the remaining region 512 of the dimmer 500 is, for example, 0.95 or less when the light shielding ratio of the virtual image projection region of the dimmer 500 including the projection image of the virtual image to the dimmer 500 is set to "1." Alternatively, the light shielding ratio of the other region of the dimmer 500 is, for example, 30% or less. On the other hand, when the dimmer 500 operates, the light shielding ratio of the virtual image projection region 511 of the dimmer 500 is set to 35% to 99%, for example, 80%. As described above, the light shielding ratio of the virtual image projection region 511 may be constant, or may change depending on illuminance of an environment in which the display device is placed as will be described later.

In the ninth embodiment or the tenth and eleventh embodiments to be described later, a dimmer 500 which is a sort of optical shutter that adjusts an amount of external light incident from the outside is arranged on the side opposite to the side on which the image forming apparatus 111 of the optical device 120 is arranged. In other words, the dimmer 500 is arranged in the region of the optical device 120 on the side opposite to the observer 20. As described above, the optical device 120 and the dimmer 500 are arranged in the described order from the observer side, but the dimmer 500 and the optical device 120 may be arranged in the described order. Further, the transparent protecting member 125 doubles as a first substrate 501 of the dimmer 500, and thus it is possible to reduce the weight of the entire display, device and there is no possibility that the user of the display device has an uncomfortable feeling. Further, a second substrate 503 can be formed to be thinner than the transparent protecting member 125. The same applies to the tenth and eleventh embodiments. However, the present invention is not limited thereto, and the transparent protecting member 125 and the first substrate 501 of the dimmer 500 may be configured with different members, respectively. The size of the dimmer 500 may be the same as, larger than, or smaller than the size of the light guide plate 121. In short, the virtual image formation region (the second deflection unit 140, the third hologram diffraction grating 141, the 3A-th hologram diffraction grating 141A, and the 3B-th hologram diffraction grating 141B which are hereinafter referred to collectively as a "second deflection unit 140 and the like") may be located with the projection image of the dimmer 500. A connector (not illustrated) is attached to the dimmer 500, and the dimmer 500 is electrically connected to a control circuit (specifically, the control device 18) that controls the light shielding ratio of the dimmer 500 via the connector and the wiring.

In the ninth embodiment or the tenth and eleventh embodiments to be described later, as illustrated in FIG. 26A which is a schematic cross-sectional view and FIG. 26B which is a schematic plane view, the dimmer 500 includes
 the first substrate 501,
 the second substrate 503 which is opposite to the first substrate 501,
 a first transparent electrode 502 disposed on an opposite surface of the first substrate 501 which is opposite to the second substrate 503,
 a second transparent electrode 504 disposed on an opposing surface of the second substrate 503 which is opposite to the first substrate 501, and
 a dimming layer 505 which is sandwiched between the first transparent electrode 502 and the second transparent electrode 504.

The first transparent electrode 502 is configured with a plurality of band-like first transparent electrode segments 502A extending in a first direction,
 the second transparent electrode 504 is configured with a plurality of band-like second transparent electrode segments 504A extending in a second direction different from the first direction,
 Control of a light shielding ratio of a portion of the dimmer corresponding to an overlapping region of the first transparent electrode segment 502A and the second transparent electrode segment 504A (a minimum unit region 508 in which the light shielding ratio of the dimmer varies) is performed on the basis of control of a voltage to be applied to the first transparent electrode segment 502A and the second transparent electrode segment 504A. In other words, the light shielding ratio is controlled on the basis of a simple matrix scheme. The first direction and the second direction are orthogonal to each other, and specifically, the first direction extends in a horizontal direction (an x-axis direction), and the second direction extends in a vertical direction (a y-axis direction).

The second substrate 503 is made of a plastic material. The first transparent electrode 502 and the second transparent electrode 504 are formed of a transparent electrode composed of an indium tin complex oxide (ITO) and are formed on the basis of a combination of a PVD technique such as a sputtering technique and a lift-off technique. A passivation layer 506 formed of a SiN layer, a $SiO_2$ layer, an $Al_2O_3$ layer, a $TiO_2$ layer or a stacked film thereof is formed between the second transparent electrode 504 and the second substrate 503. Since the passivation layer 506 is formed, it is possible to impart ion blocking characteristic that prevents ions from coming back and forth, waterproofness, moisture resistance, and scratch resistance to the dimmer 500. The transparent protecting member 125 (first substrate 501) and the second substrate 503 are sealed on the outer edge portions by a sealing material 507 made of ultraviolet curable epoxy resin, ultraviolet curable resin such as epoxy resin curable by ultraviolet rays and heat, or thermosetting resin. The first transparent electrode 502 and the second transparent electrode 504 are connected to the control device 18 via a connector (not illustrated) and a wiring.

The light shielding ratio (light transmittance) of the dimmer 500 can be controlled in accordance with a voltage applied to the first transparent electrode 502 and the second transparent electrode 504. Specifically, for example, when a voltage is applied to the second transparent electrode 504 in a state in which the first transparent electrode 502 is grounded, the light shielding ratio of the dimming layer 505 varies. A potential difference between the first transparent electrode 502 and the second transparent electrode 504 may be controlled or the voltage applied to the first transparent electrode 502 and the voltage applied to the second transparent electrode 504 may be independently controlled.

If the number of pixels in the horizontal direction of the virtual image forming region (the second deflection unit 140 and the like) in the dimmer 500 is indicated by $M_0$, and the number of pixels in the vertical direction is indicated by $N_0$, the number ($M_1 \times N_1$) of minimum unit regions 508 in which the light shielding ratio of the dimmer 500 varies is, for example, $M_0=M_1$ (that is, k=1), and $N_0=N_1$ (that is, k'=1) when $M_1/M_0=k$ and $N_1/N_0=k'$. However, the present invention is not limited thereto, and a configuration in which $1.1 \le k$, preferably $1.1 \le k \le 1.5$, more preferably $1.15 \le k \le 1.3$, $1.1 \le k'$, preferably $1.1 \le k' \le 1.5$, more preferably, $1.15 \le k' \le 1.3$ is satisfied can be provided. The value of k and the value of k' may be the same or different, and in the embodiment, k=k'=1.

In the ninth embodiment or the tenth and eleventh embodiments to be described later, the dimmer 500 is configured with an optical shutter to which a color change of a substance generated by a redox reaction of an electrochromic material is applied. Specifically, the dimming layer includes an electrochromic material. More specifically, the dimming layer has a stacked structure of a $WO_3$ layer 505A/a $Ta_2O_5$ layer 505B/an $Ir_xSm_{1-x}O$ layer 505C from the second transparent electrode side. The $WO_3$ layer 505A perform reduction and color generation. Further, the $Ta_2O_5$ layer 505B constitutes a solid electrolyte, and the $Ir_xSm_{1-x}O$ layer 505C perform oxidation and color generation.

In the $Ir_xSm_{1-x}O$ layer, Ir and $H_2O$ react and exist as iridium hydroxide $Ir(OH)_n$. If a negative potential is applied to the second transparent electrode 504, and a positive potential is applied to the first transparent electrode 502, migration of protons $H^-$ from the $Ir_xSm_{1-x}O$ layer to the $Ta_2O_5$ layer and electron emission to the first transparent electrode 502 occur, next oxidation reaction is performed, and the $Ir_xSn_{1-x}O$ is colored. $Ir(OH)_n \rightarrow IrO_x(OH)_{n-X}$ (coloring)$+X \cdot H^+ + X \cdot e^-$ On the other hand, the protons $H^+$ in the $Ta_2O_5$ layer migrate into the $WO_3$ layer, and electrons are injected from the second transparent electrode 504 into the $WO_3$ layer, and in the $WO_3$ layer, next reduction reaction is performed, and the $WO_3$ layer is colored. $WO_3+X \cdot H^+ + X \cdot e^- \rightarrow H_xWO_3$ (coloring)

Conversely, if a positive potential is applied to the second transparent electrode 504, and a negative potential is applied to the first transparent electrode 502, in the $Ir_xSn_{1-x}O$ layer, the reduction reaction is performed in the opposite direction to the above reaction, and decoloring is performed, and in the $WO_3$ layer, oxidation reaction is performed in the opposite direction to the above reduction reaction, and decoloring is performed. Further, $H_2O$ is contained in the $Ta_2O_5$ layer, and when a voltage is applied to the first transparent electrode and the second transparent electrode, ionization is performed, and states of protons $H^+$ and $OH^-$ ions are included and contribute to coloring reaction and decoloring reaction.

Alternatively, the first electrochromic material layer and the second electrochromic material layer may be sandwiched between the first electrode and the second electrode. The first electrochromic material layer is configured with, for example, a Prussian blue complex, and the second electrochromic material layer is configured with, for example, a nickel-substituted Prussian blue complex.

Information and data related to the image to be displayed on the image display device 100 or signals to be received by a receiving device are recorded, kept, and stored in, for example, a so-called cloud computer or a server, and when the display device is equipped with a communication device (a transceiving device) such as a mobile phone or a smartphone or when the communication device (the receiving device) is incorporated in the control device (the control circuit or the control unit) 18, it is possible to perform reception and exchange of various kinds of information, data, and signals between the could computer or the server and the display device through the communication device, it is possible to receive signals based on various kinds of information or data, that is, signals for displaying images on the image display device 100, and the receiving device can receive the signals.

Specifically, when the observer performs an input of requesting "information" to be acquired to a mobile phone or a smartphone, the mobile phone or the smartphone accesses the cloud computer or the server and acquires the "information" from the cloud computer or the server. Thus, the control device 18 receives a signal for displaying the image on the image display device 100. The control device 18 performs well-known image processing on the basis of this signal, and causes the "information" to be displayed in the image forming apparatus 111 as an image. The "information" image is displayed as a virtual image at a predetermined position controlled by the control device 18 on the basis of the light emitted from the image forming apparatus 111 in the optical device 120. In other words, the virtual image is formed in a part of the virtual image forming region (the second deflection unit 140 and the like).

Then, when the dimmer 500 is disposed, the dimmer 500 is controlled such that the light shielding ratio of the virtual image projection region 511 of the dimmer 500 including the projection image of the virtual image to the dimmer 500 is higher than the light shielding ratio of the remaining region 512 of the dimmer 500. Specifically, the voltage applied to the first transparent electrode 502 and the second transparent electrode 504 is controlled by the control device 18. Here, the size and the position of the virtual image projection region 511 of the dimmer 500 are decided on the basis of the signal for displaying the image in the image forming apparatus 111.

In some instances, the signal for displaying the image in the image display device 100 may be stored in the display device (specifically, the control device 18 or the image information storage device 18A).

Alternatively, the image captured by the imaging device 17 with which the display device is equipped is transmitted to the cloud computer or the server via the communication device, various kinds of information or data corresponding to the image captured by the imaging device 17 are searched for in the cloud computer or the server, various kinds of information or data which are searched are transmitted to the display device through the communication device, and an image indicating various kinds of information or data which are searched is displayed on the image display device 100. Further, when such a configuration and the input of "information" are used together, for example, information such as a place in which the observer is located and a direction in which the observer faces can be weighted, and thus the "information" can be displayed in the image forming apparatus 111 with a higher degree of accuracy.

A configuration in which the light shielding ratio of the virtual image projection region 511 of the dimmer 500 is increased before the virtual image is formed on the optical device 120 on the basis of the light emitted from the image forming apparatus 111 may be employed. A time between the increasing of the light shielding ratio of the virtual image projection region 511 of the dimmer 500 to the forming of the virtual image can be, for example, 0.5 to 30 seconds, but the present invention is not limited to this value. In this way, the observer can know a location and a time at which the virtual image is formed in the optical device in advance, and thus it is possible to improve the virtual image visibility of the observer. A configuration in which the light shielding ratio of the virtual image projection region 511 of the dimmer 500 is sequentially increased over time may be employed. In other words, a so-called fade-in state can be set.

If the virtual image is not formed, the light shielding ratio of the entire dimmer 500 may be set to be the same value as the light shielding ratio of the remaining region of the dimmer 500. When the forming of the virtual image is completed, and the virtual image disappears, the light shielding ratio of the virtual image projection region 511 of the dimmer 500 including the projection image of the virtual image to the dimmer 500 may be immediately set to be the same value as the light shielding ratio of the remaining region of the dimmer 500 but may be controlled to be the same value as the light shielding ratio of the remaining region of the dimmer 500 over time (for example, in 3 seconds). In other words, a so-called fade-out state can be set.

One virtual image may be formed on the optical device 120 on the basis of the light emitted from the image forming apparatus 111, and then a next virtual image different from one virtual image may be formed. In this case, if an area of the virtual image projection region 511 of the dimmer 500 corresponding to one virtual image is indicated by $S_1$, and an area of the virtual image projection region 511 of the dimmer 500 corresponding to a next virtual image is indicated by $S_2$, in the case of $S_2/S_1<0.8$ or $1<S_2/S_1$, the virtual image projection region 511 of the dimmer 500 on which the next virtual image is formed may be the region of the dimmer 500 including the projection image of the next virtual image to the dimmer 500 (see FIGS. 27A, 27B, and 27C), and in the case of $0.8 \leq S_2/S_1 \leq 1$, the virtual image projection region 511 of the dimmer 500 on which the next virtual image is formed may be a region of the dimmer 500 including the projection image of one virtual image to the dimmer 500. In other words, when the area of the virtual image projection region is reduced by 0% to 20% in the forming of the next virtual image compared to the forming of one virtual image, the virtual image projection region corresponding to one virtual image may be held (that is, the state illustrated in FIG. 27A).

Figure 28:
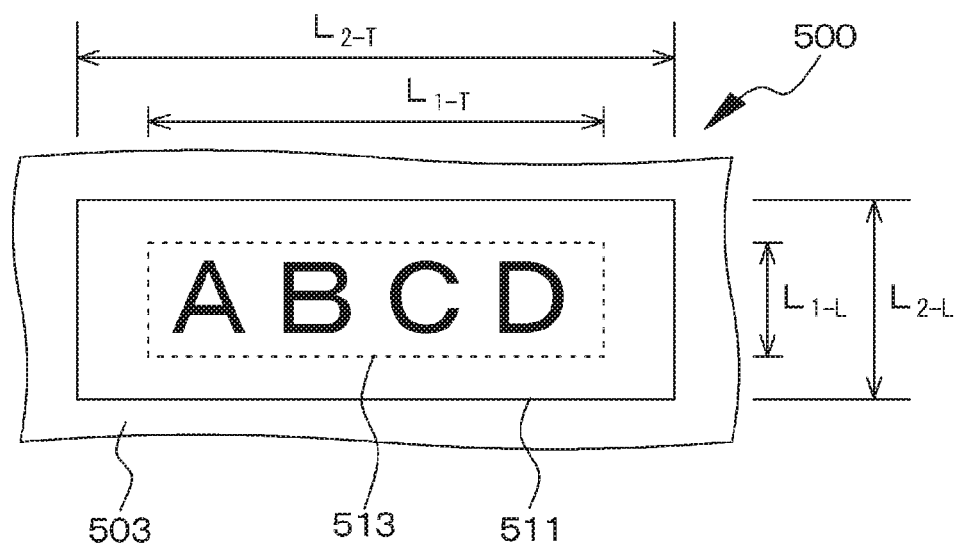
FIG. 28 is a diagram schematically illustrating a virtual rectangle circumscribed on a virtual image formed in an optical device and a rectangular shape of a virtual image projection region of the dimmer.

Further, as illustrated in FIG. 28, if a virtual rectangle 513 circumscribed to the virtual image formed in the optical device 120 is assumed, the virtual image projection region 511 of the dimmer 500 can be configured to be larger than the virtual rectangle 513. In this case, the lengths of the virtual rectangle 513 circumscribed to the virtual image formed in the optical device 120 in the horizontal direction and the vertical direction are indicated by $L_{1-T}$ and $L_{1-L}$, and the virtual image projection region 511 of the dimmer 500 has a rectangular shape whose lengths in the transverse direction and the vertical direction are indicated by $L_{2-T}$ and $L_{2-L}$, it is desirable to satisfy:

$1.0 \leq L_{2-T}/L_{1-T} \leq 1.5$; and $1.0 \leq L_{2-L}/L_{1-L} \leq 1.5$.

FIG. 28 illustrates a state in which "ABCD" is formed as the virtual image.

The dimmer 500 may constantly be in an operating state, an operation/non-operation (on/off) state may be specified in accordance with an instruction (operation) of the observer, or the dimmer 500 may be in the non-operation state in normal circumstances and start an operation on the basis of the signal for displaying the image in the image display device 100. In order to specify the operation/non-operation state in accordance with the instruction (operation) of the observer, for example, the display device may further include a microphone, and the operation of the dimmer 500 may be controlled in accordance with a voice input via the microphone. Specifically, switching between the operation/non-operation of the dimmer 500 may be controlled in accordance with a voice of the observer. Alternatively, information to be acquired may be input through voice input. Alternatively, the display device may further include an infrared input/output device, and the operation of the dimmer 500 may be controlled through the infrared input/output device. Specifically, switching between the operation/non-operation of the dimmer 500 may be controlled by detecting the blink of the observer through the infrared input/output device.

As described above, in the display device according to the ninth embodiment, when the virtual image is formed in a part of the virtual image forming region on the basis of the light emitted from the image forming apparatus, the dimmer is controlled such that the light shielding ratio of the virtual image projection region of the dimmer including the projection image of the virtual image to the dimmer is higher than the light shielding ratio of the remaining region of the dimmer, and thus it is possible to impart high contrast to the virtual image observed by the observer, and the region of the high light shielding ratio is not the entire dimmer but only the narrow region such as the virtual image projection region of the dimmer including the projection image of the virtual image to the dimmer, whereby the observer using the display device can recognize the external environment reliably and safely.

The frame may include the front section arranged in the front of the observer, the two temple sections pivotably attached to both ends of the front section via a hinge, and the nose pad, and the dimmer 500 may be arranged in the front section may be employed. Further, the optical device may be attached on the dimmer 500. Further, the optical device may be attached to the dimmer 500 in a close contact state or may be attached to the dimmer 500 in a state with a gap therebetween. Furthermore, in these cases, as described above, the front section may have a rim; the dimmer 500 may be fitted into the rim, or at least one of the light guide plate 121 (the first substrate 501) and the second substrate 503 may be fitted into the rim, the dimmer 500 and the light guide plate 121 may be fitted into the rim, or the light guide plate 121 may be fitted into the rim.

The dimming layer 505 may include an optical shutter configured with a liquid crystal display device. In this case, specifically, the dimming layer 505 may be configured with a liquid crystal material layer made of, for example, a twisted nematic (TN) type liquid crystal material or a super twisted nematic (STN) type liquid crystal material. The first transparent electrode 502 and the second transparent electrode 504 are patterned, and the light shielding ratio (light transmittance) of the region 512 of a part of the dimmer 500 can be changed to a state different from the light shielding ratio of the remaining region. Alternatively, one of the first transparent electrode 502 and the second transparent electrode 504 is a so-called solid electrode which is not patterned, the other is patterned, and the other is connected to the TFT. The light shielding ratio of the minimum unit region 508 in which the light shielding ratio of the dimmer 500 changes is controlled by a TFT. In other words, the light shielding ratio may be controlled on the basis of an active matrix method. It will be appreciated that the control of the light shielding ratio based on the active matrix method can be applied to the dimmer 500 described in the ninth embodiment or the tenth and eleventh embodiments to be described later.

Further, an optical shutter which controls the light shielding ratio (light transmittance) through an electrowetting phenomenon may be used. Specifically, a structure in which a first transparent electrode and a second transparent electrode are disposed, and a space between the first transparent electrode and the second transparent electrode is filled with an insulating first liquid and a conductive second liquid may be employed. Then, the light shielding ratio (light transmittance) may be controlled such that a shape of the interface formed by the first liquid and the second liquid changes, for example, from a planar shape to a curved state when a voltage is applied between the first transparent electrode and the second transparent electrode. Alternatively, an optical shutter to which an electrodeposition technique (electrodeposition and electric field deposition) based on an electrodeposition/dissociation phenomenon occurring by reversible redox reaction of a metal (for example, silver particles) may be used. Specifically, the light shielding ratio (light transmittance) of the dimmer is decreased by dissolving $Ag^+$ and $I^-$ in an organic solvent, applying an appropriate voltage to the electrodes, reducing $Ag^+$, and precipitating Ag, and the light shielding ratio (light transmittance) of the dimmer is increased by oxidizing Ag and dissolving $Ag^+$.

In some instances, a configuration in which the light passing through the dimmer is colored in a desired color through the dimmer may be employed, and in this case, the color used for coloring by the dimmer may be variable. Specifically, for example, a dimmer colored in red, a dimmer colored in green, and a dimmer colored in blue may be stacked.

The dimmer may be detachably arranged in the region from which the light of the optical device is emitted. As described above, in order to detachably arrange the dimmer, for example, the dimmer may be attached to the optical device using a screw made of transparent plastic and connected to the control circuit for controlling the light transmittance of the dimmer (which is included in, for example, in the control device 18 that controls the image forming device) via a connector and a wiring.

Tenth Embodiment

Figure 29A:
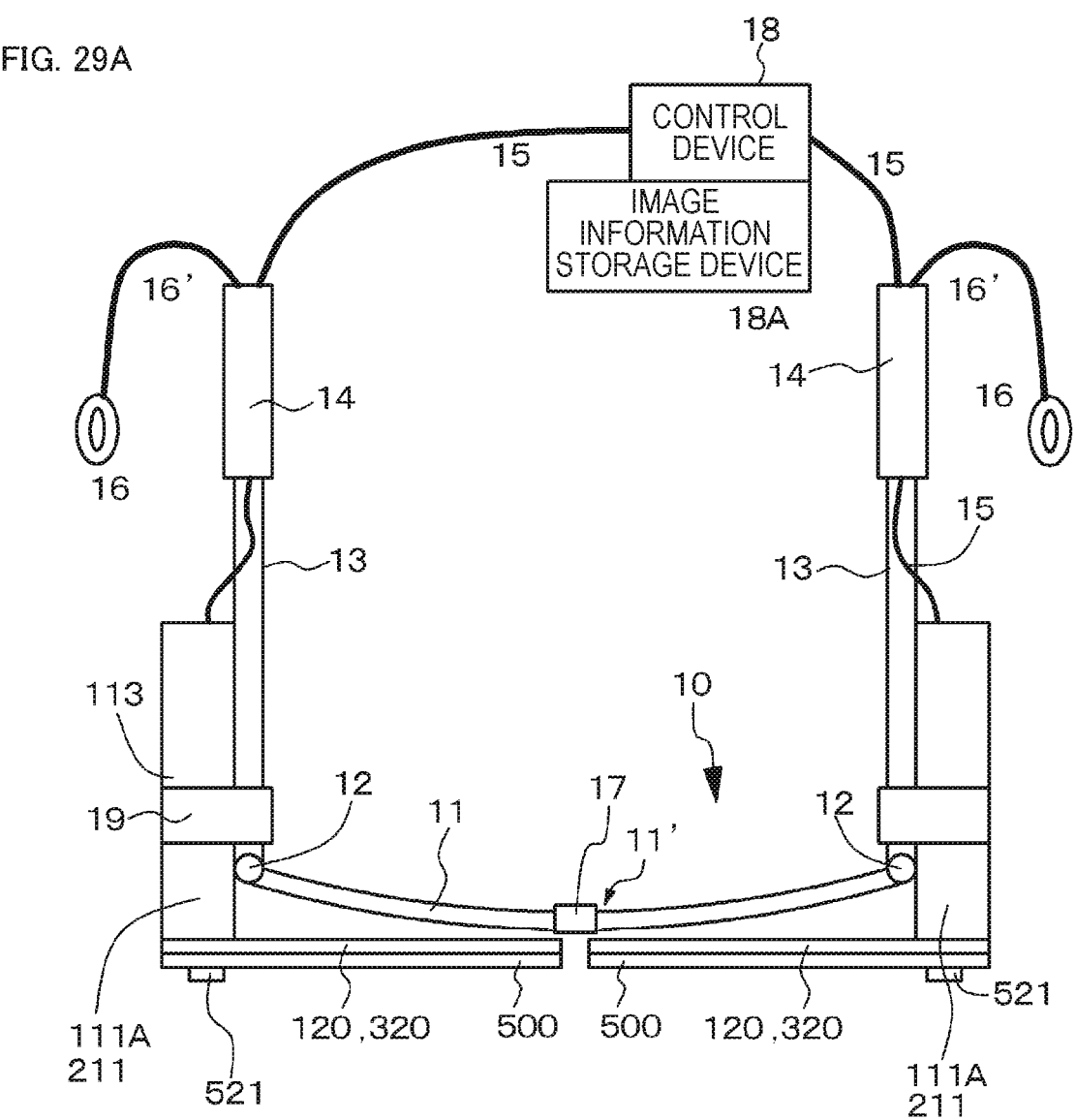
FIGS. 29A and 29B are a schematic top view of a display device according to a tenth embodiment and a schematic diagram of a circuit that controls an environmental illuminance measuring sensor.
Figure 29B:
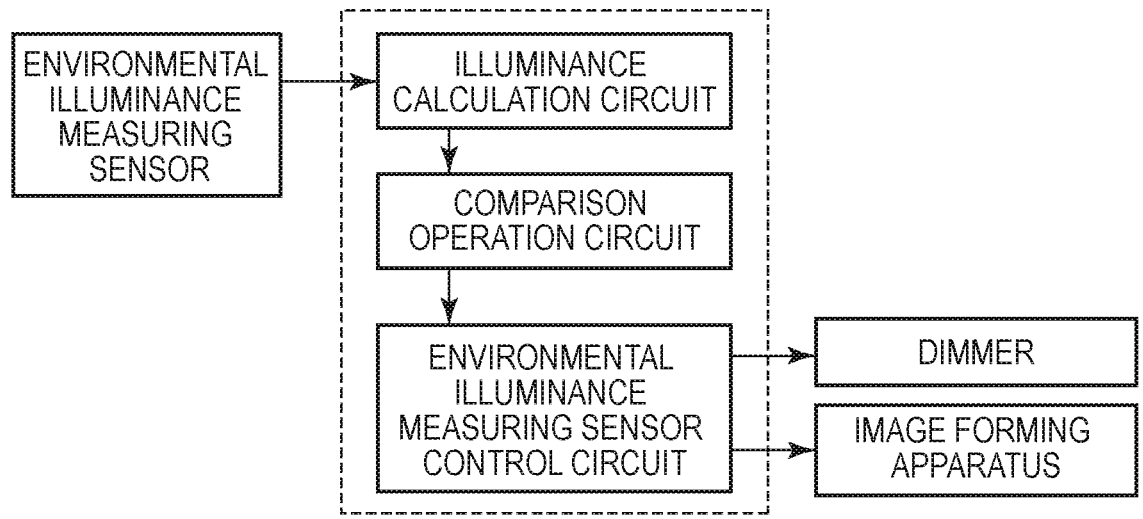

The tenth embodiment is a modification of the ninth embodiment. FIG. 29A is a schematic top view of a display device according to the tenth embodiment. FIG. 29B is a schematic diagram of a circuit that controls an environmental illuminance measuring sensor.

The display device according to the tenth embodiment further includes an environmental illuminance measuring sensor 521 that measures illuminance of an environment in which the display device is placed, and controls the light shielding ratio of the dimmer 500 on the basis of a measurement result of the environmental illuminance measuring sensor 521. At the same time, or independently, the brightness of the image formed by the image forming apparatus 111 is controlled on the basis of the measurement result of the environmental illuminance measuring sensor 521. The environmental illuminance measuring sensor 521 having a well-known configuration and structure may be arranged, for example, at the outer end portion of the optical device 120 or the outer end portion of the dimmer 500. The environmental illuminance measuring sensor 521 is connected to the control device 18 via a connector (not illustrated) and a wiring. The control device 18 includes a circuit that controls the environmental illuminance measuring sensor 521. The circuit that controls the environmental illuminance measuring sensor 521 includes an illuminance calculation circuit that receives a measured value from the environmental illuminance measuring sensor 521 and obtains illuminance, a comparison operation circuit that compares the illuminance value obtained by the illuminance calculation circuit with a standard value, and an environmental illuminance measuring sensor control circuit that controls the dimmer 500 and/or the image forming apparatus 111 on the basis of the value obtained through the comparison operation circuit, but these circuits may be configured with well-known circuits. In the control of the dimmer 500, the light shielding ratio of the dimmer 500 is controlled, whereas in the control of the image forming apparatus 111, the brightness of the image formed by the image forming apparatus 111 is controlled. The control of the light shielding ratio in the dimmer 500 and the control of the brightness of the image in the image forming apparatus 111 may be performed independently or in correlation with each other.

For example, when the measurement result of the environmental illuminance measuring sensor 521 is a predetermined value (a first illuminance measurement value) or more, the light shielding ratio of the dimmer 500 is set to a predetermined value (a first light shielding ratio) or more. On the other hand, when the measurement result of the environmental illuminance measuring sensor 521 is a predetermined value (a second illuminance measurement value) or less, the light shielding ratio of the dimmer 500 is set to a predetermined value (a second light shielding ratio) or less. Here, 10 lux can be used as an example of the first illuminance measurement value, any one value of 99% to 70% can be used as an example of the first light shielding ratio, 0.01 lux can be used as an example of the second illuminance measurement value, and any one value of 49% to 1% can be used as an example of the second light shielding ratio.

Here, the environmental illuminance measuring sensor 521 according to the tenth embodiment can be applied to the display device described in the first to eighth embodiments. Further, when the display device is equipped with the imaging device 17, the environmental illuminance measuring sensor 521 may be configured with a light receiving element for exposure measurement with which the imaging device 17 is equipped.

In the display device of the tenth embodiment or the eleventh embodiment to be described below, since the light shielding ratio of the dimmer is controlled on the basis of the measurement result of the environmental illuminance measuring sensor, the brightness of the image formed by the image forming apparatus is controlled on the basis of the measurement result of the environmental illuminance measuring sensor, the light shielding ratio of the dimmer is controlled on the basis of the measurement result of the transmitted light illuminance measuring sensor, and the brightness of the image formed by the image forming apparatus is controlled on the basis of the measurement result of the transmitted light illuminance measuring sensor, it is possible to impart high contrast to the virtual image observed by the observer, and it is possible to optimize the observation state of the virtual image, depending on the illuminance of the surrounding environment in which the display device is placed as well.

Eleventh Embodiment

Figure 30A:
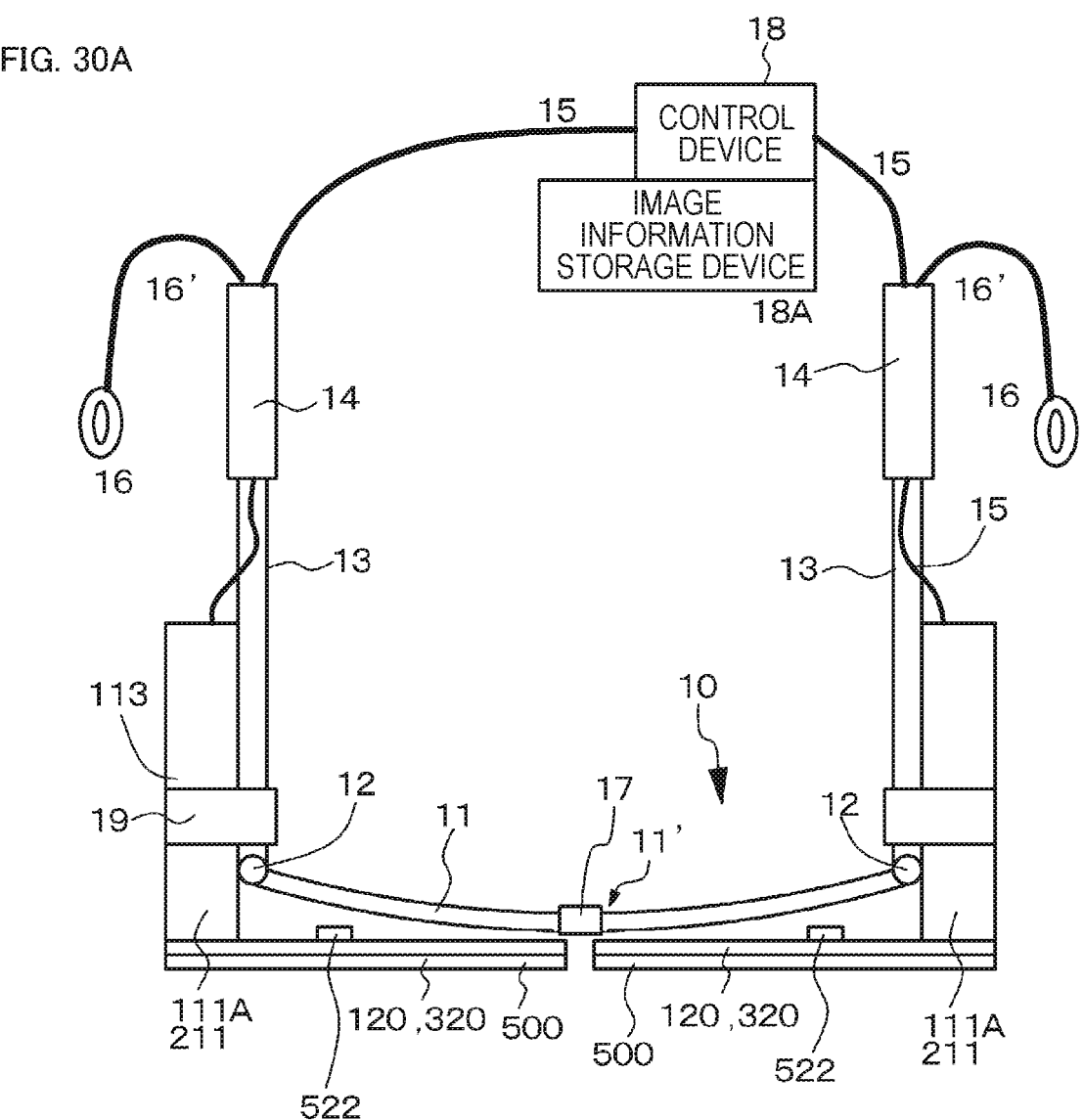
FIGS. 30A and 30B are a schematic top view of a display device according to an eleventh embodiment and a schematic diagram of a circuit that controls a transmitted light illuminance measuring sensor.
Figure 30B:
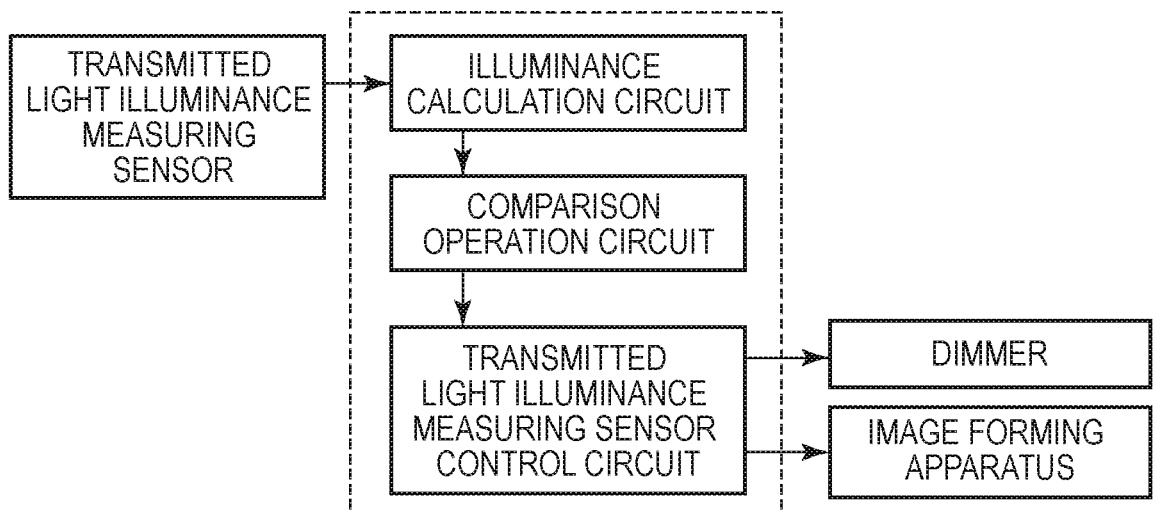

The eleventh embodiment is also a modification of the ninth embodiment as well. FIG. 30A is a schematic top view of a display device according to the eleventh embodiment. FIG. 30B is a schematic diagram of a circuit that controls aa transmitted light illuminance measuring sensor.

The display device according to the eleventh embodiment further includes a transmitted light illuminance measuring sensor 522 that measures illuminance based on the light that has passed through the dimmer from the external environment, that is, measures whether the environmental light is adjusted to have desired illuminance while passing through the dimmer and is then incident, and the light shielding ratio of the dimmer 500 is controlled on the basis of the measurement result of the transmitted light illuminance measuring sensor 522. At the same time, or independently, and the luminance of the image formed by the image forming apparatus 111 is controlled on the basis of the measurement result of the transmitted light illuminance measuring sensor 522. The transmitted light illuminance measuring sensor 522 having a well-known configuration and structure is arranged closer to the observer side than the optical device 120. Specifically, the transmitted light illuminance measuring sensor 522 may be arranged, for example, on the inner surface of the housing 113 or the observer side surface of the light guide plate 121. The transmitted light illuminance measuring sensor 522 is connected to the control device 18 via a connector (not illustrated) and a wiring. The control device 18 includes a circuit that controls the transmitted light illuminance measuring sensor 522. The circuit that controls the transmitted light illuminance measuring sensor 522 includes an illuminance calculation circuit that receives a measured value from the transmitted light illuminance measuring sensor 522 and obtains illuminance, a comparison operation circuit that compares the illuminance value obtained by the illuminance calculation circuit with a standard value, and a transmitted light illuminance measuring sensor control circuit that controls the dimmer 500 and/or the image forming apparatus 111 on the basis of the value obtained through the comparison operation circuit, but these circuits may be configured with well-known circuits. In the control of the dimmer 500, the light shielding ratio of the dimmer 500 is controlled, whereas in the control of the image forming apparatus 111, the brightness of the image formed by the image forming apparatus 111 is controlled. The control of the light shielding ratio in the dimmer 500 and the control of the brightness of the image in the image forming apparatus 111 may be performed independently or in correlation with each other. Further, when it is unable to control the measurement result of the transmitted light illuminance measuring sensor 522 to a desired illuminance in view of the illuminance of the environmental illuminance measuring sensor 521, that is, when the measurement result of the transmitted light illuminance measuring sensor 522 is not desired illuminance or when a finer illumination adjustment is desired, the light shielding ratio of the dimmer may be adjusted while monitoring the value of the transmitted light illuminance measuring sensor 522. At least two transmitted light illuminance measuring sensors may be arranged, and measurement of the illuminance based on the light passing through the portion with the high light shielding ratio and measurement of the illuminance based on the light passing through the portion with the low light shielding ratio may be performed.

The transmitted light illuminance measuring sensor 522 according to the eleventh embodiment can be applied to the display devices described in the first to eighth embodiments. Alternatively, the transmitted light illuminance measuring sensor 522 according to the eleventh embodiment may be combined with the environmental illuminance measuring sensor 521 according to the tenth embodiment, and in this case, various kinds of experiments may be performed, the control of the light shielding ratio in the dimmer 500 and the luminance of the image in the image forming apparatus 111 may be performed independently or in correlation with each other. By adjusting the voltage applied to the first transparent electrode and the second transparent electrode in each of the right eye dimmer and the left eye dimmer, it is possible to uniformize the light shielding ratio in the right eye dimmer and the light shielding ratio in the left eye dimmer. A potential difference between the first transparent electrode and the second transparent electrode may be controlled, or the voltage applied to the first transparent electrode and the voltage applied to the second transparent electrode may be independently controlled. For example, the light shielding ratio in the right eye dimmer and the light shielding ratio in the left eye dimmer may be controlled on the basis of the measurement result of the transmitted light illuminance measuring sensor 522, or the observer may observe the brightness of the light passing through the left eye dimmer and the optical device and the brightness of the light passing through the left eye dimmer and the optical device, and the observer may manually perform the control and the adjustment by operating switches, buttons, dials, sliders, knobs, and the like.

Twelfth Embodiment

The twelfth embodiment is a modification of the optical device, particularly, a modification of the first hologram diffraction grating and the second hologram diffraction grating in the first to eleventh embodiments. Further, the twelfth embodiment relates to a method of assembling optical device and an alignment device. FIGS. 31A and 31B are schematic diagrams of a light guide plate in a display device according to the twelfth embodiment which are viewed from the side opposite to the observer and from the same side as the observer. In FIGS. 31A and 31B, in order to clearly illustrate the first interference fringe forming region and the second interference fringe forming region, the first interference fringe forming region and the second interference fringing forming region are hatched.

In the twelfth embodiment, the first hologram diffraction grating 131 has a first interference fringe forming region 132 in which a first interference fringe is formed and alignment marks 134A and 134B that are disposed outside the first interference fringe forming region, and the second hologram diffraction grating 135 has a second interference fringe forming region 136 in which a second interference fringe is formed and alignment marks 138A and 138B that are disposed outside the second interference fringe forming region.

Specifically, in the first hologram diffraction grating 131, on an outer side 133 of the first interference fringe forming region 132 in the direction in which the first interference fringe extends, the 1A-th alignment mark 134A and the 1B-th alignment mark 134B are disposed to face each other with the first interference fringe forming region 132 interposed therebetween. On the other hand, in the second hologram diffraction grating 135, on an outer side 137 of the second interference fringe forming region 136 in the direction in which the second interference fringe extends, the 2A-th alignment mark 138A and the 2B-th alignment mark 138B are disposed to face each other with the second interference fringe forming region 136 interposed therebetween. Further, the same interference fringe as the interference fringe formed in the first interference fringing forming region 132 is formed in the 1A-th alignment mark 134A and the 1B-th alignment mark 134B, and the same interference fringe as the interference fringe formed in the second interference fringe forming region 136 is formed in the 2A-th alignment mark 138A and the 2B-th alignment mark 138B.

Furthermore, in the optical device and the display device according to the twelfth embodiment, in a state in which an relative alignment between the first hologram diffraction grating 131 and the second hologram diffraction grating 135 is completed, the 1A-th alignment mark 134A and the 2A-th alignment mark 138A have shapes in which the 1A-th alignment mark 134A and the 2A-th alignment mark 138A do not overlap, and the 1B-th alignment mark 134B and the 2B-th alignment mark 138B have shapes in which the 1B-th alignment mark 134B and the 2B-th alignment mark 138B do not overlap. Alternatively or at the same time, in a state in which an relative alignment between the first hologram diffraction grating 131 and the second hologram diffraction grating 135 is completed, the 1A-th alignment mark 134A and the 2A-th alignment mark 138A are arranged at positions at which the 1A-th alignment mark 134A and the 2A-th alignment mark 138A do not overlap, and the 1B-th alignment mark 134B and the 2B-th alignment mark 138B are arranged at positions at which the 1B-th alignment mark 134B and the 2B-th alignment mark 138B do not overlap. Further, the 1A-th alignment mark 134A, the 1B-th alignment mark 134B, the 2A-th alignment mark 138A, and the 2B-th alignment mark 138B are arranged on the end portion side of the light guide plate 121.

The hologram diffraction gratings 131 and 135 according to the twelfth embodiment are hologram diffraction gratings having interference fringe forming regions 132 and 134 in which an interference fringe is formed. The two alignment marks 134A and 134B and the two alignment marks 138A and 138B are disposed to face each other with the interference fringe forming regions 132 and 136 therebetween on the outer sides 133 and 137 of the interference fringe forming regions in the direction in which the interference fringe extends. In each of the alignment marks 134A, 134B, 138A, and 138B, the same interference fringe as the interference fringe formed in the interference fringe forming region 132, 136 is formed, and the plan shape of each of the alignment marks 134A, 134B, 138A, and 138B is an annular shape (a ring shape). Each of the alignment marks 134A, 134B, 138A, and 138B is disposed outside the portions of the interference fringe forming regions 132 and 136 opposite to the portions of the interference fringe forming regions 132 and 136 from which light is emitted.

Figure 32A:
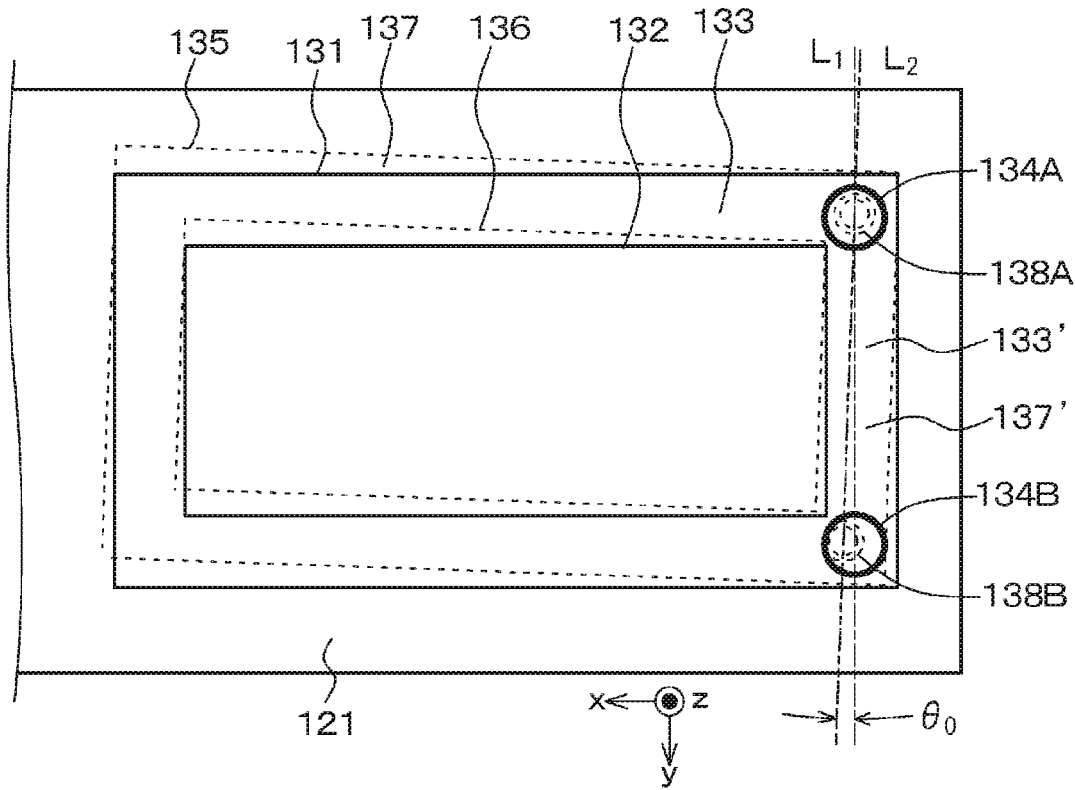
FIGS. 32A and 32B are schematic partial plane views of a light guide plate or the like for describing alignment between a first hologram diffraction grating and a second hologram diffraction grating.
Figure 32B:
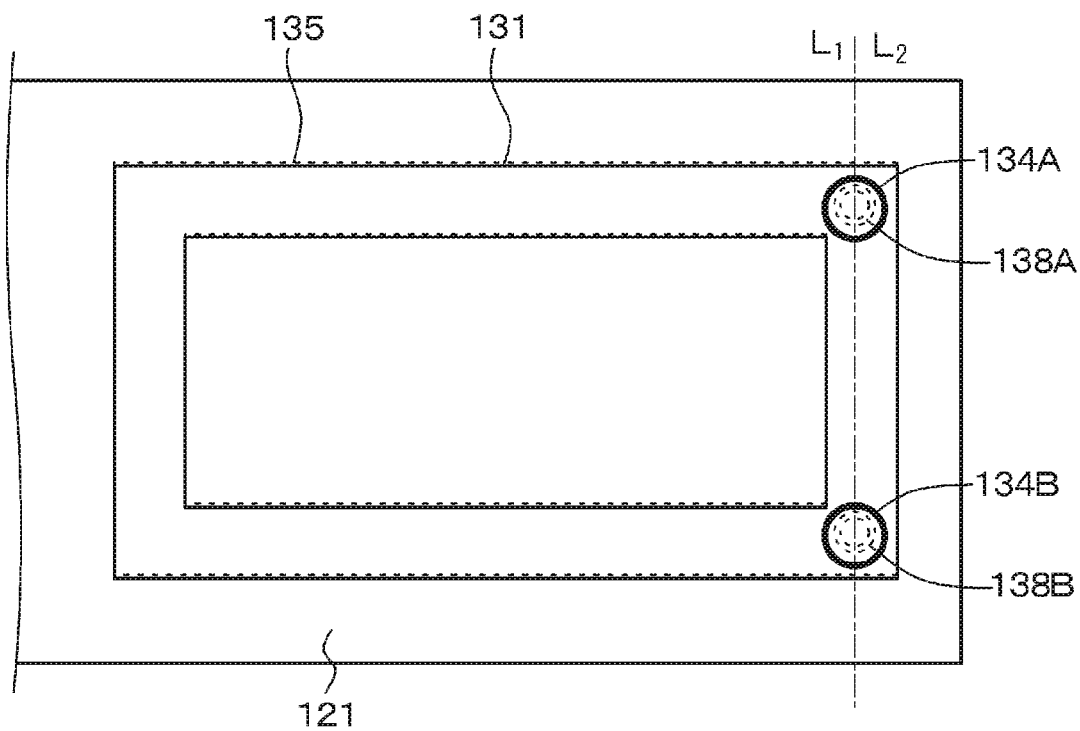
Figure 33A:
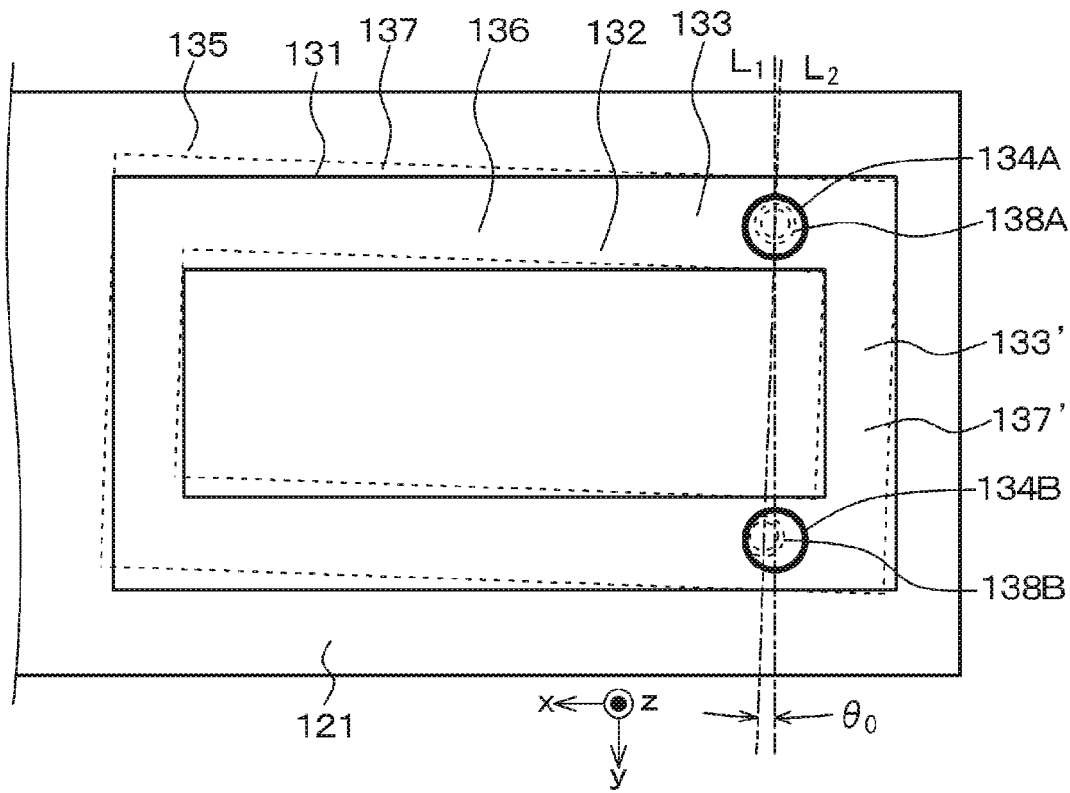
FIGS. 33A and 33B are schematic partial plane views of a light guide plate or the like for describing alignment between a first hologram diffraction grating and a second hologram diffraction grating in a modified example of an example illustrated in FIGS. 32A and 32B.
Figure 33B:
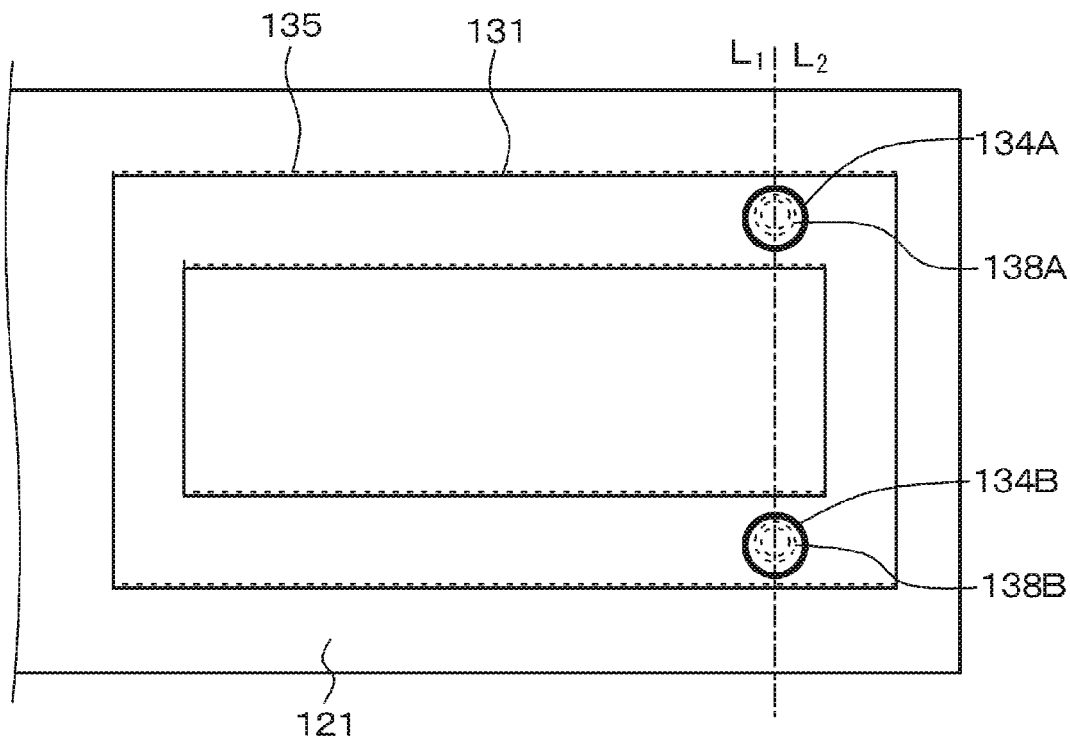

More specifically, as illustrated in FIGS. 32A and 32B, the 1A-th alignment mark 134A and the 1B-th alignment mark 134B are included in the projection image onto the xz plane of the portion of the first hologram diffraction grating (the end region 133' of the first hologram diffraction grating) located closer to the end portion side of the light guide plate than the first interference fringing forming region 132, and the 2A-th alignment mark 138A and the 2B-th alignment mark 138B are included in the projection image onto the xz plane of the portion of the second hologram diffraction grating (the end region 137' of the second hologram diffraction grating) located closer to the end portion side of the light guide plate than the second interference fringe forming region 136. Alternatively, as illustrated in FIGS. 33A and 33B, the 1A-th alignment mark 134A and the 1B-th alignment mark 134B are included in the projection image onto the xz plane of the first interference fringe forming region 132, and the 2A-th alignment mark 138A and the 2B-th alignment mark 138B are included in the projection image onto the xz plane of the second interference fringe forming region 136.

A method of assembling the optical device according to the twelfth embodiment will be described below with reference to FIG. 32A, FIG. 32B, FIG. 33A, and FIG. 33B which are schematic partial plane views of the light guide plate 121 and the like for describing the alignment between the first hologram diffraction grating 131 and the second hologram diffraction grating 135 and FIGS. 34A and 34B which are schematic partial cross-sectional views of the light guide plate and the like.

Figure 34A:
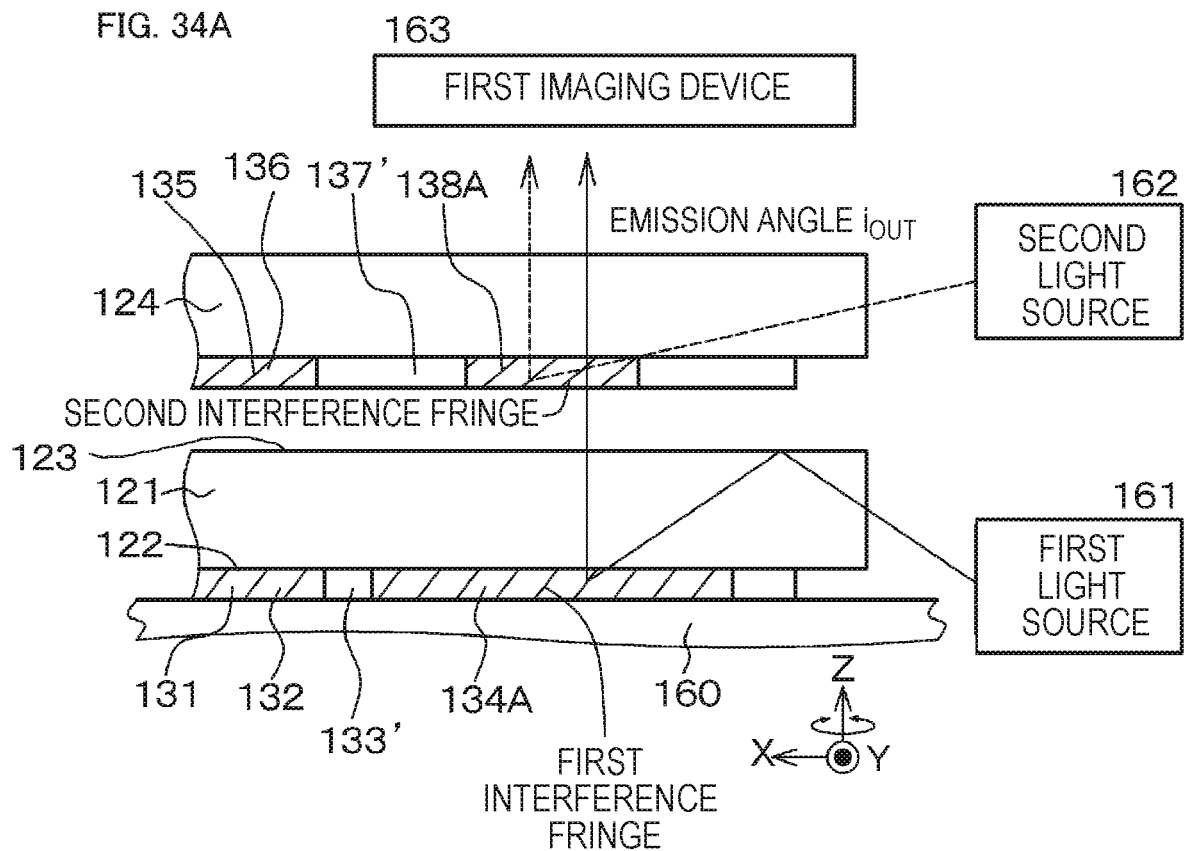
FIGS. 34A and 34B are schematic partial cross-sectional views of a light guide plate or the like for describing alignment between a first hologram diffraction grating and a second hologram diffraction grating.
Figure 34B:
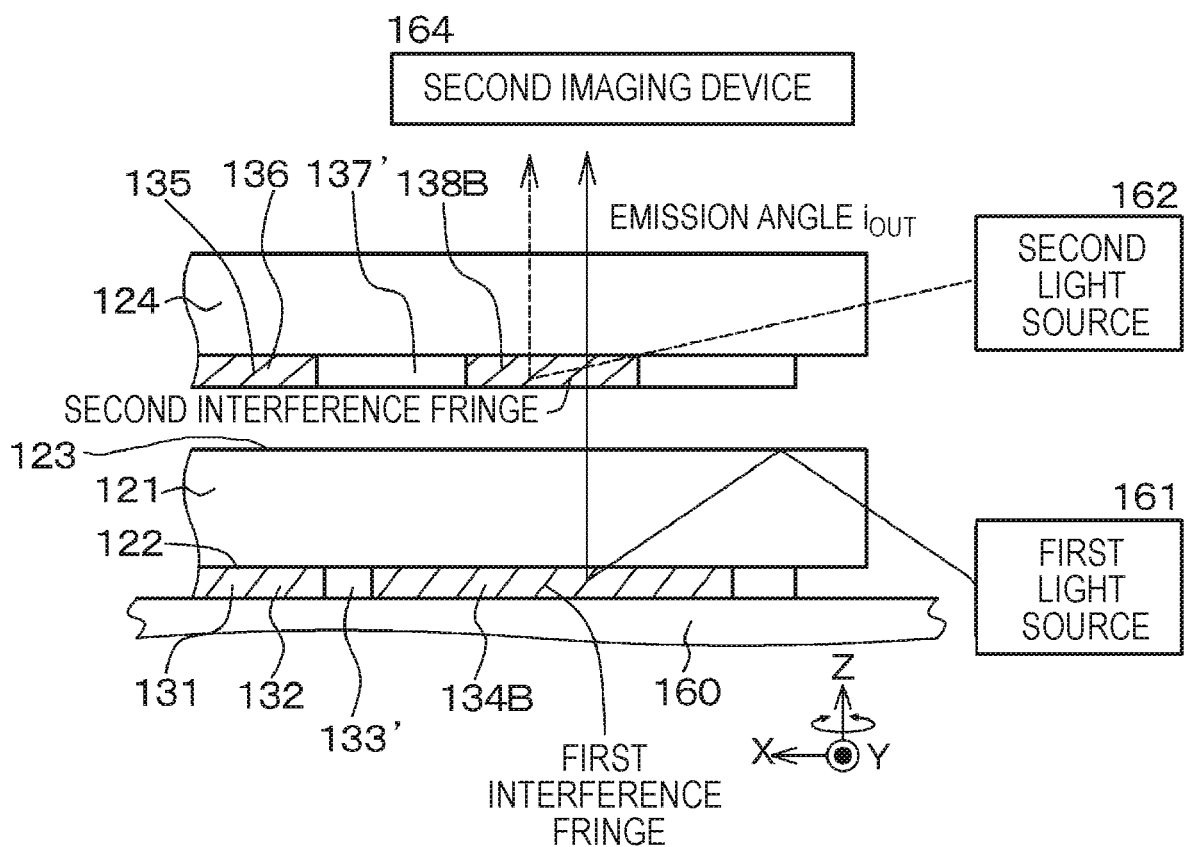

Here, as illustrated in FIG. 34A and FIG. 34B, an alignment device according to the twelfth embodiment includes a stage 160 that is movable in an X direction, a Y direction, and a Z direction and is rotatable within an XY plane, a first light source (first alignment light source) 161 that causes light to be incident on the light guide plate 121 from an end surface of the light guide plate 121 on which the stage 160 is placed and the first hologram diffraction grating 131 is arranged, a second light source (second alignment light source) 162 that causes light to be incident on a support 124 from an end surface of the support 124 supporting the second hologram diffraction grating 135 above the first hologram diffraction grating 131, a first imaging device (first alignment imaging device) 163 that detects an optical image of the 1A-th alignment mark 134A based o the light which is incident from the first light source 161 and diffracted and reflected by the 1A-th alignment mark 134A disposed in the first hologram diffraction grating 131 and an optical image of an optical image of the 2A-th alignment mark 138A based on the light which is incident from the second light source 162 and diffracted and reflected by the 2A-th alignment mark 138A disposed in the second hologram diffraction grating 135, and a second imaging device (second alignment imaging device) 164 that detects an optical image of the 1B-th alignment mark 134B based on the light which is incident from the first light source 161 and diffracted and reflected by the 1B-th alignment mark 134B disposed in the first hologram diffraction grating 131 and an optical image of the 2B-th alignment mark 138B based on the light which is incident from the second light source 162 and diffracted and reflected by the 2B-th alignment mark 138B disposed in the second hologram diffraction grating 135.

Further, the light which is incident on the 1A-th alignment mark 134A and the 1B-th alignment mark 134B, diffracted and reflected by the 1A-th alignment mark 134A and the 1B-th alignment mark 134B, and emitted from the light guide plate 121 at an emission angle tout is emitted from the first light source 161 (see FIGS. 34A and 34B). Further, the light which is incident on the 2A-th alignment mark 138A and the 2B-th alignment mark 138B, diffracted and reflected by the 2A-th alignment mark 138A and the 2B-th alignment mark 138B, and emitted from the light guide plate 121 at the emission angle tout is emitted from the second light source 162 (see FIGS. 34A and 34B). Here, 0° may be used as an example of the emission angle $i_{out}$. Here, it is desirable to select a wavelength of the light emitted from the first light source 161 and an incidence angle on the light guide plate 121 to satisfy a Bragg condition 1 for obtaining such a state, and it is desirable to select a wavelength of the light emitted from the second light source 162 and an incidence angle on the support 124 to satisfy a Bragg condition 2 for obtaining such a state. Further, the parallel light is emitted from the first light source 161, and the parallel light is emitted from the second light source 162. By selecting the light source that emits light having a wavelength of light that satisfies both the Bragg condition 1 and the Bragg condition 2 and the angle of incidence, the same parallel light source may be used as the first light source 161 and the second light source 162.

In the method of assembling the optical device according to the twelfth embodiment, the 1A-th alignment mark 134A and the 2A-th alignment mark 138A are optically detected (see FIGS. 32A, 33A, and 34A). At the same time, the 1B-th alignment mark 134B and the 2B-th alignment mark 138B are optically detected (see FIGS. 32A, 33A, and 34B). Then, a first straight line $L_1$ connecting the 1A-th alignment mark 134A with the 1B-th alignment mark 134B is obtained, and a second straight line $L_2$ connecting the 2A-th alignment mark 138A with the 2B-th alignment mark 138B is obtained (see FIGS. 32A and 33A). Then, a relative alignment of the first hologram diffraction grating 131 and the second hologram diffraction grating 135 is performed so that an angle $\theta_0$ formed by the first straight line $L_1$ and the second straight line $L_2$ when the first straight line $L_1$ and the second straight line $L_2$ are projected onto a virtual plane is within a specified value $\theta_{PD}$ (see FIGS. 32B and 33B).

Alternatively, in the method of assembling the optical device according to the twelfth embodiment, in the state in which the second hologram diffraction grating 135 is supported by the support 124, the light is caused to be incident on the light guide plate 121 from the end surface of the light guide plate 121, the light diffracted and reflected by the 1A-th alignment mark 134A and the 1B-th alignment mark 134B is optically detected, the light is caused to be incident on the support 124 from the end surface of the support 124, the light diffracted and reflected by the 2A-th alignment mark 138A and the 2B-th alignment mark 138B is optically detected, and the relative alignment of the first hologram diffraction grating 131 and the second hologram diffraction grating 135 is performed.

Here, in the method of assembling the optical device 120 according to the twelfth embodiment, in a state in which the first hologram diffraction grating 131 is disposed in the light guide plate 121, a relative alignment of the first hologram diffraction grating 131 and the second hologram diffraction grating 135 is performed, and the second hologram diffraction grating 135 is disposed on the light guide plate 121. In this case, in a state in which the first hologram diffraction grating 131 is arranged on the light guide plate 121, the light guide plate 121 is moved relative to the second hologram diffraction grating 135. Further, after the first hologram diffraction grating 131 is attached to the light guide plate 121, a relative alignment of the first hologram diffraction grating 131 and the second hologram diffraction grating 135 is performed, and the second hologram diffraction grating 135 is attached to the light guide plate 121.

Further, in the method of assembling the optical device 120 according to the twelfth embodiment, a relative alignment of the first hologram diffraction grating 131 and the second hologram diffraction grating 135 is performed in a state in which the second hologram diffraction grating 135 is supported by the support 124. As described above, the same interference fringe as the interference fringe formed in the first interference fringe forming region 132 is formed in the 1A-th alignment mark 134A and the 1B-th alignment mark 134B, the same interference fringe as the interference fringe formed in the second interference fringe forming region 136 is formed in the 2A-th alignment marks 138A and the 2B-th alignment mark 138B, the light is caused to be incident on the light guide plate 121 from the end surface of the light guide plate 121, and the light diffracted and reflected by the 1A-th alignment marks 134A and the 1B-th alignment mark 134B is optically detected, and the light is caused to be incident on the support 124 from the end surface of the support 124, and the light diffracted and reflected by the 2A-th alignment mark 138A and the 2B-th alignment mark 138B is optically detected. Here, in a state in which the relative alignment of the first hologram diffraction grating 131 and the second hologram diffraction grating 135 is completed, the 1A-th alignment mark 134A and the 2A-th alignment mark 138A have shapes in which the 1A-th alignment mark 134A and the 2A-th alignment mark 138A do not overlap, and the 1B-th alignment mark 134B and the 2B-th alignment mark 138B have shapes in which the 1B-th alignment mark 134B and the 2B-th alignment mark 138B do not overlap. Alternatively, in a state in which the relative alignment of the first hologram diffraction grating 131 and the second hologram diffraction grating 135 is completed, the 1A-th alignment mark 134A and the 2A-th alignment mark 138A are arranged at positions at which the 1A-th alignment mark 134A and the 2A-th alignment mark 138A do not overlap, and the 1B-th alignment mark 134B and the 2B-th alignment mark 138B are arranged at positions at which the 1B-th alignment mark 134B and the 2B-th alignment mark 138B do not overlap.

Specifically, for example, the first hologram diffraction grating 131 and the third hologram diffraction grating 141 constituting the first deflection unit 130 are formed on a first surface of a manufacturing substrate (not illustrated) on the basis of a well-known method. Further, the second hologram diffraction grating 135 constituting the first deflection unit 130 is formed on a second surface of the manufacturing substrate on the basis of a well-known method.

Then, the first hologram diffraction grating 131 and the third hologram diffraction grating 141 formed on the first surface of the manufacturing substrate are transferred onto a first dicing tape, and the first hologram diffraction grating 131 and the third hologram diffraction grating 141 are peeled off from the first surface of the manufacturing substrate. Then, the first hologram diffraction grating 131 and the third hologram diffraction grating 141 transferred onto the first dicing tape are transferred onto the first surface 122 of the light guide plate 121, the first hologram diffraction grating 131 and the third hologram diffraction grating 141 are adhered to the first surface 122 of the light guide plate 121, and then the first hologram diffraction grating 131 and third hologram diffraction grating 141 are peeled off from the first dicing tape. Thus, the first hologram diffraction grating 131 and the third hologram diffraction grating 141 can be arranged on the first surface 122 of the light guide plate 121.

Then, the second hologram diffraction grating 135 formed on the second surface of the manufacturing substrate is transferred onto a second dicing tape, and the second hologram diffraction grating 135 is peeled off from the second surface of the manufacturing substrate. The second dicing tape corresponds to the support 124. Further, the light guide plate 121 is placed on the stage 160 such that the second surface 123 is the upper side. Then, the second hologram diffraction grating 135 is placed to face the first hologram diffraction grating 131, and the support 124 in which the second hologram diffraction grating 135 is transferred onto the lower surface thereof is arranged above the light guide plate 121. This state is illustrated in FIGS. 34A and 34B.

Then, as described above, the 1A-th alignment mark 134A and the 2A-th alignment mark 138A are optically detected, and at the same time, the 1B-th alignment mark 134B and the 2B-th alignment mark 138B are optically detected (see FIGS. 32A, 33A, 34A, and 34B). In other words, the 1A-th alignment mark 134A and the 2A-th alignment mark 138A are imaged through a first imaging device 163, and the 1B-th alignment mark 134B and the 2B-th alignment mark 138B are imaged through a second imaging device 164. Then, a first straight line $L_1$ connecting the 1A-th alignment mark 134A with the 1B-th alignment mark 134B is obtained, a second straight line $L_2$ connecting the 2A-th alignment mark 138A with the 2B-th alignment mark 138B is obtained, and the relative alignment of the first hologram diffraction grating 131 and the second hologram diffraction grating 135 is performed by moving the stage 160 in the X direction and the Y direction and rotating the stage 160 within the XY plane so that the angle θ0 formed by the first straight line $L_1$ and the second straight line $L_2$ when the first straight line $L_1$ and the second straight line $L_2$ are projected onto the virtual plane is within a specified value $θ_{PD}$ (see FIGS. 32B and 33B). Then, the stage 160 is lifted up (moved in the Z direction), the second hologram diffraction grating 135 constituting the first deflection unit 130 is transferred onto the second surface 123 of the light guide plate 121, the second hologram diffraction grating 135 is bonded to the second surface 123 of the light guide plate 121, and the second hologram diffraction grating 135 is peeled off from the second dicing tape (the support 124).

100 seconds can be used as the maximum value of the specified value $θ_{PD}$ as an example. Specifically, an image in which five vertical lines (black lines extending in the y-axis direction) are arranged at regular intervals at an angle of view of 1°. Further, the lengths of the first interference fringe forming region 132 and the second interference fringe forming region 136 in the y axis direction are set to 20 mm Under this condition, the direction in which the first interference fringe formed in the first hologram diffraction grating 131 extends and the direction in which the second interference fringe formed in the second hologram diffraction grating 135 extends are parallel to the y axis, and the contrast of the image at this time is set to "1.00." Then, the second hologram diffraction grating 135 is rotated relative to the first hologram diffraction grating 131, and as a result of obtaining the angle $θ_0$ when the contrast of the image is "0.95," a value of ±50 seconds is obtained. From the above results, the maximum value of the specified value $θ_{PD}$ is set to 100 seconds.

Here, although the first hologram diffraction grating 131 and the second hologram diffraction grating 135 deviate from each other in the x-axis direction and the y-axis direction, since there is no particular change in the diffraction reflection by the first hologram diffraction grating 131 and the second hologram diffraction grating 135, that is, since there is no change in the diffraction reflection angle of the light diffracted and reflected by the first hologram diffraction grating 131 and the second hologram diffraction grating 135, the image quality of the image observed by the observer does not deteriorate. On the other hand, when a rotation deviation of a certain angle θ 0 occurs in the mutual position relation between the first hologram diffraction grating 131 and the second hologram diffraction grating 135, if there is a change in the diffraction reflection angle of the light diffracted and reflected by the first hologram diffraction grating 131 and the second hologram diffraction grating 135, the deterioration in the image quality (an image contrast reduction or image distortion) occurs in the image observed by the observer.

As described above, in the method of assembling the optical device according to the twelfth embodiment, the first straight line connecting the 1A-th alignment mark with the 1B-th alignment mark is obtained, the second straight line connecting the 2A-th alignment mark with the 2B-th alignment mark is obtained, and the relative alignment of the first hologram diffraction grating and the second hologram diffraction grating is performed so that the angle formed by the first straight line and the second straight line when the first straight line and the second straight line are projected onto the virtual plane is within a specified value. Therefore, the relative alignment of the first hologram diffraction grating and the second hologram diffraction grating can be performed on the basis of the simplified method. Alternatively, in the method of assembling the optical device according to the twelfth embodiment, in the state in which the second hologram diffraction grating is supported by the support, the light is caused to be incident on the light guide plate from the end surface of the light guide plate, the light diffracted and reflected by the 1A-th alignment mark and the 1B-th alignment mark is optically detected, and light is caused to be incident on the support from the end surface of the support, the light diffracted and reflected by the 2A-th alignment mark and the 2B-th alignment mark is optically detected, and the relative alignment of the first hologram diffraction grating and the second hologram diffraction grating is performed. Therefore, the relative alignment of the first hologram diffraction grating and the second hologram diffraction grating can be performed on the basis of the simplified method. Furthermore, in the hologram diffraction grating according to the twelfth embodiment, the same interference fringe as the interference fringe formed in the interference fringe forming region is formed in the alignment mark, the plane shape of the alignment mark is annular, and in the optical device or the display device according to the twelfth embodiment, in a state in which the relative alignment between the first hologram diffraction grating and the second hologram diffraction grating is completed, the shapes of the 1A-th alignment mark, the 2A-th alignment mark, the 1B-th alignment mark, and the 2B-th alignment mark are specified, or the arrangements of the alignment marks are specified. Therefore, the relative alignment of the first hologram diffraction grating and the second hologram diffraction grating can be performed reliably and easily on the basis of the simplified method. Further, in the alignment device according to the twelfth embodiment, since the first light source (first alignment light source) that causes light to be incident on the light guide plate from the end surface of the light guide plate placed on the stage and including the first hologram diffraction grating and the second light source (second alignment light source) that causes light to be incident on the support from the end surface of the support supporting the second hologram diffraction grating above the first hologram diffraction grating are provided, it is possible to detect the alignment marks reliably, accurately, and easily.

The present disclosure has been described above on the basis of the preferred embodiments, but the present disclosure is not limited to the above embodiments. The configurations and structures of the display devices (the head mounted display), the image display devices, the optical devices, and the hologram diffraction gratings described in the embodiments are examples and can be appropriately changed. For example, a surface relief type hologram (see US 20040062505A1) may be arranged on a light guide plate. In the optical device, the hologram diffraction grating may be configured with a transmission type volume hologram diffraction grating, or one of the first deflection unit and the second deflection unit may be configured with a reflection type volume hologram diffraction grating, and the other may be configured with a transmission type volume hologram diffraction grating. Alternatively, the hologram diffraction grating may be a reflective blazed diffraction grating element or a surface relief type hologram. In the embodiments, a binocular type including two image display devices has been described, but a monocular type including one image display device may be used. In some instances, the first hologram diffraction grating and the second hologram diffraction grating may be arranged on the first surface of the light guide plate or the second surface of the light guide plate. Further, the first hologram diffraction grating, the second hologram diffraction grating, and the third hologram diffraction grating may have a single layer configuration or a configuration in which a plurality of layers are stacked.

The optical devices and the display devices described in the first to sixth embodiments and the eighth to eleventh embodiments may be combined with the optical device and the display device described in the seventh embodiment. In the optical device and the display device described in the first to eleventh embodiments, the first hologram diffraction grating may be arranged on the second surface of the light guide plate, and the second hologram diffraction grating may be arranged on the first surface. The third hologram diffraction grating may be arranged on the second surface of the light guide plate. In the embodiments, the color of the light emitted from the light source is green but not limited thereto.

The configuration described in the sixth embodiment in which the second deflection unit 140 is configured with the 3A-th hologram diffraction grating 141A and the 3B-th hologram diffraction grating 141B can be applied to the optical device of the related art illustrated in FIG. 46. In other words, the second deflection unit 1140 in the optical device of the related art illustrated in FIG. 46 may be replaced with the 3A-th hologram diffraction grating 141A and the 3B-th hologram diffraction grating 141B described in the sixth embodiment. Accordingly, it is possible to further uniformize the image observed by the observer along the axial direction of the light guide plate 121.

Information or data related to the image to be displayed in the image forming apparatus may be stored in the display device, or information or data may be recorded in a so-called cloud computer. In the latter case, when the display device is equipped with a communication device, for example, a cellular phone or a smartphone or when the display device and the communication device are combined, it is possible to transfer or exchange various kinds of information or data between the cloud computer and the display device.

In the embodiments, the image forming apparatuses 111, 211, 111', and 211' have been described as displaying a single color (for example, green) image, but the image forming apparatuses 111, 211, 111', and 211' can display a color image, and in this case, it is desirable to constitute the light source, for example, by a light source that emits red, green, and blue. Specifically, for example, it is desirable to obtain white light by mixing red light, green light, and blue light emitted from a red light emitting element, a green light emitting element, and a blue light emitting element and perform brightness uniformization using a light pipe.

For example, as an image forming apparatus or a light source configured with a light emitting element and a light valve, in addition to a combination of a backlight that emits white light as a whole and a liquid crystal display device including a red light emitting pixel, a green light emitting pixel, and a blue light emitting pixel, the following configuration may be used as an example. Here, in the following description, the optical device 120 will be described as an example, but it will be appreciated that it can be applied to the optical device 320.

Figure 35:
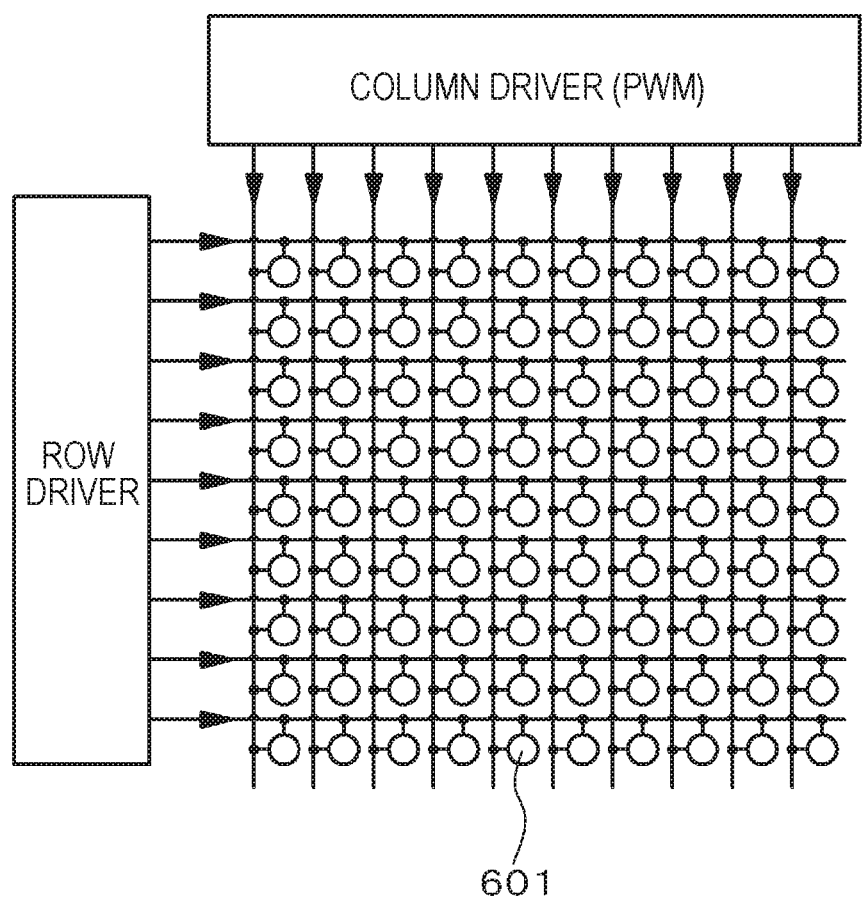
FIG. 35 is a conceptual diagram of a modified example of an image forming apparatus suitable for use in the first to twelfth embodiments.

In other words, for example, as illustrated in the conceptual diagram of FIG. 35, an active matrix type image forming apparatus that includes a light emitting panel in which light emitting elements 601 are arranged in a two-dimensional matrix form and controls a light emitting/non-emitting state of each of the light emitting elements 601 and displays an image by directly visualizing the light emitting state of the light emitting elements 601 can be provided. The light emitted from the image forming apparatus is incident on the light guide plate 121 via the collimating optical system 112. Here, the light emitting element is configured with, for example, a semiconductor laser element. The sample applies in the following description.

Figure 36:
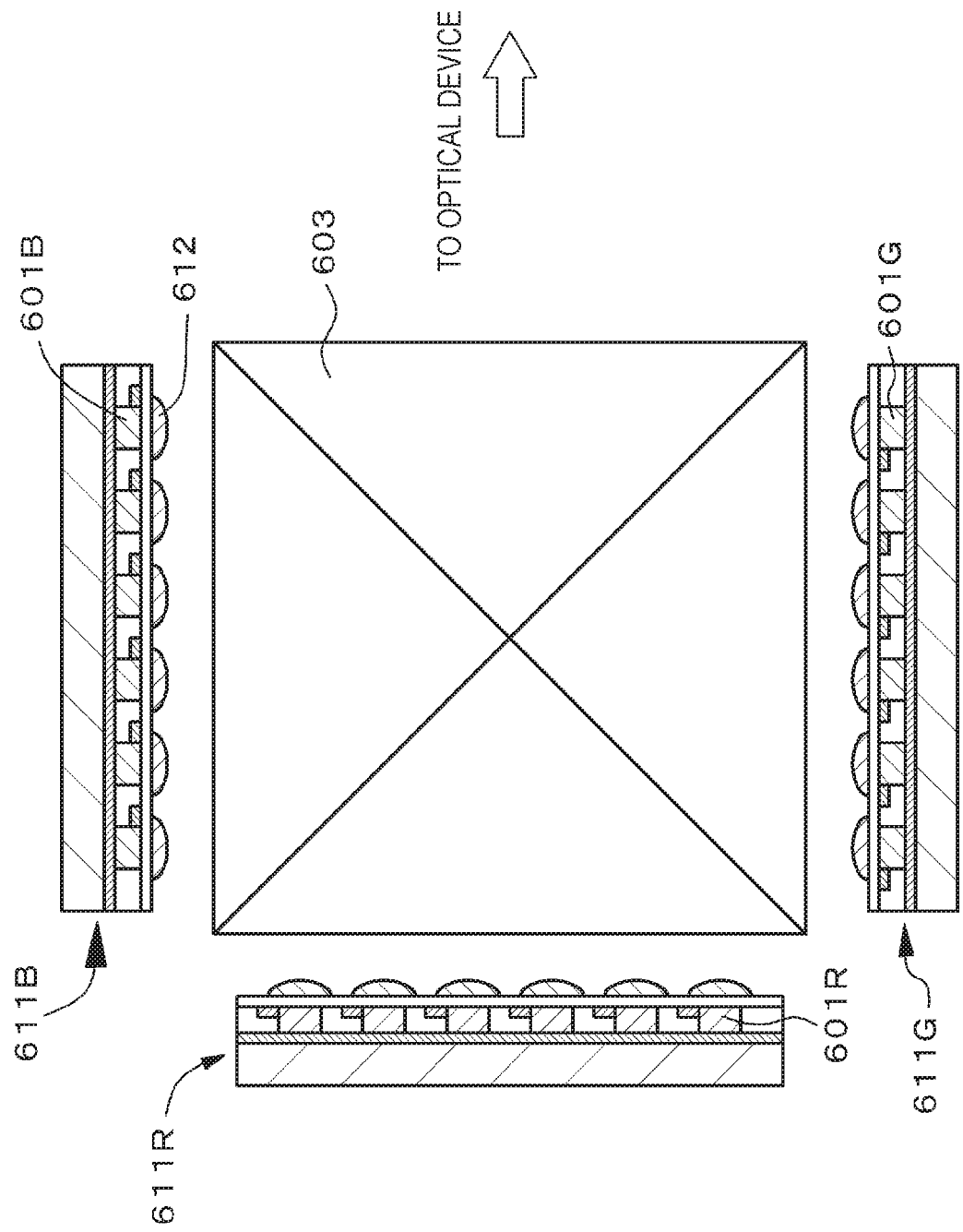
FIG. 36 is a conceptual diagram illustrating another modified example of the image forming apparatus suitable for use in the first to twelfth embodiments.

Alternatively, as illustrated in a conceptual diagram of FIG. 36, it is possible to provide a color display image forming apparatus including (α) a red light emitting panel 611R in which red light emitting elements 601R emitting red light are arranged in a two-dimensional matrix form, (β) a green light emitting panel 611G in which green light emitting elements 601G emitting green light are arranged in a two-dimensional matrix form, (γ) a blue light emitting panel 611B in which blue light emitting elements 601B emitting blue light are arranged in a two-dimensional matrix form, and (δ) means (for example, dichroic prism 603) for combining the light emitted from the red light emitting panel 611R, the green light emitting panel 611G and the blue light emitting panel 611B into one optical path, wherein the image forming apparatus controls the light emitting/non-emitting state of each of the red light emitting element 601R, the green light emitting element 601G, and the blue light emitting element 601B. The light emitted from the image forming apparatus is also incident on the light guide plate 121 via the collimating optical system 112. Here, reference numeral 612 indicates a microlens that condenses the light emitted from the light emitting element.

Figure 37:
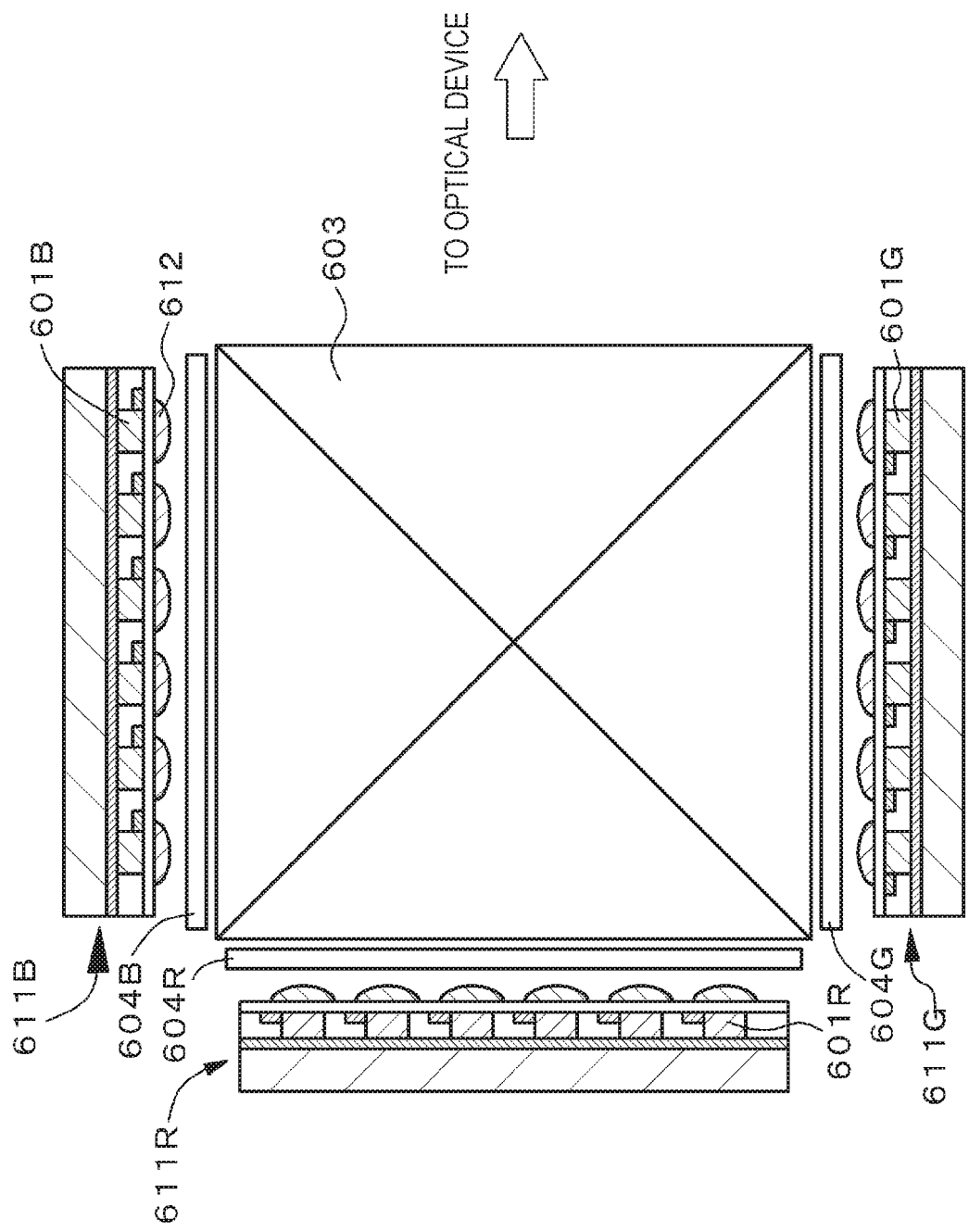
FIG. 37 is a conceptual diagram illustrating yet another modified example of the image forming apparatus suitable for use in the first to twelfth embodiments.

Alternatively, FIG. 37 is a conceptual diagram of an image forming apparatus including light emitting panels 611R, 611G, 611B, and the like in which light emitting elements 601R, 601G, and 601B are arranged in a two-dimensional matrix form, and light emitted from the light emitting panels 611R, 611G, and 611B are passed or not passed in accordance with control of the light passing control devices 604R, 604G, and 604B and enters a dichroic prism 603, the optical paths of the light are combined into one optical path, and the light is incident on a guide plate 121 via a collimating optical system 112.

Figure 38:
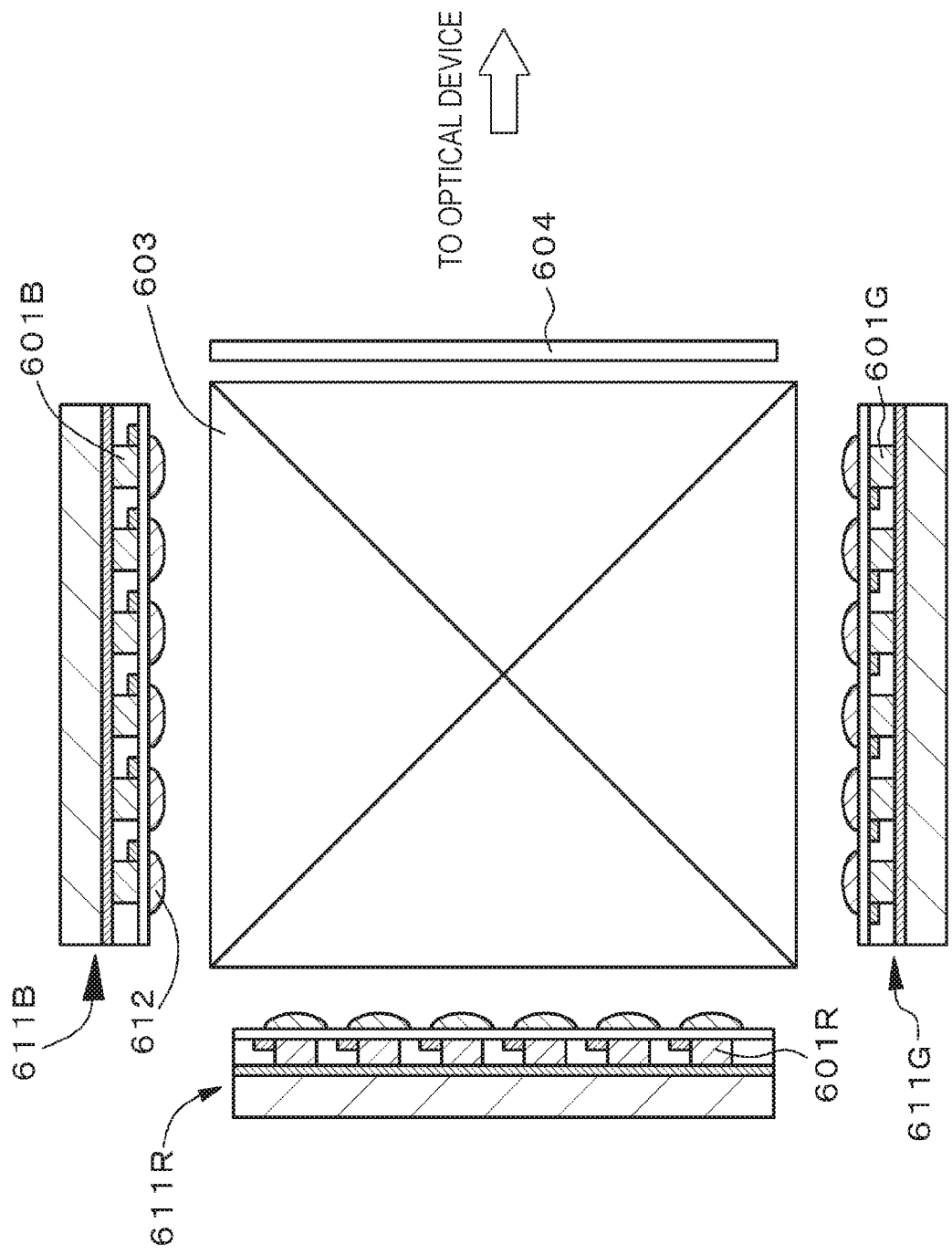
FIG. 38 is a conceptual diagram illustrating yet another modified example of the image forming apparatus suitable for use in the first to twelfth embodiments.

FIG. 38 is a conceptual diagram of an image forming apparatus including light emitting panels 611R, 611G, and 611B and the like in which light emitting elements 601R, 601G, 601B are arranged in a two-dimensional matrix form, light emitted from the light emitting panels 611R, 611G, and 611B is incident to a dichroic prism 603, the optical paths of the light are combined into one optical path, and the light emitted from the dichroic prism 603 are passed or not passed in accordance with control of a light passing control device 604, and the light is incident on a guide plate 121 via a collimating optical system 112.

Figure 39:
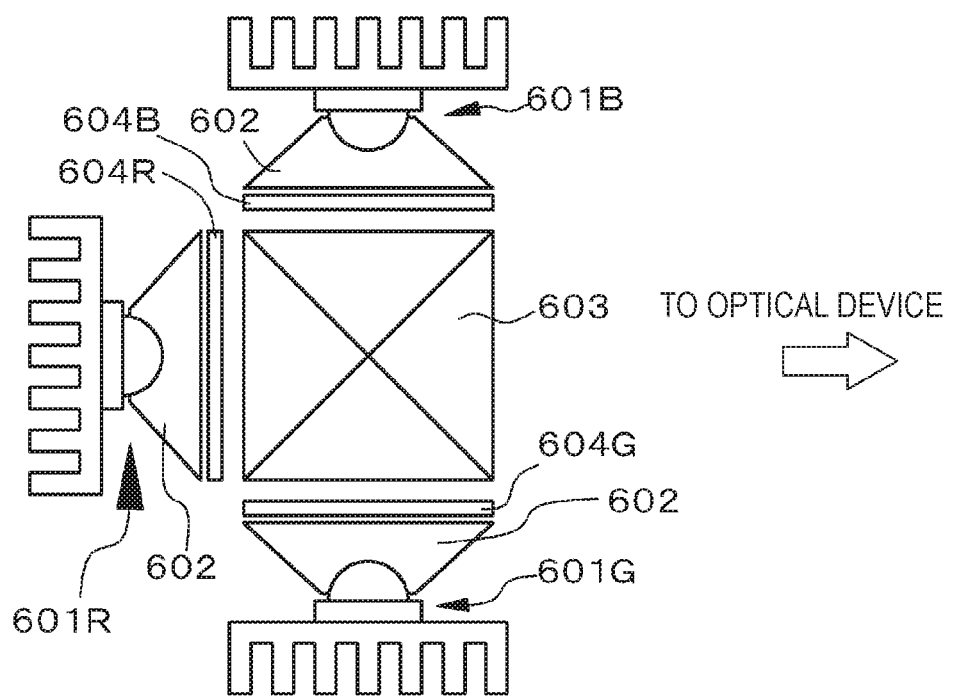
FIG. 39 is a conceptual diagram illustrating yet another modified example of the image forming apparatus suitable for use in the first to twelfth embodiments.

Alternatively, as illustrated in FIG. 39, it is possible to provide an image forming apparatus equipped with a light emitting element 601R that emits red light and a light passing control device (for example, a liquid crystal display device 604R) which is a sort of light valve that controls whether or not emission light emitted from the light emitting element 601R that emits red light are passed or not passed, a light emitting element 601G that emits green light and a light passing control device (for example, a liquid crystal display device 604G) which is a sort of light valve that controls whether or not emission light emitted from the light emitting element 601G that emits green light are passed or not passed, a light emitting element 601B that emits blue light and a light passing control device (for example, a liquid crystal display device 604B) which is a sort of light valve that controls whether or not emission light emitted from the light emitting element 601B that emits blue light are passed or not passed, light guide members 602 that guide the light emitted from the light emitting elements 601R, 601G, and 601B, and means (for example, a dichroic prism 603) that combines light paths into one. Further, the light emitted from the dichroic prism 603 is incident on the light guide plate 121 via the collimating optical system 112.

Additionally, the present technology may also be configured as below.

[A01] «Optical Device According to First Aspect»

An optical device, including:

(a) a light guide plate configured to cause incident light to propagate inside the light guide plate through total reflection and then emit the light;

(b) a first deflection unit configured to deflect the light incident on the light guide plate so that the light incident on the light guide plate is totally reflected inside the light guide plate; and (c) a second deflection unit configured to deflect the light that has propagated inside the light guide plate through the total reflection so that part of the light that has propagated inside the light guide plate through the total reflection is emitted from the light guide plate, wherein the first deflection unit is constituted by a first hologram diffraction grating and a second hologram diffraction grating, the second deflection unit is constituted by a third hologram diffraction grating, a first interference fringe is formed in the first hologram diffraction grating, a second interference fringe is formed in the second hologram diffraction grating, a third interference fringe is formed in the third hologram diffraction grating, and a relation of $\phi_2 < \phi_3 < \phi_1$ and $P_1 = P_3 = P_2$ is satisfied, where $\phi_1$ represents a slant angle of the first interference fringe, $\phi_2$ represents a slant angle of the second interference fringe, $\phi_3$ represents a slant angle of the third interference fringe, $P_1$ represents a pitch of the first interference fringe, $P_2$ represents a pitch of the second interference fringe, and $P_3$ represents a pitch of the third interference fringe.

[A02]

The optical device according to [A01], wherein $0.7° \leq |\phi_2 - \phi_1| 4.7°$ is satisfied.

[A03]

The optical device according to [A01] or [A02], wherein $\eta_1/\eta_3 \leq 1.0$ and $\eta_2/\eta_3 \leq 1.0$ are satisfied, where $\eta_1$ represents diffraction efficiency of the first hologram diffraction grating, $\eta_2$ represents diffraction efficiency of the second hologram diffraction grating, and $\eta_3$ represents diffraction efficiency of the third hologram diffraction grating.

[A04]

The optical device according to any one of [A01] to [A03], wherein $\eta_1 > \eta_2$ is satisfied, where $\eta_1$ represents diffraction efficiency of the first hologram diffraction grating, and $\eta_2$ represents diffraction efficiency of the second hologram diffraction grating.

[A05]

The optical device according to any one of [A01] to [A04], wherein $1.0 \ \mu m \leq T_1$, $T_2 \leq 10 \ \mu m$ and $T_1 \geq T_3$, $T_2 \geq T_3$ are satisfied, where $T_1$ represents a thickness of the first hologram diffraction grating, $T_2$ represents a thickness of the second hologram diffraction grating, and $T_3$ represents a thickness of the third hologram diffraction grating.

[A06]

The optical device according to [A05], wherein $T_3 \leq 2.0 \ \mu m$, preferably $T_3 \leq 1.6 \ \mu m$ is satisfied.

[A07]

The optical device according to any one of [A01] to [A05], wherein $T_1 > T_2$ is satisfied, where $T_1$ represents a thickness of the first hologram diffraction grating, and $T_2$ represents a thickness of the second hologram diffraction grating.

[A08]

The optical device according to any one of [A01] to [A07], wherein the first hologram diffraction grating is arranged on one surface of the light guide plate, and the second hologram diffraction grating is arranged on the other surface of the light guide plate opposite to the one surface.

[A09]

The optical device according to [A08], wherein the third hologram diffraction grating is arranged on one surface of the light guide plate.

[A10]

The optical device according to [A08]

wherein the third hologram diffraction grating is arranged on the other surface of the light guide plate.

[A11]

The optical device according to any one of [A01] to [A07], wherein, in the third hologram diffraction grating, a region located far from the first deflection unit has a higher diffraction efficiency than a region located close to the first deflection unit.

[A12]

The optical device according to any one of [A01] to [A07], wherein, in the third hologram diffraction grating, a region located far from the first deflection unit is thicker than a region located close to the first deflection unit.

[A13]

The optical device according to [A12], wherein a thickness of the third hologram diffraction grating changes stepwise or increases gradually.

[A14]

The optical device according to [A11], wherein the third hologram diffraction grating is constituted by a 3A-th hologram diffraction grating located close to the first deflection unit and a 3B-th hologram diffraction grating located far from the first deflection unit, and $\eta_{3B} > \eta_{3A}$ is satisfied where $\eta_{3A}$ represents diffraction efficiency of the 3A-th hologram diffraction grating, and $\eta_{3B}$ represents diffraction efficiency of the 3B-th hologram diffraction grating.

[A15]

The optical device according to [A13] or [A14], wherein the third hologram diffraction grating is constituted by a 3A-th hologram diffraction grating located close to the first deflection unit and a 3B-th hologram diffraction grating located far from the first deflection unit, and $T_{3B} > T_{3A}$ is satisfied where $T_{3A}$ represents a thickness of the 3A-th hologram diffraction grating, and $T_{3B}$ represents a thickness of the 3B-th hologram diffraction grating.

[A16]

The optical device according to [A14] or [A15] wherein, when a surface on which the light is incident is defined as a second surface of the light guide plate and an opposite surface of the light guide plate to the second surface is defined as a first surface, the 3A-th hologram diffraction grating and the 3B-th hologram diffraction grating are arranged on the first surface of the light guide plate.

[A17]

The optical device according to [A14] or [A15], wherein, when a surface on which the light is incident is defined as a second surface of the light guide plate and an opposite surface of the light guide plate to the second surface is defined as a first surface, the 3A-th hologram diffraction grating and the 3B-th hologram diffraction grating are arranged on the second surface of the light guide plate.

[A18]

The optical device according to [A14] or [A15], wherein, when a surface on which the light is incident is defined as a second surface of the light guide plate and an opposite surface of the light guide plate to the second surface is defined as a first surface, the 3A-th hologram diffraction grating is arranged on the second surface of the light guide plate, and the 3B-th hologram diffraction grating is arranged on the first surface of the light guide plate.

[A19]

The optical device according to [A14] or [A15], wherein, when a surface on which the light is incident is defined as a second surface of the light guide plate and an opposite surface of the light guide plate to the second surface is defined as a first surface, the 3A-th hologram diffraction grating is arranged on the first surface of the light guide plate, and the 3B-th hologram diffraction grating is arranged on the second surface of the light guide plate.

[A20]

The optical device according to [A18] or [A19], wherein an orthogonal projection image of the 3A-th hologram diffraction grating to the light guide plate and an orthogonal projection image of the 3B-th hologram diffraction grating to the light guide plate overlap each other in a boundary portion in which the orthogonal projection images are facing to each other.

[A21]

The optical device according to any one of [A14] to [A20], wherein a slant angle of the 3A-th hologram diffraction grating is the same as a slant angle of the 3B-th hologram diffraction grating.

[B01] «Optical Device According to Second Aspect»

An optical device, including:

(a) a light guide plate configured to cause incident light to propagate inside the light guide plate through total reflection and then emit the light;

(b) a first deflection unit configured to deflect the light incident on the light guide plate so that the light incident on the light guide plate is totally reflected inside the light guide plate, and (c) a second deflection unit configured to deflect the light that has propagated inside the light guide plate through the total reflection so that part of the light that has propagated inside the light guide plate through the total reflection is emitted from the light guide plate, wherein the first deflection unit is constituted by a first hologram diffraction grating and a second hologram diffraction grating, the second deflection unit is constituted by a third hologram diffraction grating, a first interference fringe is formed in the first hologram diffraction grating, a second interference fringe is formed in the second hologram diffraction grating, a third interference fringe is formed in the third hologram diffraction grating, and a relation of $$\lambda_2 < \lambda_3 < \lambda_1$$

is satisfied, where $\lambda_1$ represents a peak wavelength of light which is incident on the light guide plate and deflected by the first hologram diffraction grating, $\lambda_2$ represents a peak wavelength of light which is incident on the light guide plate and deflected by the second hologram diffraction grating, and $\lambda_3$ represents a peak wavelength of light which is deflected by the first hologram diffraction grating and the second hologram diffraction grating, propagates inside the light guide plate through the total reflection, and is then deflected by the third hologram diffraction grating.

[B02]

The optical device according to [B01], wherein 0 nm<$|\lambda_3-\lambda_1|$≤40 nm and 0 nm<$|\lambda_2-\lambda_3|$≤40 nm is satisfied.

[B03]

The optical device according to [B01] or [B02], wherein $\eta_1/\eta_3$≤1.0 and $\eta_2/\eta_3$≥1.0 are satisfied, where $\eta_1$ represents diffraction efficiency of the first hologram diffraction grating, $\eta_2$ represents diffraction efficiency of the second hologram diffraction grating, and $\eta_3$ represents diffraction efficiency of the third hologram diffraction grating.

[B04]

The optical device according to any one of [B01] to [B03], wherein $\eta_1 > \eta_2$ is satisfied, where $\eta_1$ represents diffraction efficiency of the first hologram diffraction grating, and $\eta_2$ represents diffraction efficiency of the second hologram diffraction grating.

[B05]

The optical device according to any one of [B01] to [B04], wherein $1.0\ \mu m \leq T_1$, $T_2 \leq 10\ \mu m$ and $T_1 \geq T_3$, $T_2 \geq T_3$ are satisfied, where $T_1$ represents a thickness of the first hologram diffraction grating, $T_2$ represents a thickness of the second hologram diffraction grating, and $T_3$ represents a thickness of the third hologram diffraction grating.

[B06]

The optical device according to [B05], wherein $T_3 \leq 2.0\ \mu m$, preferably $T_3 \leq 1.6\ \mu m$ is satisfied.

[B07]

The optical device according to any one of 03011 to [B05], wherein $T_1 > T_2$ is satisfied, where $T_1$ represents a thickness of the first hologram diffraction grating, and $T_2$ represents a thickness of the second hologram diffraction grating.

[B08]

The optical device according to any one of [B01] to [B07], wherein $P_1 = P_2$ and $\phi_1 \neq \phi_2$ are satisfied, where $P_1$ represents a pitch of the first interference fringe, $\phi_1$ represents a slant angle of the first interference fringe, $P_2$ represents a pitch of the second interference fringe, and $\phi_2$ represents a slant angle of the second interference fringe.

[B09]

The optical device according to [B08], wherein $\phi_2 < \phi_3 < \phi_1$ and $P_1 = P_2 = P_3$ are satisfied, where $P_3$ represents a pitch of the third interference fringe, and $\phi_3$ represents a slant angle of the third interference fringe.

[B10]

The optical device according to any one of [B01] to [B09], wherein the first hologram diffraction grating is arranged on one surface of the light guide plate, and the second hologram diffraction grating is arranged on the other surface of the light guide plate opposite to the one surface.

[B11]

The optical device according to any one of [B10], wherein the third hologram diffraction grating is arranged on one surface of the light guide plate.

[B12]

The optical device according to any one of [B12], wherein the third hologram diffraction grating is arranged on the other surface of the light guide plate.

[B13]

The optical device according to any one of [B01] to [B09], wherein, in the third hologram diffraction grating, a region located far from the first deflection unit has a higher diffraction efficiency than a region located close to the first deflection unit.

[B14]

The optical device according to any one of [B01] to [B09], wherein, in the third hologram diffraction grating, a region located far from the first deflection unit is thicker than a region located close to the first deflection unit.

[B15]

The optical device according to [B14], wherein a thickness of the third hologram diffraction grating changes stepwise or increases gradually.

[B16]

The optical device according to [B13], wherein the third hologram diffraction grating is constituted by a 3A-th hologram diffraction grating located close to the first deflection unit and a 3B-th hologram diffraction grating located far from the first deflection unit, and $\eta_{3B} > \eta_{3A}$ is satisfied where $\eta_{3A}$ represents diffraction efficiency of the 3A-th hologram diffraction grating, and $\eta_{3B}$ represents diffraction efficiency of the 3B-th hologram diffraction grating.

[B17]

The optical device according to [B15] or [B16], wherein the third hologram diffraction grating is constituted by a 3A-th hologram diffraction grating located close to the first deflection unit and a 3B-th hologram diffraction grating located far from the first deflection unit, and $T_{3B} > T_{3A}$ is satisfied where $T_{3A}$ represents a thickness of the 3A-th hologram diffraction grating, and $T_{3B}$ represents a thickness of the 3B-th hologram diffraction grating.

[B18]

The optical device according to [B16] or [B17]

wherein, when a surface on which the light is incident is defined as a second surface of the light guide plate and an opposite surface of the light guide plate to the second surface is defined as a first surface, the 3A-th hologram diffraction grating and the 3B-th hologram diffraction grating are arranged on the first surface of the light guide plate.

[B19]

The optical device according to [B16] or [B17], wherein, when a surface on which the light is incident is defined as a second surface of the light guide plate and an opposite surface of the light guide plate to the second surface is defined as a first surface, the 3A-th hologram diffraction grating and the 3B-th hologram diffraction grating are arranged on the second surface of the light guide plate.

[B20]

The optical device according to [B16] or [B17], wherein, when a surface on which the light is incident is defined as a second surface of the light guide plate and an opposite surface of the light guide plate to the second surface is defined as a first surface, the 3A-th hologram diffraction grating is arranged on the second surface of the light guide plate, and the 3B-th hologram diffraction grating is arranged on the first surface of the light guide plate.

[B21]

The optical device according to [B16] or [B17], wherein, when a surface on which the light is incident is defined as a second surface of the light guide plate and an opposite surface of the light guide plate to the second surface is defined as a first surface, the 3A-th hologram diffraction grating is arranged on the first surface of the light guide plate, and the 3B-th hologram diffraction grating is arranged on the second surface of the light guide plate.

[B22]

The optical device according to [B20] or [B21], wherein an orthogonal projection image of the 3A-th hologram diffraction grating to the light guide plate and an orthogonal projection image of the 3B-th hologram diffraction grating to the light guide plate overlap each other in a boundary portion in which the orthogonal projection images are facing to each other.

[B23]

The optical device according to any one of [B16] to [B22], wherein a slant angle of the 3A-th hologram diffraction grating is the same as a slant angle of the 3B-th hologram diffraction grating.

[C01]

The optical device according to any one of [A01] to [B23], wherein incident light having a peak wavelength $\lambda_1$ is mainly diffracted by the first hologram diffraction grating rather than the second hologram diffraction grating among incident light corresponding to a central angle of view, and incident light having the peak wavelength $\lambda_2$ is mainly diffracted by the second hologram diffraction grating rather than the first hologram diffraction grating among the incident light corresponding to the central angle of view.

[C02]

The optical device according to any one of [A01] to [C01], wherein the first hologram diffraction grating has a first interference fringe forming region in which a first interference fringe is formed and an alignment mark disposed outside the first interference fringe forming region, and the second hologram diffraction grating has a second interference fringe forming region in which a second interference fringe is formed and an alignment mark disposed outside the second interference fringe forming region.

[D01]

The optical device according to any one of [A01] to [C20], wherein the first hologram diffraction grating includes a first interference fringe forming region in which a first interference fringe is formed, the second hologram diffraction grating includes a second interference fringe forming region in which a second interference fringe is formed, in the first hologram diffraction grating, on an outer side of the first interference fringe forming region in a direction in which the first interference fringe extends, the 1A-th alignment mark and the 1B-th alignment mark are disposed to face each other with the first interference fringe forming region interposed therebetween, in the second hologram diffraction grating, on an outer side of the second interference fringe forming region in a direction in which the second interference fringe extends, the 2A-th alignment mark and the 2B-th alignment mark are disposed to face each other with the second interference fringe forming region interposed therebetween, the same interference fringe as the interference fringe formed in the first interference fringing forming region is formed in the 1A-th alignment mark and the 1B-th alignment mark, the same interference fringe as the interference fringe formed in the second interference fringe forming region is formed in the 2A-th alignment mark and the 2B-th alignment mark, in a state in which a relative alignment between the first hologram diffraction grating and the second hologram diffraction grating is completed, the 1A-th alignment mark and the 2A-th alignment mark have shapes in which the 1A-th alignment mark and the 2A-th alignment mark do not overlap, and the 1B-th alignment mark and the 2B-th alignment mark have shapes in which the 1B-th alignment mark and the 2B-th alignment mark do not overlap, or in a state in which a relative alignment between the first hologram diffraction grating and the second hologram diffraction grating is completed, the 1A-th alignment mark and the 2A-th alignment mark are arranged at positions at which the 1A-th alignment mark and the 2A-th alignment mark do not overlap, and the 1B-th alignment mark and the 2B-th alignment mark are arranged at positions at which the 1B-th alignment mark and the 2B-th alignment mark do not overlap.

[D02]

The optical device according to [D01], wherein the 1A-th alignment mark, the 1B-th alignment mark, the 2A-th alignment mark, and the 2B-th alignment mark are arranged on an end portion side of the light guide plate.

[E01] «Display Device According to First Aspect»

A display device, including:

(i) a frame configured to be worn on a head of an observer; and (ii) an image display device configured to be mounted on the frame, wherein the image display device includes (A) an image forming apparatus, and (B) an optical device configured to cause light emitted from the image forming apparatus to be incident and emitted, the optical device includes (a) a light guide plate configured to cause incident light to propagate inside the light guide plate through total reflection and then emit the light, (b) a first deflection unit configured to deflect the light incident on the light guide plate so that the light incident on the light guide plate is totally reflected inside the light guide plate, and (c) a second deflection unit configured to deflect the light that has propagated inside the light guide plate through the total reflection so that part of the light that has propagated inside the light guide plate through the total reflection is emitted from the light guide plate, the first deflection unit is constituted by a first hologram diffraction grating and a second hologram diffraction grating, the second deflection unit is constituted by a third hologram diffraction grating, a first interference fringe is formed in the first hologram diffraction grating, a second interference fringe is formed in the second hologram diffraction grating, a third interference fringe is formed in the third hologram diffraction grating, and a relation of $$\phi_2 < \lambda_3 < \lambda_1 \text{ and } P_1 = P_3 = P_2$$

is satisfied, where $\phi_1$ represents a slant angle of the first interference fringe, $\phi_2$ represents a slant angle of the second interference fringe, $\phi_3$ represents a slant angle of the third interference fringe, $P_1$ represents a pitch of the first interference fringe, $P_2$ represents a pitch of the second interference fringe, and $P_3$ represents a pitch of the third interference fringe.

[E02]

The display device according to [E01], wherein, when $\lambda_3$ represents a peak wavelength of light which is deflected by the first hologram diffraction grating and the second hologram diffraction grating, propagates inside the light guide plate through the total reflection, and is then deflected by the third hologram diffraction grating, the image forming apparatus includes a light source that emits light having the peak wavelength $\lambda_3$.

[E03]
The optical device according to [E01] or [E02],
wherein the image forming apparatus includes a first light source and a second light source.

[E04]
The display device according to [E03] citing [E02],
wherein a peak wavelength in a combined optical spectrum of light emitted from the two light sources is $\lambda_3$.

[E05] «Display Device According to Second Aspect»
A display device, including:
(i) a frame configured to be worn on a head of an observer; and
(ii) an image display device configured to be mounted on the frame,
wherein the image display device includes
(A) an image forming apparatus, and
(B) an optical device configured to cause light emitted from the image forming apparatus to be incident and emitted,
the optical device includes
(a) a light guide plate configured to cause incident light to propagate inside the light guide plate through total reflection and then emit the light;
(b) a first deflection unit configured to deflect the light incident on the light guide plate so that the light incident on the light guide plate is totally reflected inside the light guide plate, and
(c) a second deflection unit configured to deflect the light that has propagated inside the light guide plate through the total reflection so that part of the light that has propagated inside the light guide plate through the total reflection is emitted from the light guide plate,
the first deflection unit is constituted by a first hologram diffraction grating and a second hologram diffraction grating,
the second deflection unit is constituted by a third hologram diffraction grating,
a first interference fringe is formed in the first hologram diffraction grating,
a second interference fringe is formed in the second hologram diffraction grating,
a third interference fringe is formed in the third hologram diffraction grating, and
a relation of $\lambda_2 < \lambda_3 < \lambda_1$ is satisfied,
where
$\lambda_1$ represents a peak wavelength of light which is incident on the light guide plate and deflected by the first hologram diffraction grating,
$\lambda_2$ represents a peak wavelength of light which is incident on the light guide plate and deflected by the second hologram diffraction grating, and
$\lambda_3$ represents a peak wavelength of light which is deflected by the first hologram diffraction grating and the second hologram diffraction grating, propagates inside the light guide plate through the total reflection, and is then deflected by the third hologram diffraction grating.

[E06]
The display device according to [E05],
wherein the image forming apparatus includes a light source that emits light having the peak wavelength $\lambda_3$.

[E07]
The display device according to [E05] or [E06],
wherein the image forming apparatus includes a first light source and a second light source.

[E08]
The display device according to [E06] citing [E07],
wherein a peak wavelength in a combined optical spectrum of light emitted from the two light sources is $\lambda_3$.

[E09]
A display device, including:
(i) a frame configured to be worn on a head of an observer; and
(ii) an image display device configured to be mounted on the frame,
wherein the image display device includes
(A) an image forming apparatus, and
(B) an optical device configured to cause light emitted from the image forming apparatus to be incident and emitted,
the optical device includes
(a) a light guide plate configured to cause incident light to propagate inside the light guide plate through total reflection and then emit the light;
(b) a first deflection unit configured to deflect the light incident on the light guide plate so that the light incident on the light guide plate is totally reflected inside the light guide plate, and
(c) a second deflection unit configured to deflect the light that has propagated inside the light guide plate through the total reflection so that part of the light that has propagated inside the light guide plate through the total reflection is emitted from the light guide plate, and
the image forming apparatus includes a first light source with a peak wavelength $\lambda_{LS-1}$ and a second light source with peak wavelength $\lambda_{LS-2}$, and
the image forming apparatus forms an image on a basis of the light from the first light source and light from the second light source.

[E10]
The display device according to [E09],
wherein $0 \text{ nm} < |\lambda_{LS-2} - \lambda_{LS-1}| \leq 60 \text{ nm}$ is satisfied.

[E11]
The display device according to [E09] or [E10]
wherein the image display device controls intensity of light from the first light source and intensity of light from the second light source.

[F01]
The display device according to any one of [E01] to [E08],
wherein the first hologram diffraction grating includes a first interference fringe forming region in which a first interference fringe is formed,
the second hologram diffraction grating includes a second interference fringe forming region in which a second interference fringe is formed,
in the first hologram diffraction grating, on an outer side of the first interference fringe forming region in a direction in which the first interference fringe extends, the 1A-th alignment mark and the 1B-th alignment mark are disposed to face each other with the first interference fringe forming region interposed therebetween,
in the second hologram diffraction grating, on an outer side of the second interference fringe forming region in a direction in which the second interference fringe extends, the 2A-th alignment mark and the 2B-th alignment mark are disposed to face each other with the second interference fringe forming region interposed therebetween,
the same interference fringe as the interference fringe formed in the first interference fringing forming region is formed in the 1A-th alignment mark and the 1B-th alignment mark, the same interference fringe as the interference fringe formed in the second interference fringe forming region is formed in the 2A-th alignment mark and the 2B-th alignment mark, in a state in which a relative alignment between the first hologram diffraction grating and the second hologram diffraction grating is completed, the 1A-th alignment mark and the 2A-th alignment mark have shapes in which the 1A-th alignment mark and the 2A-th alignment mark do not overlap, and the 1B-th alignment mark and the 2B-th alignment mark have shapes in which the 1B-th alignment mark and the 2B-th alignment mark do not overlap, or in a state in which a relative alignment between the first hologram diffraction grating and the second hologram diffraction grating is completed, the 1A-th alignment mark and the 2A-th alignment mark are arranged at positions at which the 1A-th alignment mark and the 2A-th alignment mark do not overlap, and the 1B-th alignment mark and the 2B-th alignment mark are arranged at positions at which the 1B-th alignment mark and the 2B-th alignment mark do not overlap.

[F02]
The display device according to [F01],
wherein the 1A-th alignment mark, the 1B-th alignment mark, the 2A-th alignment mark, and the 2B-th alignment mark are arranged on an end portion side of the light guide plate.

[G01] «Hologram Diffraction Grating»
A hologram diffraction grating, including:
an interference fringe forming region in which an interference fringe is formed; and
two alignment marks that are disposed to face each other with the interference fringe forming region interposed therebetween on an outer side of the interference fringe forming region in a direction in which the interference fringe extends,
wherein the same interference fringe as the interference fringe formed in the interference fringe forming region is formed in each of the alignment marks, and
a plane shape of each of the alignment marks is annular.

[G02]
The hologram diffraction grating according to [G01],
wherein each of the alignment marks may be disposed outside the portions of the interference fringe forming regions opposite to the portions of the interference fringe forming regions from which light is emitted.

[H01] «Alignment Device»
An alignment device, including:
a stage that is movable in an X direction, a Y direction, and a Z direction and is rotatable on an XY plane;
a first light source (first alignment light source) that causes light to be incident on a light guide plate from an end surface of the light guide plate placed on the stage and a first hologram diffraction grating is arranged;
a second light source (second alignment light source) that causes light to be incident on a support from an end surface of the support supporting a second hologram diffraction grating above the first hologram diffraction grating;
a first imaging device that detects an optical image of the 1A-th alignment mark based on the light which is incident from the first light source and diffracted and reflected by the 1A-th alignment mark disposed in the first hologram diffraction grating and an optical image of an optical image of the 2A-th alignment mark based on the light which is incident from the second light source and diffracted and reflected by the 2A-th alignment mark disposed in the second hologram diffraction grating; and a second imaging device that detects an optical image of the 1B-th alignment mark based on the light which is incident from the first light source and diffracted and reflected by the 1B-th alignment mark disposed in the first hologram diffraction grating and an optical image of an optical image of the 2B-th alignment mark based on the light which is incident from the second light source and diffracted and reflected by the 2B-th alignment mark disposed in the second hologram diffraction grating.

[J1] «Method of Assembling Optical Device: First Aspect»
A method of assembling the optical device according to [D01] or [D02], including:
optically detecting the 1-th alignment mark and the 2-th alignment mark and optically detecting the 1B-th alignment mark and the 2B-th alignment mark;
obtaining a first straight line connecting the 1A-th alignment mark and the 1B-th alignment mark and obtaining a second straight line connecting the 2A-th alignment mark and the 2B-th alignment mark; and
performing a relative alignment of the first hologram diffraction grating and the second hologram diffraction grating so that an angle formed by the first straight line and the second straight line when the first straight line and the second straight line are projected onto a virtual plane is within a specified value.

[J02] «Method of Assembling Optical Device: Second Aspect»
A method of assembling the optical device according to [D01] or [D02], including:
forming the same interference fringe as the interference fringe formed in the first interference fringing forming region in the 1A-th alignment mark and the 1B-th alignment mark;
forming the same interference fringe as the interference fringe formed in the second interference fringe forming region in the 2A-th alignment mark and the 2B-th alignment mark; and
in a state in which the second hologram diffraction grating is supported by a support, causing light to be incident on the light guide plate from an end surface of the light guide plate, optically detecting light diffracted and reflected by the 1A-th alignment mark and the 1B-th alignment mark, causing light to be incident on the support from an end surface of the support, optically detecting light diffracted and reflected by the 2A-th alignment mark and the 2B-th alignment mark, and performing a relative alignment of the first hologram diffraction grating and the second hologram diffraction grating.

[J03]
The method of assembling the optical device according to [J01] or [J02],
wherein in a state in which the first hologram diffraction grating is disposed in the light guide plate, the relative alignment of the first hologram diffraction grating and the second hologram diffraction grating is performed, and the second hologram diffraction grating is disposed in the light guide plate.

[J04]
The method of assembling the optical device according to [J03],
wherein in a state in which the first hologram diffraction grating is arranged in the light guide plate, the light guide plate is moved relative to the second hologram diffraction grating.

[J05]

The method of assembling the optical device according to [J03] or [J04], wherein after the first hologram diffraction grating is attached to the light guide plate, the relative alignment of the first hologram diffraction grating and the second hologram diffraction grating is performed, and the second hologram diffraction grating is attached to the light guide plate.

[J06]

The method of assembling the optical device according to any one of [J01] to [J05], wherein the relative alignment of the first hologram diffraction grating and the second hologram diffraction grating is performed in a state in which the second hologram diffraction grating is supported by the support.

[J07]

The method of assembling the optical device according to [J06], wherein the same interference fringe as the interference fringe formed in the first interference fringe forming region is formed in the 1A-th alignment mark and the 1B-th alignment mark, the same interference fringe as the interference fringe formed in the second interference fringe forming region is formed in and the 2A-th alignment marks and the 2B-th alignment mark, light is caused to be incident on the light guide plate from the end surface of the light guide plate, and light diffracted and reflected by the 1A-th alignment marks and the 1B-th alignment mark is optically detected, and light is caused to be incident on the support from the end surface of the support, and light diffracted and reflected by the 2A-th alignment mark and the 2B-th alignment mark is optically detected.

[J08]

The method of assembling the optical device according to [J07], wherein in a state in which the relative alignment of the first hologram diffraction grating and the second hologram diffraction grating is completed, the 1A-th alignment mark and the 2A-th alignment mark have shapes in which the 1A-th alignment mark and the 2A-th alignment mark do not overlap, and the 1B-th alignment mark and the 2B-th alignment mark have shapes in which the 1B-th alignment mark and the 2B-th alignment mark do not overlap.

[J09]

The method of assembling the optical device according to [J07], wherein in a state in which the relative alignment of the first hologram diffraction grating and the second hologram diffraction grating is completed, the 1A-th alignment mark and the 2A-th alignment mark are disposed at positions in which the 1A-th alignment mark and the 2A-th alignment mark do not overlap, and the 1B-th alignment mark and the 2B-th alignment mark are disposed at positions in which the 1B-th alignment mark and the 2B-th alignment mark do not overlap.

[J10]

The method of assembling the optical device according to any one of [J01] to [J09], wherein the 1A-th alignment mark and the 2A-th alignment mark are imaged through a first imaging device, and the 1B-th alignment mark and the 2B-th alignment mark are imaged through a second imaging device 164.

[J11]

The method of assembling the optical device according to any one of [J01] to [J10], wherein the 1A-th alignment mark, the 1B-th alignment mark, the 2A-th alignment mark, and the 2B-th alignment mark are arranged on an end portion side of the light guide plate.

[J12]

The method for assembling the optical device according to any one of [J01] to [J11], wherein a maximum value of a specified value is 100 seconds.

[K01] «Optical Device According to Fourth Aspect»

An optical device, including:

(a) a light guide plate configured to cause incident light to propagate inside the light guide plate through total reflection and then emit the light;

(b) a first deflection unit configured to deflect the light incident on the light guide plate so that the light incident on the light guide plate is totally reflected inside the light guide plate; and (c) a second deflection unit configured to deflect the light that has propagated inside the light guide plate through the total reflection so that part of the light that has propagated inside the light guide plate through the total reflection is emitted from the light guide plate, wherein the first deflection unit is constituted by a first hologram diffraction grating and, the second deflection unit is constituted by a third hologram diffraction grating, and in the third hologram diffraction grating, a region located far from the first deflection unit has a higher diffraction efficiency than a region located close to the first deflection unit.

[K02] «Optical Device According to Fifth Aspect»

An optical device, including:

(a) a light guide plate configured to cause incident light to propagate inside the light guide plate through total reflection and then emit the light;

(b) a first deflection unit configured to deflect the light incident on the light guide plate so that the light incident on the light guide plate is totally reflected inside the light guide plate; and (c) a second deflection unit configured to deflect the light that has propagated inside the light guide plate through the total reflection so that part of the light that has propagated inside the light guide plate through the total reflection is emitted from the light guide plate, wherein the first deflection unit is constituted by a first hologram diffraction grating and, the second deflection unit is constituted by a third hologram diffraction grating, and in the third hologram diffraction grating, a region located far from the first deflection unit is thicker than a region located close to the first deflection unit.

[K03]

The optical device according to [K02], wherein a thickness of the third hologram diffraction grating changes stepwise or increases gradually.

[K04]

The optical device according to [J01], wherein the third hologram diffraction grating is constituted by a 3A-th hologram diffraction grating located close to the first deflection unit and a 3B-th hologram diffraction grating located far from the first deflection unit, and $\eta_{3B} > \eta_{3A}$ is satisfied where $\eta_{3A}$ represents diffraction efficiency of the 3A-th hologram diffraction grating, and $\eta_{3B}$ represents diffraction efficiency of the 3B-th hologram diffraction grating.

[K05]

The optical device according to [K02] or [K03],
wherein the third hologram diffraction grating is constituted by a 3A-th hologram diffraction grating located close to the first deflection unit and a 3B-th hologram diffraction grating located far from the first deflection unit, and
$T_{3B} > T_{3A}$ is satisfied where $T_{3A}$ represents a thickness of the 3A-th hologram diffraction grating, and $T_{3B}$ represents a thickness of the 3B-th hologram diffraction grating.

[K06]

The optical device according to [K04] or [K05]
wherein, when a surface on which the light is incident is defined as a second surface of the light guide plate and an opposite surface of the light guide plate to the second surface is defined as a first surface, the 3A-th hologram diffraction grating and the 3B-th hologram diffraction grating are arranged on the first surface of the light guide plate.

[K07]

The optical device according to [K04] or [K05],
wherein, when a surface on which the light is incident is defined as a second surface of the light guide plate and an opposite surface of the light guide plate to the second surface is defined as a first surface, the 3A-th hologram diffraction grating and the 3B-th hologram diffraction grating are arranged on the second surface of the light guide plate.

[K08]

The optical device according to [K04] or [K05],
wherein, when a surface on which the light is incident is defined as a second surface of the light guide plate and an opposite surface of the light guide plate to the second surface is defined as a first surface, the 3A-th hologram diffraction grating is arranged on the second surface of the light guide plate, and the 3B-th hologram diffraction grating is arranged on the first surface of the light guide plate.

[K09]

The optical device according to [K04] or [K05],
wherein, when a surface on which the light is incident is defined as a second surface of the light guide plate and an opposite surface of the light guide plate to the second surface is defined as a first surface, the 3A-th hologram diffraction grating is arranged on the first surface of the light guide plate, and the 3B-th hologram diffraction grating is arranged on the second surface of the light guide plate.

[K10]

The optical device according to [K08] or [K09],
wherein an orthogonal projection image of the 3A-th hologram diffraction grating to the light guide plate and an orthogonal projection image of the 3B-th hologram diffraction grating to the light guide plate overlap each other in a boundary portion in which the orthogonal projection images are facing to each other.

[K11]

The optical device according to any one of [B01] to [k10],
wherein $\eta_1/\eta_3 > 1.0$ is satisfied,
where $\eta_1$ represents diffraction efficiency of the first hologram diffraction grating, and $\eta_3$ represents diffraction efficiency of the third hologram diffraction grating.

[K12]

The optical device according to any one of [K01] to [K10],
wherein $T_1 > T_3$ is satisfied,
where $T_1$ represents a thickness of the first hologram diffraction grating, and $T_3$ represents a thickness of the third hologram diffraction grating.

[K13]

The optical device according to [K12],
wherein $T_3 \leq 2.0$ µm, preferably $T_3 \leq 1.6$ µm is satisfied.

REFERENCE SIGNS LIST 10 frame
10' nose pad
11 front section
11' middle part of front section
12 hinge
13 temple section
14 modern section
15 wiring (signal line, power line, etc.)
16 headphone unit
16' headphone unit
17 imaging device
18 control device (control circuit, control unit)
18A image information storage device
19 mounting member
20 observer
21 pupil
30, 40 coupling member
100, 200, 300A, 300B image display device
111, 111A, 111B, 111',211, 211' image forming apparatus
112 optical system (collimating optical system)
113, 213 housing
120, 320 optical device (light guide unit)
121, 321 light guide plate
122, 322 first surface of light guide plate
123, 323 second surface of light guide plate
124 support
125 transparent protecting member
126 sealing member
130, 330 first deflection unit
131, 331 first hologram diffraction grating
132 first interference fringe forming region
133 outside region of first interference fringe forming region
133' end region of first hologram diffraction grating
134A 1A-th alignment mark
134B 1B-th alignment mark
135 second hologram diffraction grating
136 second interference fringe forming region
137 outside region of second interference fringe forming region
137' end region of second hologram diffraction grating
138A 2A-th alignment mark
138B 2B-th alignment mark
140, 340 second deflection unit
141, 341 third hologram diffraction grating
141A 3A-th hologram diffraction grating
141B 3B-th hologram diffraction grating
150 reflective spatial light modulator
151 liquid crystal display device (LCD)
152 polarizing beam splitter
153, 153', 251, 251' light source
252 collimating optical system
253 scanning unit
254 optical system (relay optical system)
255 cross prism
256 total reflection mirror
160 stage
161 first light source (alignment light source) in alignment device
162 second light source (second alignment light source) in alignment device
163 first imaging device (first alignment imaging device)
164 second imaging device (second alignment imaging device)
401, 402 light shielding member
500 dimmer 501 first substrate (shared by transparent protecting member)
502 first transparent electrode
502A first transparent electrode segment
503 second substrate
504 second transparent electrode
504A second transparent electrode segment
505 dimming layer
505A WO$_3$ layer
505B Ta$_2$O$_5$ layer
505C Ir$_x$Sn$_{1-x}$O layer
506 passivation layer
507 sealing material
508 minimum unit region in which light shielding ratio of dimmer changes
511 virtual image projection region
512 other region of dimmer
513 virtual rectangle
521 environmental illuminance measuring sensor
522 transmitted light illuminance measuring sensor
601, 601R, 601G, 601B light emitting element
602 light guide member
603 dichroic prism
604, 604R, 604G, 604B light passing control device
611R, 611G, 611B light emitting panel
612 microlens

The invention claimed is:

1. An optical device, comprising:
a light guide plate;
a first deflection unit configured to deflect light incident on the first deflection unit to be totally reflected and propagate inside the light guide plate; and
a second deflection unit configured to deflect the light propagated in the light guide plate such that a part of the light propagated in the light guide plate is emitted from the light guide plate, wherein
the first deflection unit comprises a first hologram diffraction grating and a second hologram diffraction grating,
the first hologram diffraction grating and the second hologram diffraction grating are on opposite surfaces of the light guide plate,
a first incident light that is a portion of the light incident on the first deflection unit corresponds to a central angle of view,
the first incident light having a peak wavelength $\lambda_1$ is diffracted by the first hologram diffraction grating,
the second hologram diffraction grating allows the first incident light to deflect through the second hologram diffraction grating,
a second incident light that is a portion of the light incident on the second deflection unit corresponds to the central angle of view,
the second incident light having a peak wavelength $\lambda_2$ is diffracted by the second hologram diffraction grating,
the first hologram diffraction grating allows the second incident light to pass through the first hologram diffraction grating,
the second deflection unit comprises a third hologram diffraction grating,
a value of a diffraction efficiency of the third hologram diffraction grating is less than each of a value of a diffraction efficiency of the first hologram diffraction grating and a value of a diffraction efficiency of the second hologram diffraction grating, a thickness of the third hologram diffraction grating is less than each of a thickness of the first hologram diffraction grating and a thickness of the second hologram diffraction grating,
the first hologram diffraction grating includes a first interference fringe, a first alignment mark, and a second alignment mark,
the first interference fringe is in a first interference fringe forming region of the first hologram diffraction grating,
the first interference fringe forming region is between the first alignment mark and the second alignment mark,
the second hologram diffraction grating includes a second interference fringe, a third alignment mark, and a fourth alignment mark,
the second interference fringe is in a second interference fringe forming region of the second hologram diffraction grating,
the second interference fringe forming region is between the third alignment mark and the fourth alignment mark,
the third hologram diffraction grating has a third interference fringe,
a relation of $\phi_2<\phi_3<\phi_1$ and $P_1=P_3=P_2$ is satisfied, where
$\phi_1$ represents a slant angle of the first interference fringe,
$\phi_2$ represents a slant angle of the second interference fringe,
$\phi_3$ represents a slant angle of the third interference fringe,
$P_1$ represents a pitch of the first interference fringe,
$P_2$ represents a pitch of the second interference fringe, and
$P_3$ represents a pitch of the third interference fringe,
$0.7°\leq|\phi_2-\phi_1|\leq4.7°$ is satisfied, and
the slant angle of the first interference fringe is different from the slant angle of the second interference fringe.

2. The optical device according to claim 1, wherein
the first alignment mark faces the second alignment mark,
the third alignment mark faces the fourth alignment mark,
a position of the first alignment mark and a position of the third alignment mark are non-overlapping positions, and
a position of the second alignment mark and a position of the fourth alignment mark are non-overlapping positions.

3. A display device, comprising:
a frame configured to be worn on a head of an observer; and
an image display device configured to be mounted on the frame, wherein the image display device includes:
an image forming apparatus; and
an optical device configured to receive light emitted from the image forming apparatus, wherein the optical device includes:
a light guide plate;
a first deflection unit configured to deflect the light incident on the first deflection unit to be totally reflected and propagate inside the light guide plate; and
a second deflection unit configured to deflect the light propagated in the light guide plate such that a part of the light propagated in the light guide plate is emitted from the light guide plate, wherein the first deflection unit comprises a first hologram diffraction grating and a second hologram diffraction grating, the first hologram diffraction grating and the second hologram diffraction grating are on opposite surfaces of the light guide plate, a first incident light that is a portion of the light incident on the first deflection unit corresponds to a central angle of view, the first incident light having a peak wavelength $\lambda_1$ is diffracted by the first hologram diffraction grating, the second hologram diffraction grating allows the first incident light to deflect through the second hologram diffraction grating, a second incident light that is a portion of the light incident on the second deflection unit corresponds to the central angle of view, the second incident light having a peak wavelength $\lambda_2$ is diffracted by the second hologram diffraction grating, the first hologram diffraction grating allows the second incident light to pass through the first hologram diffraction grating, the second deflection unit comprises a third hologram diffraction grating, a value of a diffraction efficiency of the third hologram diffraction grating is less than each of a value of a diffraction efficiency of the first hologram diffraction grating and a value of a diffraction efficiency of the second hologram diffraction grating, a thickness of the third hologram diffraction grating is less than each of a thickness of the first hologram diffraction grating and a thickness of the second hologram diffraction grating, the first hologram diffraction grating includes a first interference fringe, a first alignment mark, and a second alignment mark, the first interference fringe is in a first interference fringe forming region of the first hologram diffraction grating, the first interference fringe forming region is between the first alignment mark and the second alignment mark, the second hologram diffraction grating includes a second interference fringe, a third alignment mark, and a fourth alignment mark, the second interference fringe is in a second interference fringe forming region of the second hologram diffraction grating, the second interference fringe forming region is between the third alignment mark and the fourth alignment mark, the third hologram diffraction grating has a third interference fringe, a relation of $\phi_2 < \phi_3 < \phi_1$ and $P_1 = P_3 = P_2$ is satisfied, where $\phi_1$ represents a slant angle of the first interference fringe, $\phi_2$ represents a slant angle of the second interference fringe, $\phi_3$ represents a slant angle of the third interference fringe, $P_1$ represents a pitch of the first interference fringe, $P_2$ represents a pitch of the second interference fringe, and $P_3$ represents a pitch of the third interference fringe, $0.7° \leq |\phi_2 - \phi_1| \leq 4.7°$ is satisfied, and the slant angle of the first interference fringe is different from the slant angle of the second interference fringe.

4. The display device according to claim 3, wherein, the image forming apparatus includes a light source configured to emit the light having a peak wavelength $\lambda_3$, the peak wavelength $\lambda_3$ represents the peak wavelength of the light deflected by the first deflection unit, the peak wavelength $\lambda_3$ propagates inside the light guide plate based on total reflection, and the peak wavelength $\lambda_3$ is deflected by the second deflection unit.

* * * * *